United States Patent [19]

Shimizu et al.

[11] Patent Number: 5,001,574
[45] Date of Patent: Mar. 19, 1991

[54] IMAGE PROCESSING SYSTEM

[75] Inventors: Katsuichi Shimizu, Kunitachi; Katsuyoshi Maeshima, Tokyo; Nao Nagashima, Yokohama; Shinobu Arimoto, Tokyo; Yoshiyuki Suzuki, Yokohama, all of Japan

[73] Assignee: Canon Kabushiki Kaisha, Tokyo, Japan

[21] Appl. No.: 220,936

[22] Filed: Jun. 23, 1988

Related U.S. Application Data

[63] Continuation of Ser. No. 106,892, Oct. 9, 1987, which is a continuation of Ser. No. 946,093, Dec. 23, 1986, which is a continuation of Ser. No. 539,461, Oct. 6, 1983, abandoned.

[30] Foreign Application Priority Data

Oct. 8, 1982 [JP] Japan .................. 57-178113
Oct. 19, 1982 [JP] Japan .................. 57-183200
Oct. 21, 1982 [JP] Japan .................. 57-185286

[51] Int. Cl.⁵ .......................... H04N 1/40; H04N 1/04
[52] U.S. Cl. .................... 358/448; 358/449; 358/450; 358/476
[58] Field of Search .............. 358/280, 282, 285, 287; 382/45

[56] References Cited

U.S. PATENT DOCUMENTS

| | | | |
|---|---|---|---|
| 3,751,583 | 8/1973 | Lemelson | 358/102 |
| 4,163,605 | 8/1979 | Yamada | 358/287 |
| 4,214,276 | 7/1980 | Pugsley et al. | 358/256 |
| 4,231,069 | 10/1980 | Wellendorf et al. | 358/280 |
| 4,325,086 | 4/1982 | Sato et al. | 358/296 |
| 4,327,380 | 4/1982 | Yamada et al. | 358/287 |
| 4,334,241 | 6/1982 | Kashioka et al. | 382/45 |
| 4,470,074 | 9/1984 | Yamada | 358/287 |
| 4,482,922 | 11/1984 | Amemiya | 358/280 |
| 4,495,521 | 1/1982 | Nagoh | 358/280 |
| 4,506,302 | 3/1982 | Kurata | 358/285 |
| 4,535,365 | 8/1985 | Sakamoto | 358/287 |
| 4,538,185 | 8/1985 | Wiggins | 358/282 |
| 4,672,461 | 6/1987 | Yoshida | 358/293 |
| 4,691,237 | 9/1987 | Shimizu | 358/293 |

FOREIGN PATENT DOCUMENTS 0009378 4/1980 European Pat. Off. .

Primary Examiner—John K. Peng
Attorney, Agent, or Firm—Fitzpatrick, Cella, Harper & Scinto

[57] ABSTRACT

This invention provides an image processing system comprising devices for producing image signals by scanning an original image, process units for generating video signals by processing the image signals, detector for detecting the coordinates of the original image and controller for storing the coordinate signals from the detecting means and for controlling the process units according to thus stored signals.

40 Claims, 53 Drawing Sheets

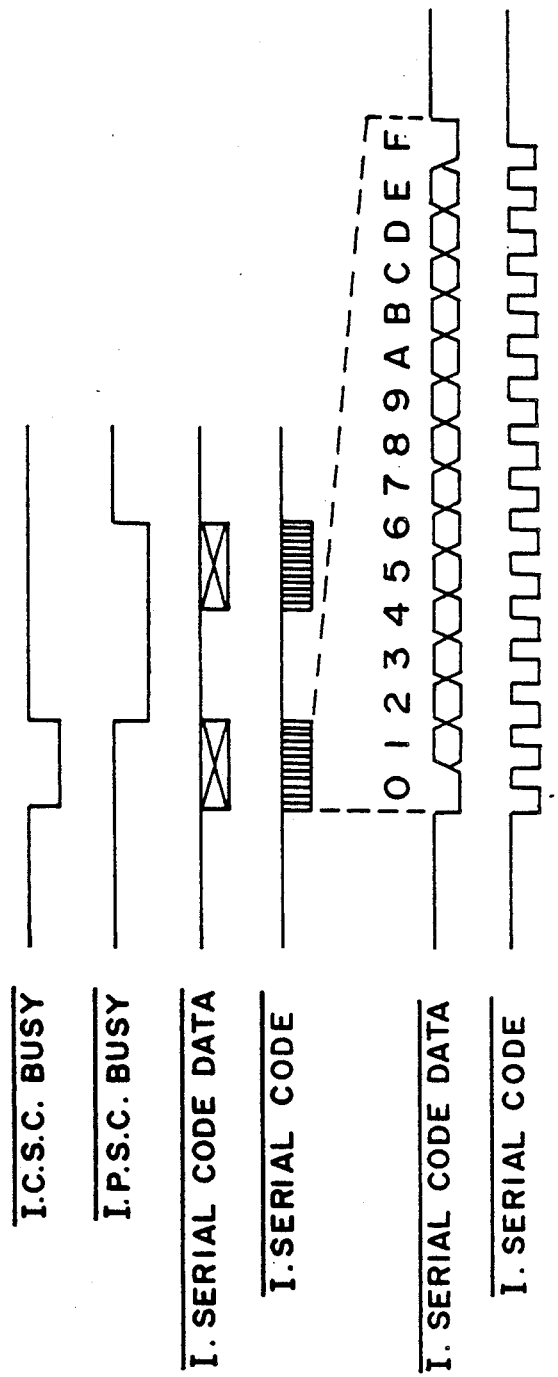

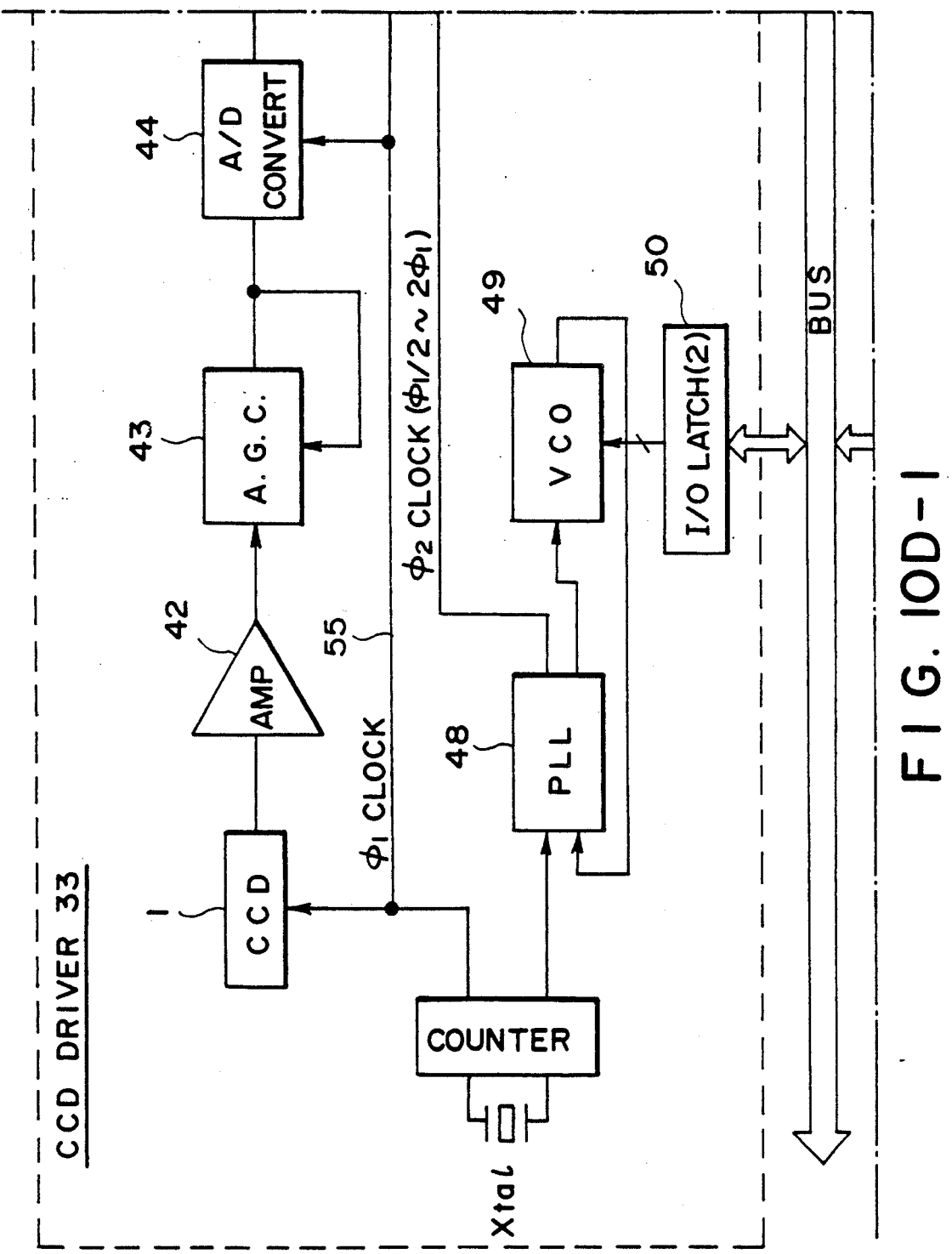
FIG. IOD-I

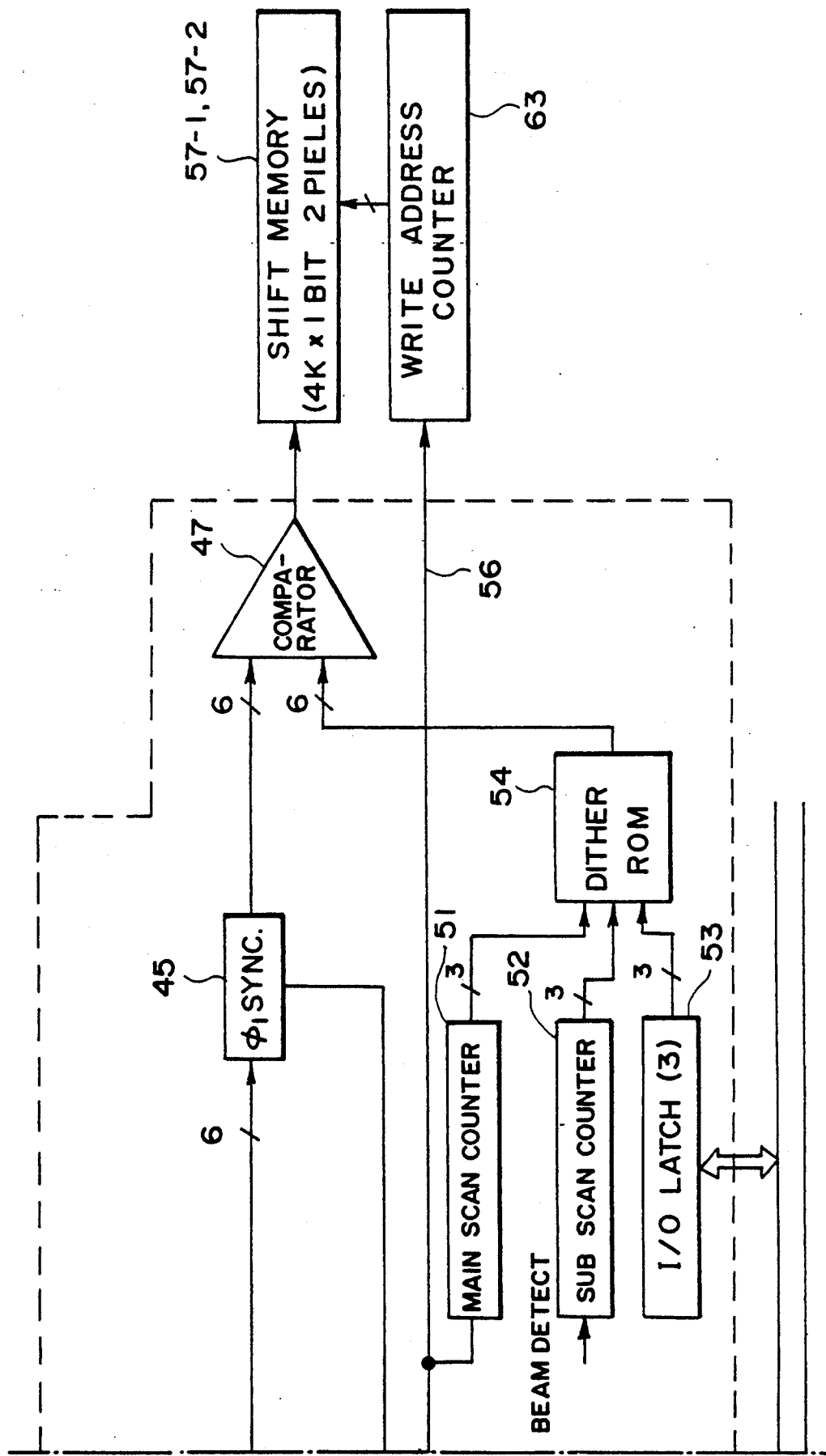
FIG. IOD-3

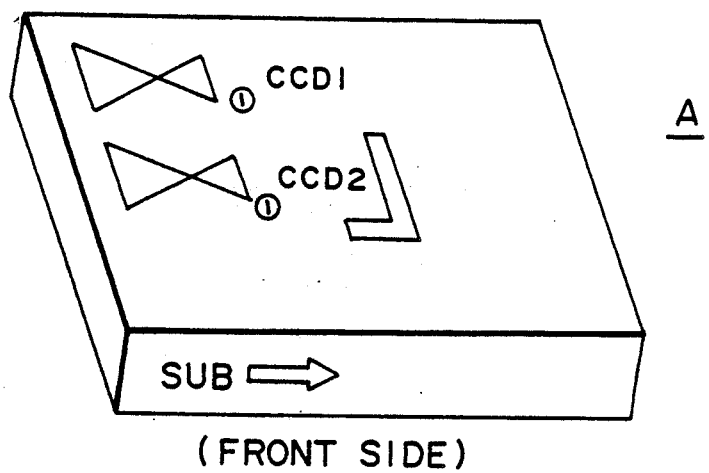
F I G. 14A
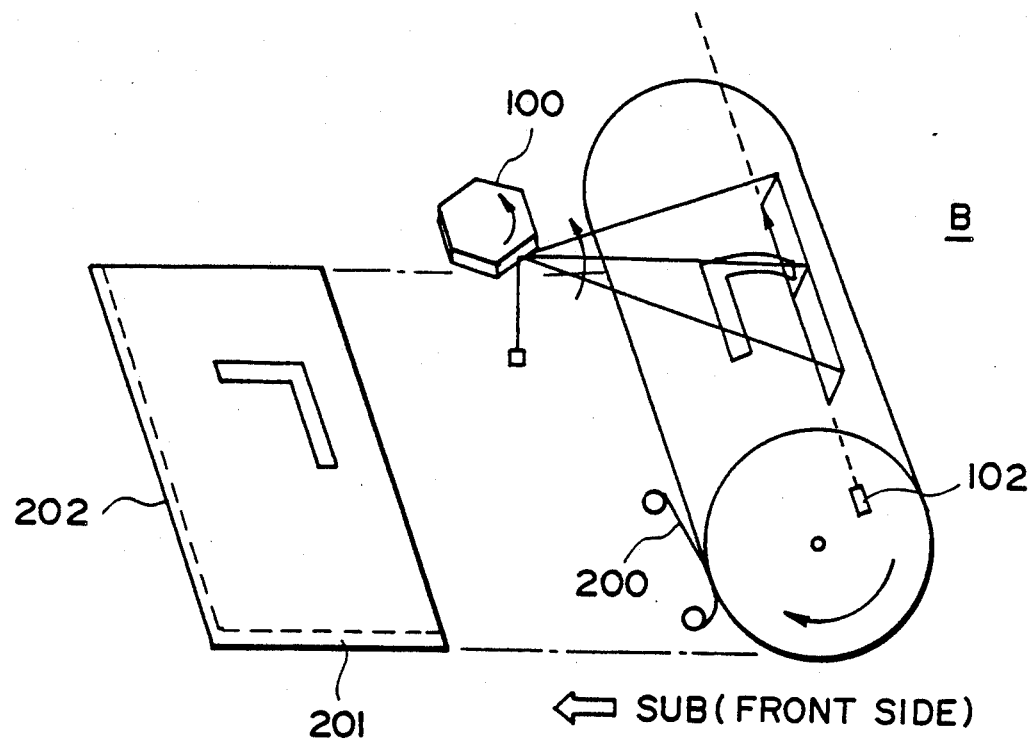
F I G. 14B

| | START BIT COUNTER | END BIT COUNTER |
|---|---|---|
| INITIALIZATION | PRESET 4751 BITS | PRESET 4751 BITS |
| AFTER COUNTING OF $N_0$ LINE | PRESET $H_0$ BITS | PRESET $H_1$ BITS |
| AFTER COUNTING OF $N_1$ LINE | PRESET $H_2$ BITS | PRESET $H_3$ BITS |
| AFTER COUNTING OF $N_2$ LINE | PRESET $H_4$ BITS | PRESET $H_5$ BITS |
| AFTER COUNTING OF $N_3$ LINE | PRESET 4751 BITS | PRESET 4751 BITS |

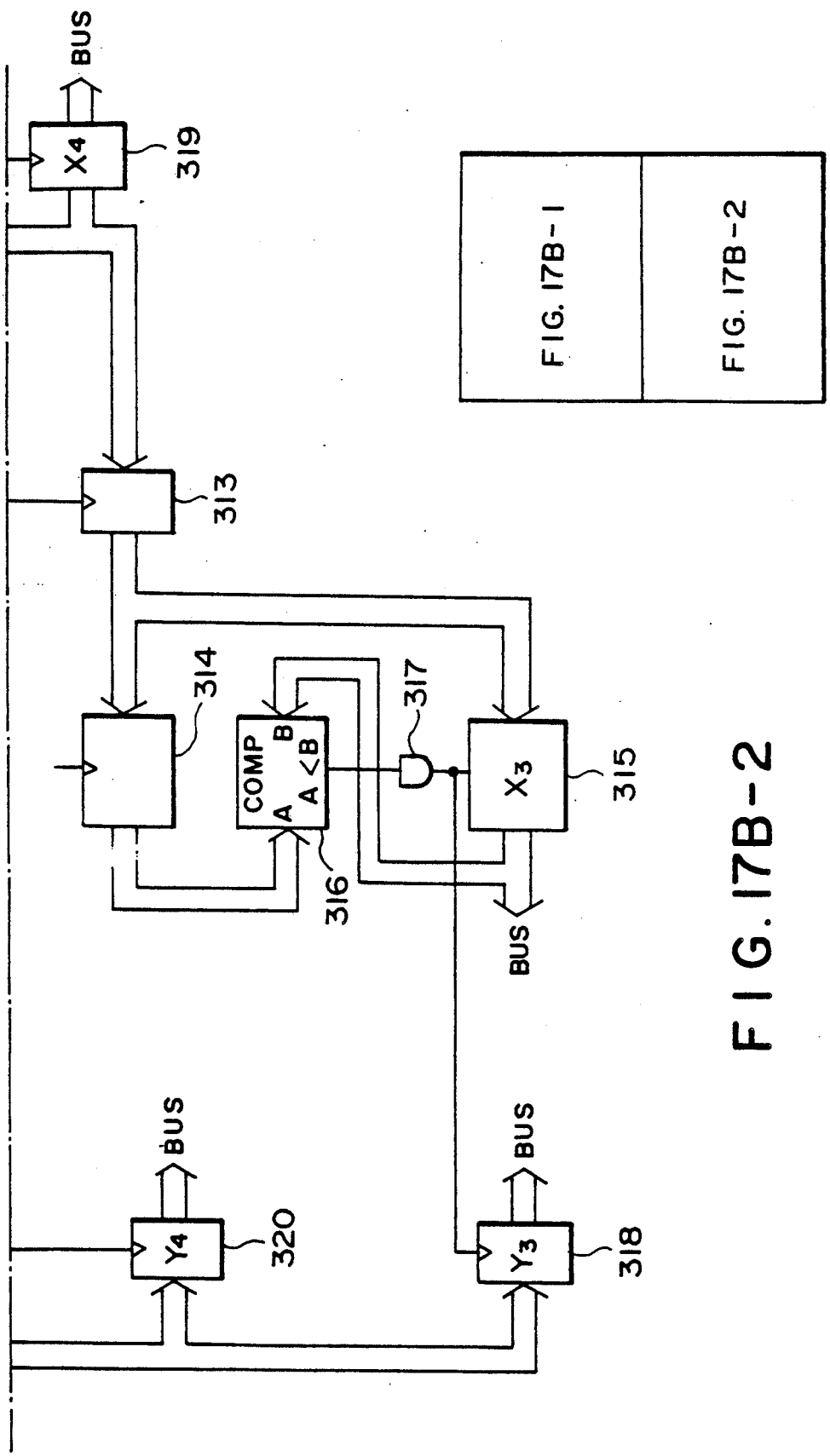

IMAGE PROCESSING SYSTEM

This application is a continuation of application Ser. No. 106,892, filed Oct. 9, 1987, now abandoned, which was a continuation of Ser. No. 946,093, filed Dec. 23, 1986, which was a continuation of Ser. No. 539,461, filed Oct. 6, 1983, now abandoned.

BACKGROUND OF THE INVENTION

1. Field of the Invention

The present invention relates to an image processing system.

2. Description of the Prior Art

Conventionally the performance of a copier has been limited to faithful reproduction of an original or magnification or reduction of the original image with a fixed ratio.

Such copier basically functions by illuminating the original with a light source such as a fluorescent lamp or a tungsten lamp, projecting the reflected light from said original through lenses and mirrors onto a photosensitive member charged in advance thereby forming an electrostatic latent image thereon, and applying developer onto said photosensitive member to obtain a visible image. Consequently the image forming process is conducted all under mechanical control, and the magnification or reduction of the original image is achieved through a relative change between the lens movement and the original scanning speed. The range of multiple functions in such conventional copier is inevitably limited, since such lens movement or speed change has a certain physical limit. It has also been difficult to arbitrarily move the image position on the copy sheet, and such movement has been considerably limited.

Also there is proposed a copier in which the original image is once stored in a memory and then read as image data for making a print, but such apparatus is quite unsatisfactory as a copier since an extremely long time is required from the start of image scanning to the completion of printing operation.

Besides the conventional copier is often unable to produce a satisfactory image quality from an original with a dark background, and is unable to faithfully reproduce certain originals such as photographs.

Furthermore, in copying with a modified size different from the original size, the selection of direction of original or of image magnification becomes quite cumbersome with the increase in the sizes of copy sheets and of originals.

Furthermore, in book copying, it is often difficult to place the book to be copied on an exact position on the platen, and is therefore difficult to obtain the copied image on a desired position of the copy sheet. Also in such book copying mode, the image quality is inevitably deteriorated since shadows are formed around the book and reproduced on the copy. Also in case of copying both pages at left and at right of an open book, the book has to be moved at each copying operation.

SUMMARY OF THE INVENTION

In the preferred embodiments to be described below in detail, the present invention is an image processing system that provides improved processing of images by providing means for manipulating an original image for reproduction in many different ways. In the preferred embodiments, the original image is scanned to produce an image signal. Coordinates of the original image may be detected by, for example, prescanning of it and a signal representing the coordinates is stored. The coordinates can indicate the size and position of the original image. Thereafter, the original image can be reproduced in various modes, for example, in an image size modifying mode, an image inverting mode, an editing mode, an image displacing mode, or a special size modifying mode utilizing the stored coordinates.

Accordingly, it is an object of the present invention to provide an image processing system, capable of operating to reproduce an original image in many ways.

An object of the present invention is also to provide an image processing system not associated with the drawbacks mentioned above with reference to the prior art.

Another object of the present invention is to provide an image processing system capable of reading an original image to convert the same to electric signals, processing said signals and obtaining a print with image signal processings within a short time.

Still another object of the present invention is to provide an image processing system capable of extracting an arbitrary area of an original image and reproducing thus extracted area on an arbitrary position with an arbitrary image magnification on a copying material.

Still another object of the present invention is to provide an image processing system capable of determining the image print position on a copying material in the longitudinal and transverse directions thereof respectively by image signal control and by mechanical control.

Still another object of the present invention is to provide a real-time digital copying machine capable of copying operation during the original scanning operation and not requiring a memory of a capacity corresponding to the original image.

Still another object of the present invention is to provide an image data processing system adapted for image size modification of image signals involving half tones.

Still another object of the present invention is to provide an image processing system in which a reader unit for scanning an original image and an image printer unit function in mutually coordinated manner.

Still another object of the present invention is to provide a video interface system in which an original image can be reproduced by an image printer unit of a printing speed different from the image reading speed of an image reader unit.

Still another object of the present invention is to provide a video interface system capable of high-speed transmission of image signals and related data between an image signal generating unit and an image printer unit.

Still another object of the present invention is to provide an image processing system capable of high-precision access to an image signal memory.

Still another object of the present invention is to provide an image data processing system capable of eliminating the background of an original on a real time basis.

Still another object of the present invention is to provide an image processing system capable of improved faithful reproduction of half tones.

Still another object of the present invention is to provide an image processing system capable of printing operation adapted to the original size.

Still another object of the present invention is to provide an image processing system capable of automatic printing on an appropriate position on a copying material regardless of the original position on the platen.

Still another object of the present invention is to provide an image processing system capable of detecting diagonal positioning of an original on the platen.

Still another object of the present invention is to provide an image processing system capable of detecting the position and size of an original and automatically providing a print on a copying material of a determined size.

Still another object of the present invention is to provide an image processing system capable of eliminating any black frame around image in the book copying.

Still another object of the present invention is to provide an image processing system capable of copying pages at left and at right of a book on different copying materials without book movement.

The foregoing and still other objects of the present invention will become fully apparent from the following description.

BRIEF DESCRIPTION OF THE DRAWINGS

FIGS. 4A, and 4B-1 and 4B-2 (FIG. 4B showing how FIGS. 4B-1 and 4B-2 are assembled), are block diagrams of a local network in which connected is the apparatus shown in FIG. 1;

FIGS. 6A-1 and 6A-2 are assembled to form a circuit block diagram of the image processing apparatus shown in FIG. 1;

FIGS. 6B-1 and 6B-2 are assembled to form is a flow chart thereof;

FIGS. 7, 7A and 7B, 8 and 9 are timing charts showing the functions of the circuit shown in FIG. 6A;

FIGS. 10A, 10B, 10C, FIGS. 10D-1 to 10D-3, and FIGS. 13A to 13D are circuit diagrams showing parts in FIG. 6A;

FIGS. 14A and 14B are schematic views showing the procedure of main and subsidiary scanning;

FIGS. 17B-1, 17B-2 and 17B are a circuit diagram therefor;

FIGS. 18B and FIGS. 20B-1 and 20B-2 and FIG. 20C and 20B are flow charts therefor;

DETAILED DESCRIPTION OF THE PREFERRED EMBODIMENTS

Figure 1:
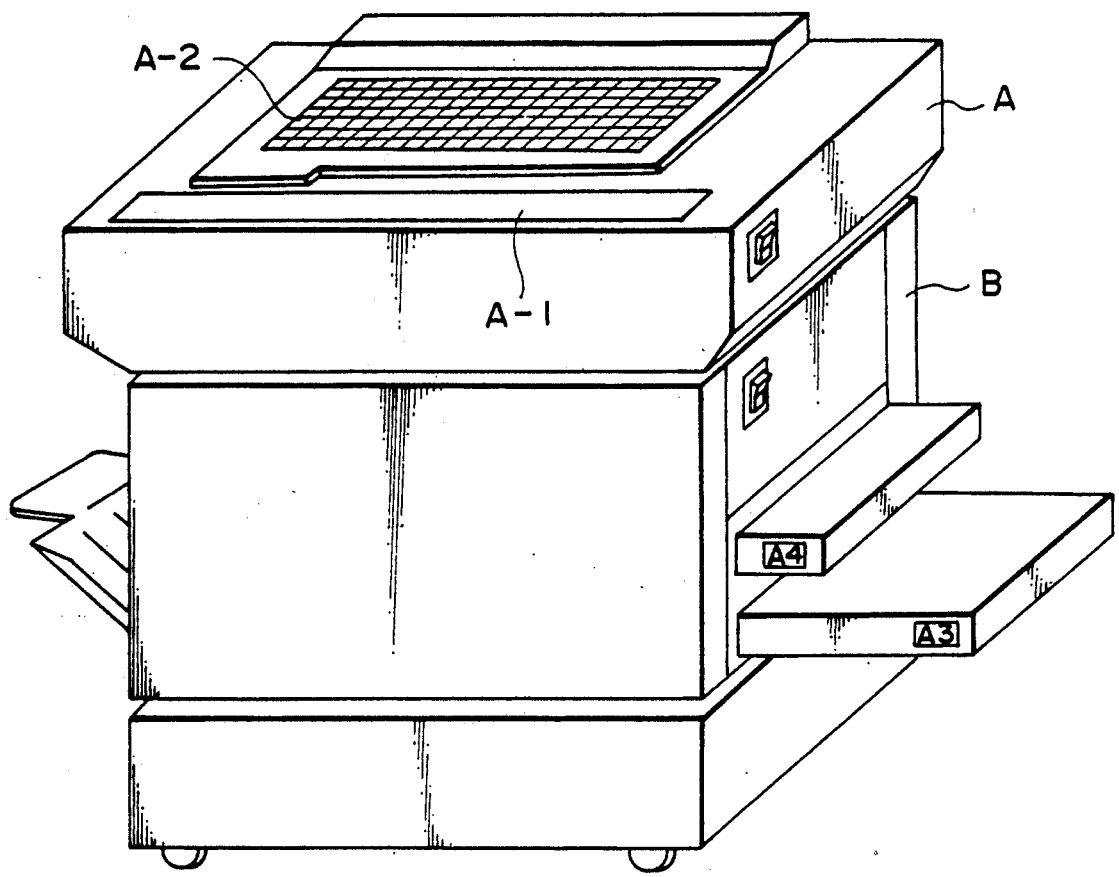
FIG. 1 is a perspective view of an image processing apparatus in which the present invention is applicable.

FIG. 1A shows an external view of a copying apparatus embodying the present invention, basically consisting of two units, namely a reader A and a printer B, which are functionally and mechanically separated from each other and can be used independently. These units are mutually connected through an electric cable. The reader A is equipped with an operation unit A-1 (FIG. 4B-1 and 4B-2) to be explained later.

Figure 3:
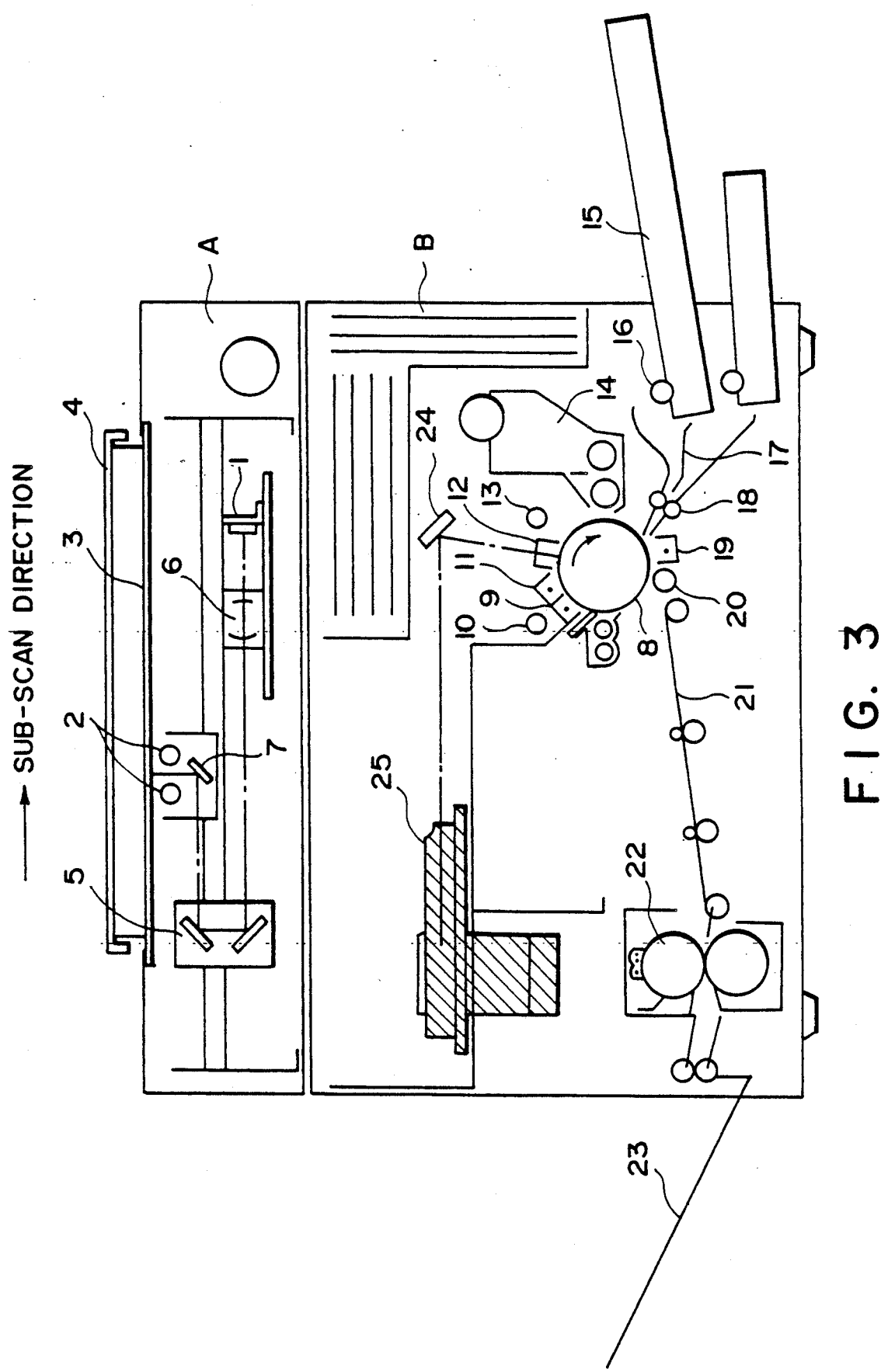
FIG. 3 is a cross-sectional view of the apparatus shown in FIG. 1.

FIG. 3 shows a cross-sectional view of the reader A and the printer B. An original is placed, with the front face thereof downwards, on an original supporting glass 3, at left rear corner thereof, and is pressed against said glass by an original cover 4. The original is illuminated by a fluorescent lamp 2, and an optical path is formed to guide the reflected light onto a charge-coupled device CCD1 through mirrors 5, 7 and a lens 6, wherein said mirrors 7 and 5 are moved with a speed ratio 2:1. The above-described optical unit moves from left to right at a constant speed by a DC servo motor. The moving speed is 180 mm/sec in the forward movement in which the original is illuminated, and 468 mm/sec in the backward movement. The resolving power in this subsidiary scanning direction is 16 lines/mm. The processable original size ranges from A3 to A5, and an original of A5, B5 or A4 size is placed in a vertically long orientation while an original of B4 or A3 size is placed in a laterally long orientation. The optical unit is reversed according to the original size, when reader signals VIDEO ENABLE, counted by an electric sensor to be explained later, reach a determined count corresponding to the original size.

The main scanning width is 297 mm (FIG. 11) which is equal to the width of an A4-sized original placed in a laterally long orientation. In order to attain a resolving power of 16 pel/mm, there are required 4752 ($=297 \times 16$) bits, which are provided in the present embodiment by two 2688-bit CCD array sensors driven in parallel. Consequently, based on the conditions of 16 lines/mm and 180 mm/sec, the main scanning period, or the charge accumulating time of the CCD, is equal to $T = 1/vn = 1/180 \times 16 = 347.2$ microseconds, and the transfer rate of the CCD is equal to $f = N/T = 2688/347.2 = 7.741$ MHz.

Now there will be explained the printer B provided under the reader A in FIG. 3. Bit-serial video signals processed in the reader A are supplied to a laser scanning optical unit 25 in said printer. Said unit comprises a semiconductor laser, a collimeter lens, a rotary polygonal mirror, an F-$\theta$ lens, and an image correcting optical system. The image signals from the reader are supplied to the semiconductor laser for electrooptical conversion, and the emitted light is converted into a parallel beam by the collimeter lens and directed to the polygonal mirror rotated at a high speed for scanning the photosensitive member with said laser beam. Said polygonal mirror is rotated at a speed of 2,600 rpm and covers a scanning width of ca. 400 mm, with an effective scanning width of 297 mm equal to the length of the A4 size. The signal frequency supplied to the semiconductor laser is about 21 MHz (NRz) as will be explained later. The laser beam from said unit is introduced onto the photosensitive member 8 through a mirror 24.

The photosensitive member 8 has for example a three-layered structure, consisting of a conductive layer, a photosensitive layer and an insulating layer, and is associated with process components for image formation, including a preliminary charge remover 9, a preliminary charge removing lamp 10, a primary charger 11, a secondary charger 12, an exposure lamp 13, a developing unit 14, a paper cassette 15, a sheet feeding roller 16, a sheet guide 17, a registration roller 18, a transfer charger 19, a separating roller 20, a transport guide 21, a fixing unit 22 and a tray 23, which in combination produce a copy through an already known electrophotographic process. The speed of the photosensitive member 8 and of the transport system is 180 mm/sec, which is same as the scanning speed of the reader. Consequently the copying speed obtained by the combination of the reader and the printer is 30 copies/min. for A4-sized copies. The above-mentioned feeding roller 16 and registration roller 18 are controlled by signals from the reader.

The printer uses a separating belt 200 (FIG. 14B) for separating the copy sheet maintained in contact with the photosensitive drum, and, for this reason the image does not appear in the area 201 corresponding to said belt. If the image signals are given to these area and developed, the toner will be deposited on said belt and will stain the subsequent copy sheet. Therefore the reader eliminates the image signals in the area of 8 mm wide, corresponding to the belt width. Similarly the signals are eliminated in an area 202 (FIG. 14B) of 2 mm long at the leading end of the copy sheet, since the toner deposited in said leading end will cause the sheet to adhere to the fixing roller in the fixing unit, thus leading to a sheet jamming. FIGS. 14A and 14B show the direction of main scanning in the reader and the printer, in combination with an output image. The main scanning is made from rear to front in the reader, and in the opposite direction in the printer.

The copying apparatus of the present embodiment has certain intelligent performance such as image editing, which is achieved by processing in the reader on the signals obtained from CCD's. The signals supplied from the reader always have 4752 bits and are of a constant rate in any operating mode. Said intelligent performance includes magnification or reduction function with determined image size ratios or with an arbitrary image size ratio in a range from 0.5 to 2.0 times, image trimming function for extracting a designated area of the image, image moving function for moving the thus trimmed image to an arbitrary position on the copy sheet, a function of magnifying or reducing the thus trimmed image with an arbitrary image size ratio or with an image size ratio matching the copy sheet size, and a detecting function for recognizing the original placed on the original supporting glass. In addition a halftone processing (AE function) with 32 levels is possible by appropriate key operation, and these intelligent functions may be combined as will be explained later in relation to FIG. 16.

Figure 16A:
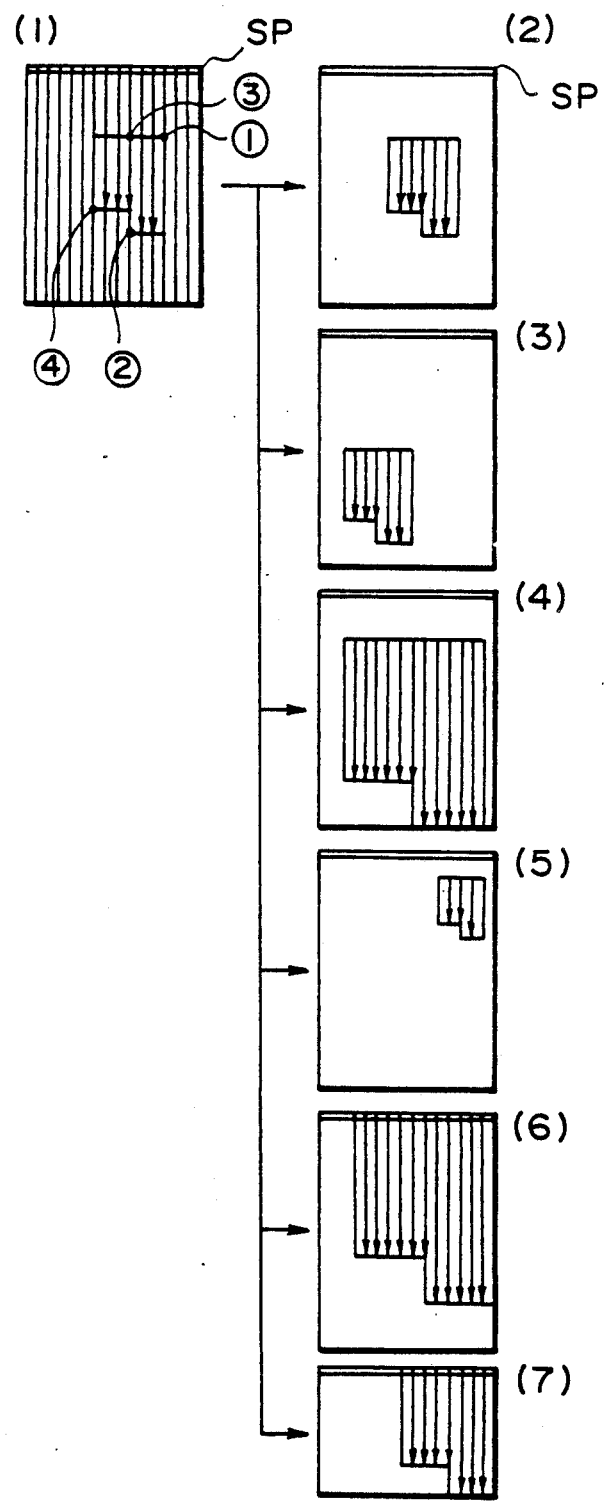
FIGS. 16a-16c and 19 are schematic views showing examples of image conversion.

FIG. 16a shows the image editing function, wherein (1) indicates the original, (2) a copy obtained with the designation of trimming coordinates alone, (3) a copy obtained with the designations of trimming coordinates and of image moving coordinates (an error indication being given if the coordinates exceed the copy sheet size), (4) a copy obtained with the designations of trimming coordinates and of image moving coordinates combined with image magnification at an arbitrary image size ratio (an error indication being given if the image exceeds the copy sheet size), (5) a copy obtained with the designation of trimming coordinates and of image moving coordinates combined with image reduction at an arbitrary image size ratio, (6) a copy obtained with the designation of trimming coordinates combined with an automatic copying mode in which the size of the trimmed image is automatically changed to match the sheet size within an image size ratio from 0.5 to 2.0 times and according to the orientation of the sheet cassette, and (7) a copy obtained with the designation of trimming coordinates combined with an automatic copying mode for a small-sized sheet. The trimming coordinates to be shifted to the image moving coordinates are determined with reference to a point (1) where the coordinate value in the subsidiary scanning direction is smallest.

In the embodiment are provided further functions, such as automatic size modification, cornering, centering, pointing two pages of open book on separate sheet respectively without book movement, etc. as latter described.

Figure 16B:
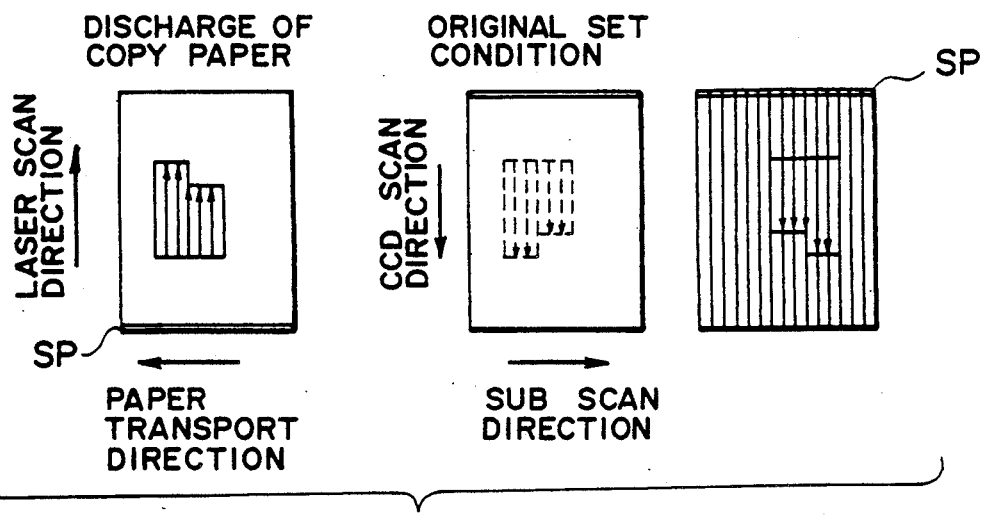
Figure 16C:
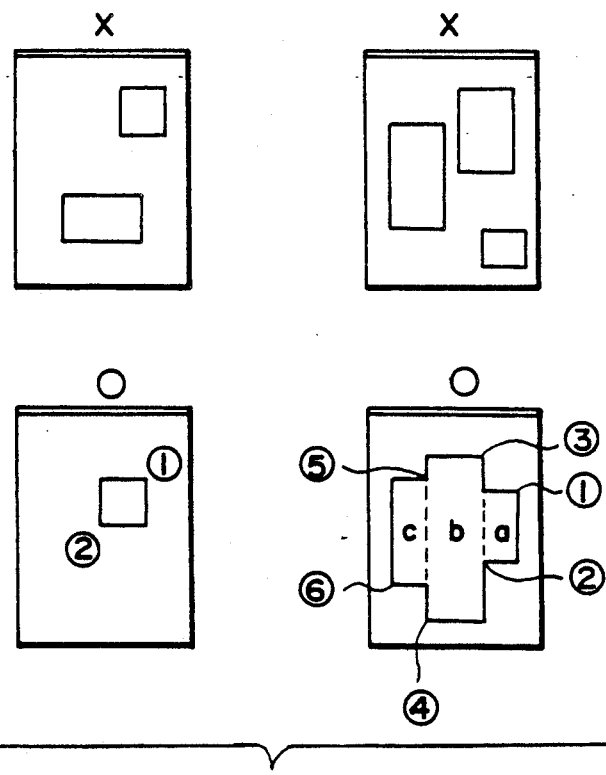

FIG. 16b shows the relationship between the main scanning directions of CCD's and of a laser, and FIG. 16c shows the procedure of designating the trimming coordinates. A frame defined by linear lines is designated in the order from (1) to (6), with numeral keys 12a shown in FIG. 4, by dividing said frame into three rectangles a, b and c and designating the points on a diagonal in each rectangle.

Figure 2:
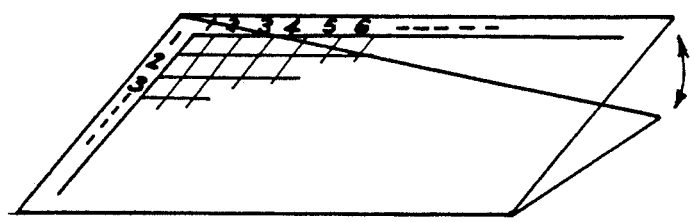
FIG. 2 is a perspective view of a document holder.

FIG. 2 shows a transparent holder A-2 which can be inserted between the original cover 4 and the glass 3. The holder is of a bag-like form bonded at two edges, and has a width the same as that of the glass 3. A section pattern is drawn on one side of said holder, and coordinate marks 1 - n and 1 - m are indicated at an interval of 1-10 mm, respectively on the vertical and horizontal edges of said section pattern. The coordinate points correspond to the points on the glass. When the original is inserted into said bag-like holder with the image bearing face toward the coordinate face, the respective points on the original image are indicated by the coordinates. Thus, the operator can enter the trimming coordinates and the image moving coordinates by the keys of the operation unit A-1 while observing the holder. After the key entry operation, the original is turned over, again inserted in the holder and placed on a predetermined position on the glass, or the original is taken out of the holder and placed on the glass. If the coordinates are drawn with a color insensitive to CCD's the original can be placed on the glass together with said holder. The holder may also be of a structure with one or three bonded edges. A holder with one bonded edge, namely a holder made of a folded sheet, allows to designate coordinates even for a thick or bound original.

Figure 4A:
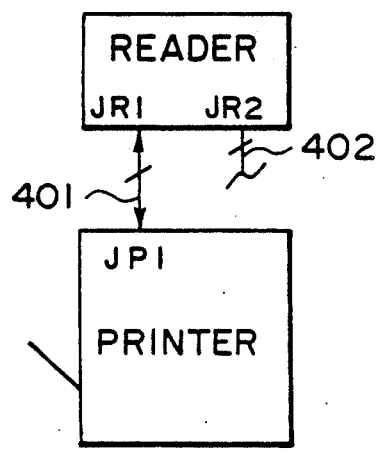
Figure 4B:
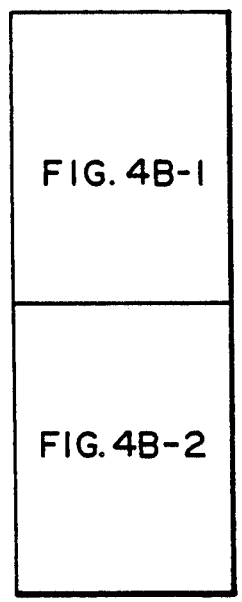
Figure 4B:
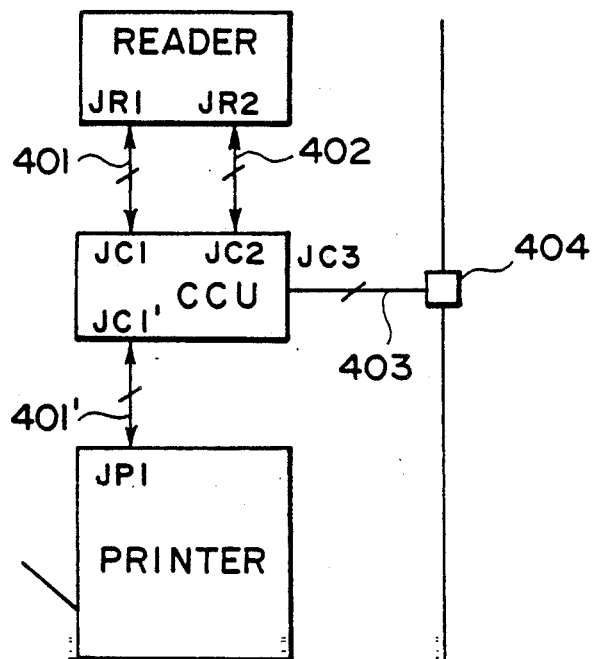
Figure 1:
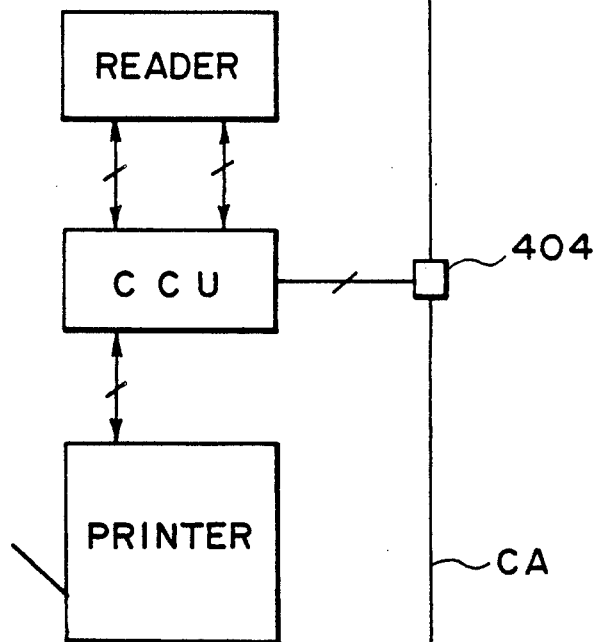
Figures 2, 4B:
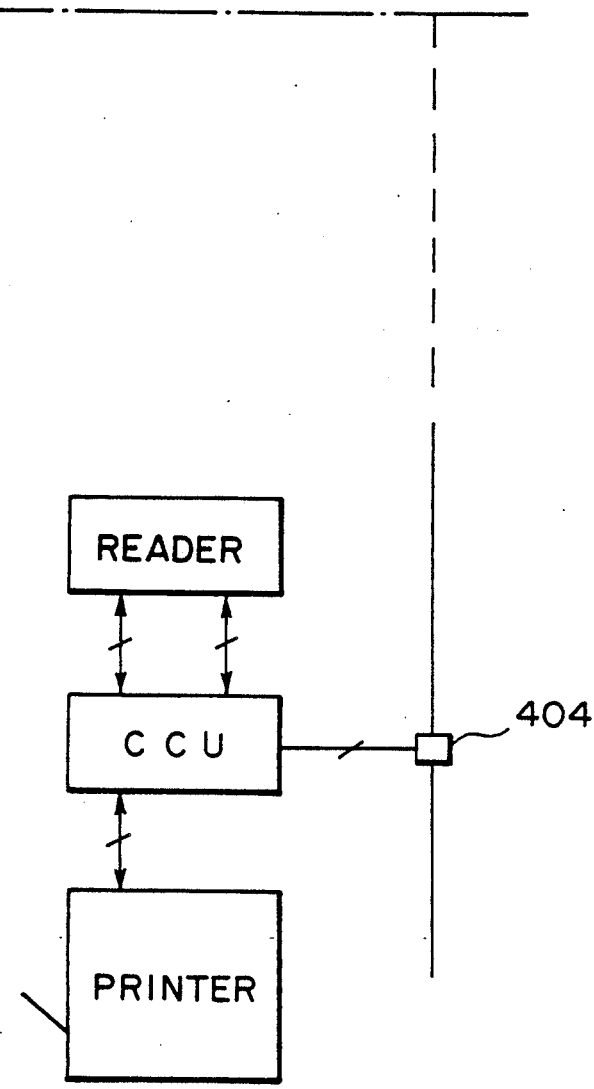

FIGS. 4A and 4B are diagrams showing examples of a network constituting an electronic mail system for example connecting a main office and a branch office, wherein each reader and printer are connected through a communication control unit (CCU) which in turn is connected to the network of a bus structure utilizing coaxial cable CA.

Figure 5:
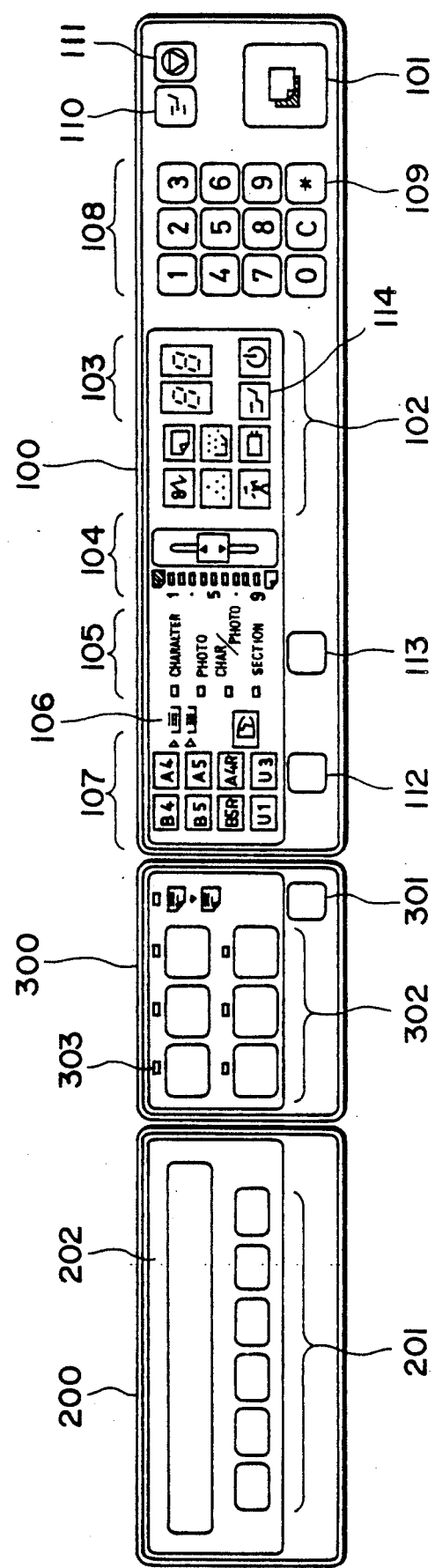
FIG. 5 is a plan view of an operation unit of the apparatus shown in FIG. 1.

When the reader and the printer are connected as a stand-alone structure, a connector JR1 of the reader is connected to a connector JP2 of the printer through a cable 401 as shown in FIG. 4A. On the other hand, when the reader and the printer are to be connected through the network, the connection between JR1 of the reader and JP1 of the printer is made through connectors JC1 and JC1' of CCU as shown in FIG. 4B-1 and 4B-2. This structure allows optional connection of CCU for providing a part of the signals exchanged between the reader and the printer to CCU for the controlling purpose, without any change in the hardware of the reader and the printer. The reader is provided also with a connector JR2 for exchanging, with CCU, instructions relating to communication, required when the reader is connected with the CCU. The operation unit of each reader is equipped with keys and display units, as shown in FIG. 5, for achieving communicating functions. The CCU is further provided with a connector JC3 for connecting a cable 403, leading from the communication cable constituting the network to the CCU which is usually installed in the pedestal part of the printer. To the network cable connected is a transceiver module 404 integrally composed of a connector which is pressure connectable to the coaxial cable and of a modulation-demodulation circuit. This network is controlled by so-called token passing system.

Now there will be explained the functions of the apparatus of the present embodiment. In addition to simple copying function, said apparatus is capable of image size modifying function for arbitrary image magnification or reduction, editing function for extracting an arbitrary part of the original, function of automatically detecting the size and position of the original and automatically modifying the image size and editing the image etc. Such functions of controlling the original image shall be collectively called image control functions. Besides, in addition to simple copying in the printer of an original image read in the reader, the present apparatus can transmit the original image to other printers through said communication control unit (CCU), and can receive original images transmitted from other readers. Such functions shall be collectively called image transmission functions. Furthermore, functions selected from the foregoing may be arbitrarily registered in six preset keys, and such registrations are retained even when the power supply is interrupted. Such functions shall be called preset functions. Furthermore the present apparatus is capable of an automatic exposure function for eliminating the background color of the original, and an intermediate tone processing function for faithfully reproducing a continuous-toned original such as a photograph, and these functions shall be collectively called image quality processing functions.

In summary the image control functions include following five functions:

image size modifying function for equal size copying (size ratio 100%), determined copy size modifications (at designated copy sizes), continuously variable copy size modifications (size ratio from 50 to 200%), and X-Y copy size modifications (copy size independently variable in the main and subsidiary scanning directions);

image inverting function for reproducing the original image or producing a positive-to-negative inverted image;

editing functions for producing an image either without editing; or with white or black masking, in which X-Y size modification mode is automatically adopted; or with white or black frame trimming; or with automatic original position detection, which is linked with the functions of size modification, image inversion, image displacement and special size modification;

image displacing functions for producing an image either without displacement; or with designated destination of displacement; or with a movement of original point (cornering); or with centering;

special image size modifying functions for producing an image either without any size modification; or with automatic size modification; or with automatic X-Y size modification, in the last two of which no other size modifying mode can be selected at the same time. The image displacing functions and the special size modifying functions are rendered effective only when the white or black frame trimming mode or automatic original position detection mode is selected in the editing functions.

The image transmission functions include local (ordinary) copying mode, transmission mode (for transmitting the original image to another printer through CCU), and reception mode (for receiving the original image from another reader through CCU).

The preset functions include registration (for storing editing data etc. with preset keys), read-out (for reading the stored data with preset keys), and resetting (for returning the function to the standard mode).

The image quality processing functions include automatic exposure mode (AE), and intermediate tone processing mode. The original image subjected to image controlling functions or image quality processing functions may be transmitted through CCU for printing in another printer.

FIG. 5 shows the details of the operation unit A-1 shown in FIG. 1, composed of three blocks: a right-end block 100 including keys and displays already known in the conventional copiers, a central block 300 including function keys and displays for recalling the copying-transmitting functions arbitrarily prepared and stored by the operator in advance, and a left-end block 200 including program keys and displays for arbitrarily creating the copying-transmitting functions. The general key-display block 100 is provided with 7-segment LED display units 103 for indicating the desired copy number and the copy count in operation; alarm indicators 102 for indicating sheet jamming, lack of toner, lack of paper, interruption copy mode etc. as already known in the conventional copiers: a copy density adjusting lever and a corresponding density indicator 104; original selectors 105 for indicating whether the original contains characters only, photograph only, characters and photographs in combination or is drawn on a section paper, in order to apply optimum image processing to each of these four different originals; an indicator 106 for indicating whether the upper or lower cassette is selected; an indicator 107 for indicating the sheet size stored in the selected cassette; numeral keys 108 for entering the copy number to the display unit 103 or for entering figures in the course of program preparation in the program key-display block 200 (for example for designating the trimming coordinates, image moving coordinates, image size ratio, transmission address etc.); an entry key 109 for confirming the key entry made in said block 200; an interruption key 110 for interrupting a multiple copying operation to start another copying operation; a copy cancel key 111 for interrupting a multiple copying operation in the printer or interruption signal reception; a copy key 101 for starting the copying operation in the printer or starting the signal transmission; an original selecting key 113 connected with the indicator 105; and cassette selecting key 112, the last two keys shifting the display upwards stepwise at each actuation. The function key-display block 300 is provided with six functions 302 for registering six different functions, wherein each of said keys is provided with a detachable top for enabling the operator to inscribe a title for the registered function. When a function is created by the operator through the program key-display block 200, a display unit 202 thereof displays a message whether or not to register said function. Then in response to the actuation of a program key 201, six indicators 303 of the block 300 corresponding to said six program keys start to flicker, indicating an inquiry from the apparatus in which key the aforementioned function should be registered. Upon actuation of either key, the corresponding indicator is lighted while other indicators are extinguished. The operator then detaches the cover, inscribes the title of the function on the key and mounts the cover again. Thereafter the registered data are retained even when the power supply is cut off, since the memory is backed up by a battery. A key 301 is used for returning to the standard mode.

An indicator 114 is lighted when the interruption key 110 is actuated, and flickers in the reception mode to indicate the reception of image signals from another station and to prohibit the copying operation by the copy key 101. During the reception mode, the data setting and registration through the blocks 200, 300 are enabled. Thus, after or during the reception mode, in response to the actuation of the copy key 101, the liquid crystal display unit 202 displays the content of received data, namely the address of sending station, total number of received copies and copy count in operation. Upon actuation of the clear key C, said display is replaced by a display of standard mode or of data set prior to the actuation of the copy key 101. In response to the actuation of the cancel key 111 during the reception of multiple copies, the sheet feeding is terminated and the printing operation is interrupted after the copying cycles are completed for the sheets already present in the transport path. Also a message of such interruption is displayed on a liquid crystal display unit of the sending station.

Now there will be given a detailed explanation on the reader unit, while making reference to a block diagram shown in FIG. 6A-1 and 6A-2, including interface signals at right. The connector JR1 of the reader is connected to the connector JP1 of the printer for making connection between the two. For additionally achieving external communication, the signals to be supplied from the connector JR1 to the connector JP1 are once supplied instead to the connector JC1 of CCU and transmitted from the connector JC1' thereof to said connector JP1. Separately the connectors JR2 and JC2 are mutually connected for transmitting protocol signals. Interface signals through JR1 have timings shown in FIGS. 7A and 7B and 8. A beam detect signal BD, corresponding to the front end signal of each line, is used for synchronizing the scanner (polygonal mirror 100 in FIG. 14B) when the printer is connected with the reader, and is released from a beam sensor 102 at a side of a recording drum when it is hit by the laser beam. Image signals VIDEO, CLK are released at a rate of 4752 pixels per line with a duration of 55 ns per pixel, wherein each pixel is capable of representing three states "0", "½" and "1" according to the image density. More specifically, a state "0" is represented by an L-level state for a duration of 55 ns, "½" by an H-level state for 27.5 ns followed by an L-level state for 27.5 ns, and "1" by an H-level state for 55 ns. In this manner half tone reproduction with multiple density levels can be achieved without sacrificing the resolving power, since the image signals are formed by mixing pulse width modulation with dither treatment. Said signals are produced either in synchronization with the beam detect signal when the printer is connected, or in synchronization with a similar signal generated by an internal oscillator in other cases, for example in the transmission to another station. A signal VIDEO ENABLE is produced during the output of 4752 bits of said image signals, in synchronization either with said beam detect signal or with another similar signal. The signal readout from the CCD is precisely controlled by a signal HSYNC prepared through an AND gate from the signal BD and clock signals $\emptyset 1$. A signal VSYNC, indicating the start of image signals, is released in synchronization with the output signal from an image front end detection sensor 37b and the beam detect signal or a similar internal signal, and has a duration the same as that of the VIDEO ENABLE signal. A signal PRINT START instructs the start of sheet feeding to the roller 16 in the printer. The interval between the signals PRINT START and VSYNC, or between the signal VSYNC and the sensor 37b in case the registration roller 18 is controlled by said signal VSYNC, is determined by a control circuit (FIGS. 10, 13) in consideration of the image size ratio and of the image trimming area. A signal PRINT END, indicating the completion of a copying operation in the printer, is released when the rear end of a copy sheet leaves the photosensitive drum and is supported on the conveyor belt. This signal indicates the completion of separation of the copy sheet, and is released at a timing in the control sequence. This signal is used for the increment of the copy count, and for correcting the number of lost copies in case of a sheet jamming. A signal ABX CONNECT indicates the connection of CCU, whereupon the corresponding terminal is grounded in the CCU unit to enable the communication. A signal PRINTER CONNECT is released when the printer is connected. In the printer the corresponding terminal is grounded whereby the printing operation is enabled.

Serial signal lines S. DATA, S. CLK, CSC BUSY, PSC BUSY are used for protocol exchange between the reader and the printer as will be explained later. S. DATA and S. CLK are respectively protocol data and clock signals, both 16-bits and bidirectional. The signal CSC BUSY is released when the reader releases said data and clock signals, and the signal PSC BUSY is released when the printer releases said data and clock signals. Consequently these signals indicate the direction of transmission of the signals S. DATA and S. CLK. Reference should be made to FIG. 8 for the detailed timings of these signals. These signals ensure efficient and exact operation of the reader and the printer regardless whether they are directly connected or through optical fibers etc.

Reference is again made to FIG. 6A-1 and 6A-2 for explaining the blocks constituting the reader. A CCD reading unit 601 or 601' comprises a CCD, a clock driver therefor, an amplifier for the signals from CCD and an A/D converter for A/D conversion of said signals. Control signals to said CCD's are generated by CCD control signal generators 603, 603' and supplied to clock drivers in the CCD reading units 601, 601', said control signals being generated in synchronization with the horizontal synchronization signal BD from the printer. The CCD reading units 601, 601' supply image signals converted into 6-bit digital signals to image processing units 602, 602'.

Said image processing unit 602 or 602' comprises a sampling circuit for sampling the output signals of CCD in order to control the light intensity from the light source; a circuit for detecting the shading caused by the light source and the lens; a correcting circuit therefor; a peak-hold circuit for detecting the peak light intensity in each main scanning for automatic exposure function; and a digitizing circuit for binary or trinary digitizing of 6-bit image signals after shading correction, according to slicing levels determined in response to the peak hold value or the dither pattern in the immediately preceding line or in a line immediately preceding said line. The image signals digitized in the image processing units 602, 602' are supplied to image editing units 604, 604'.

The image editing unit 604 or 604' comprises a buffer memory of 2 lines, in which each line has a capacity larger than twice of 4752 pixels per line. Such capacity is required because the amount of signals is doubled when the image signals are stored in the memory with a doubled sampling rate for achieving an image size ratio of 200%. Also two memories are provided in order to write the image signals of an N-th line into the first memory while the image signals of an (N−1)-th line are read from the other memory.

In said unit there are further provided a write address counter for writing the image signals into said buffer memories, a read address counter for signal readout and an address selector circuit for switching the address signals from said two counters. Said counters are of parallel loading type with presettable initial value, to be loaded to an input/output (I/O) port from a central processing unit (CPU). The CPU enables the image editing by presetting, according to coordinate information instructed from the operation unit, addresses corresponding to the main scanning coordinate to said counters each time the subsidiary scanning reaches a lines corresponding to the trimming coordinates.

There are further provided a coordinate area control counter and a gate circuit for realizing the white masking, black masking, white frame trimming and black frame trimming modes.

There is further provided a junction detecting shift register for automatic junction correction for the CCD's. A synthesizer unit 605 switches the image signals from the image editing units 604, 604' for obtaining continuous serial image signals.

An original detecting unit 606 executes a pre-scanning of the original during the drum prerotation step of the printer after the copy key is actuated, thereby detecting the coordinates of the position of the original, and comprises a shift register for detecting 8 consecutive white bits, an I/O port and a main/subsidiary scanning counter.

An operation unit 607 comprises a key matrix, LED display units, liquid crystal display units and liquid crystal drivers. There are further shown a DC motor 608 for driving the optical system; a driving circuit 609 therefor; a fluorescent lamp 610 for illuminating the original; a driving circuit 611 therefor; a photosensor 612 for detecting that the optical unit is at a home position; and a photosensor 613 for detecting that said optical unit is in a position for illuminating the leading end of the original. The CPU 614 comprises a microprocessor, a ROM, a RAM, a battery back-up circuit, a timer circuit and an I/O interface.

The CPU 614 controls the operation unit 607, and, in response to the instructions from the operator, executes the sequence control of the reader and simultaneously releases commands and image signals for controlling the printer. Besides, in response to the instructions for image processing from the operation unit 607, the CPU executes data setting in the various counters of the image processing units 602, 602' and the image editing units 604, 604' prior to or during the original scanning operation. Furthermore the CPU controls, prior to the original scanning operation, the fluorescent lamp driving circuit 611 according to the light intensity data from the image processing unit, sets the speed of the DC motor driving circuit 609 according to the instruction of image size ratio, and calculates the image junction from the data obtained from the image editing units 604, 604'.

Figures 1, 6A:
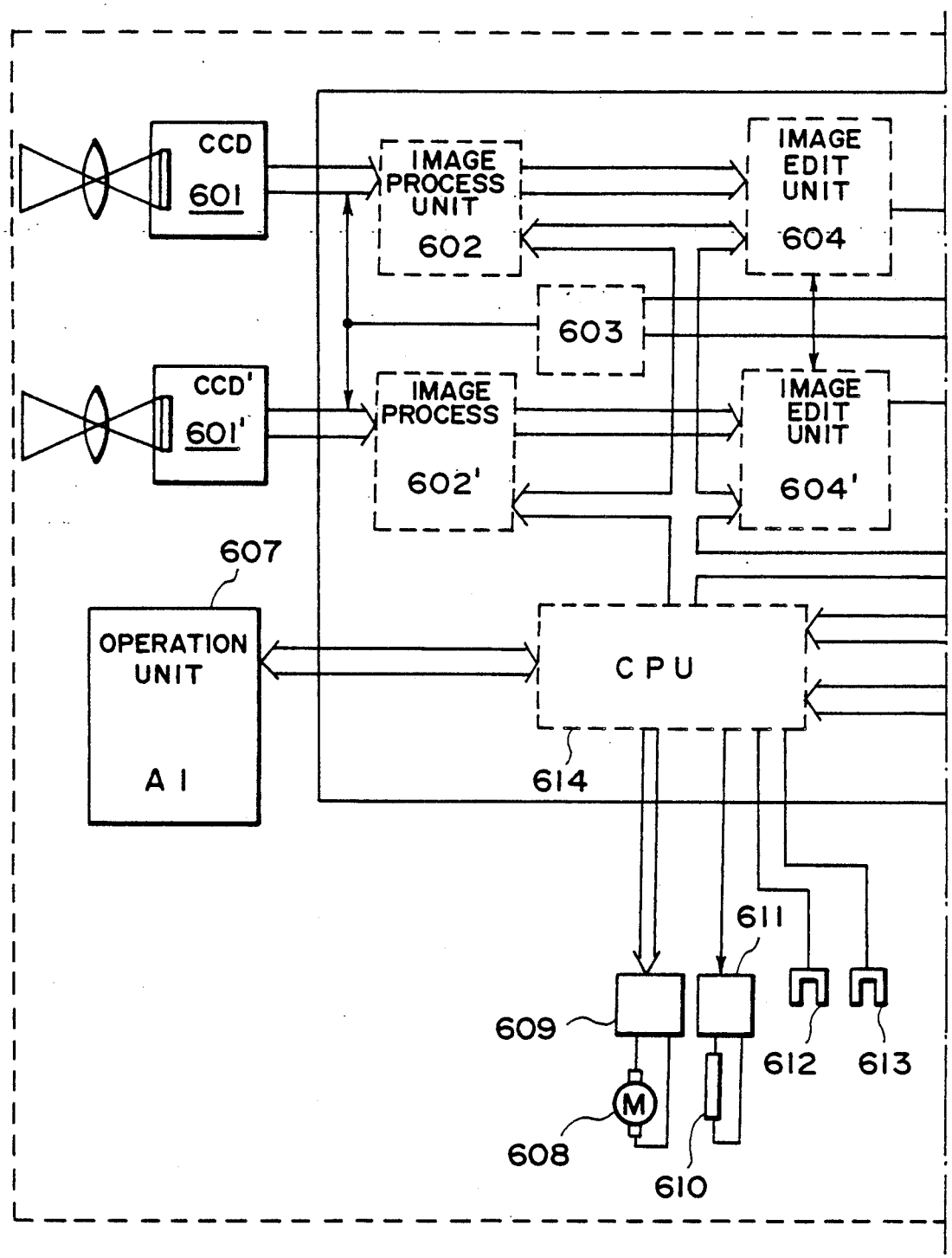
FIG. 6A shows how
Figures 2, 6A:
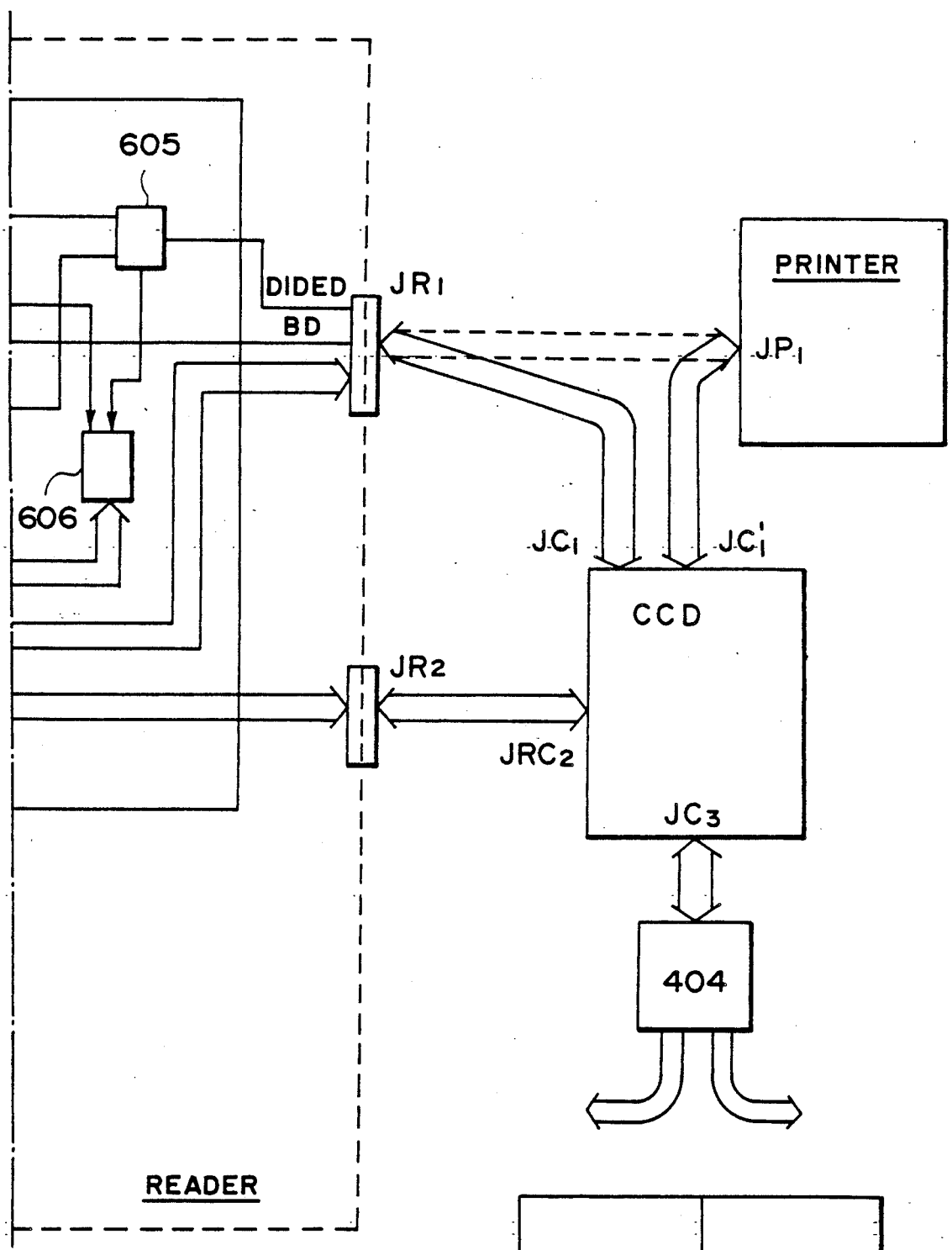
Figure 6A:
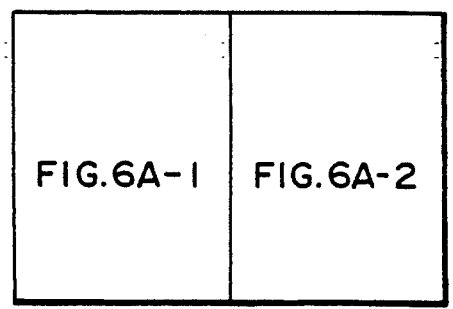
Figure 6B:
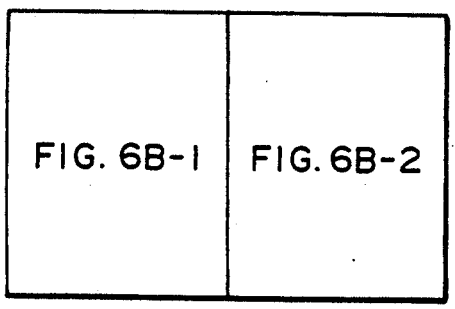
FIG. 6B shows how
Figures 1, 6B:
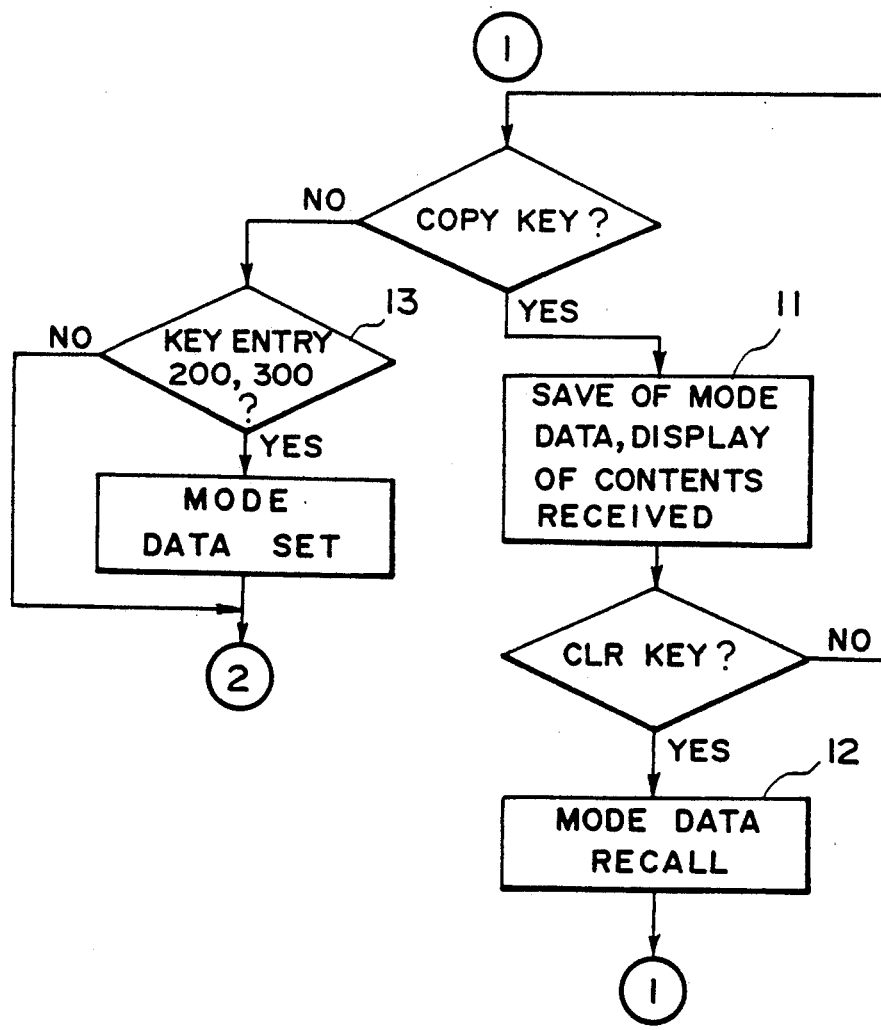
Figures 2, 6B:
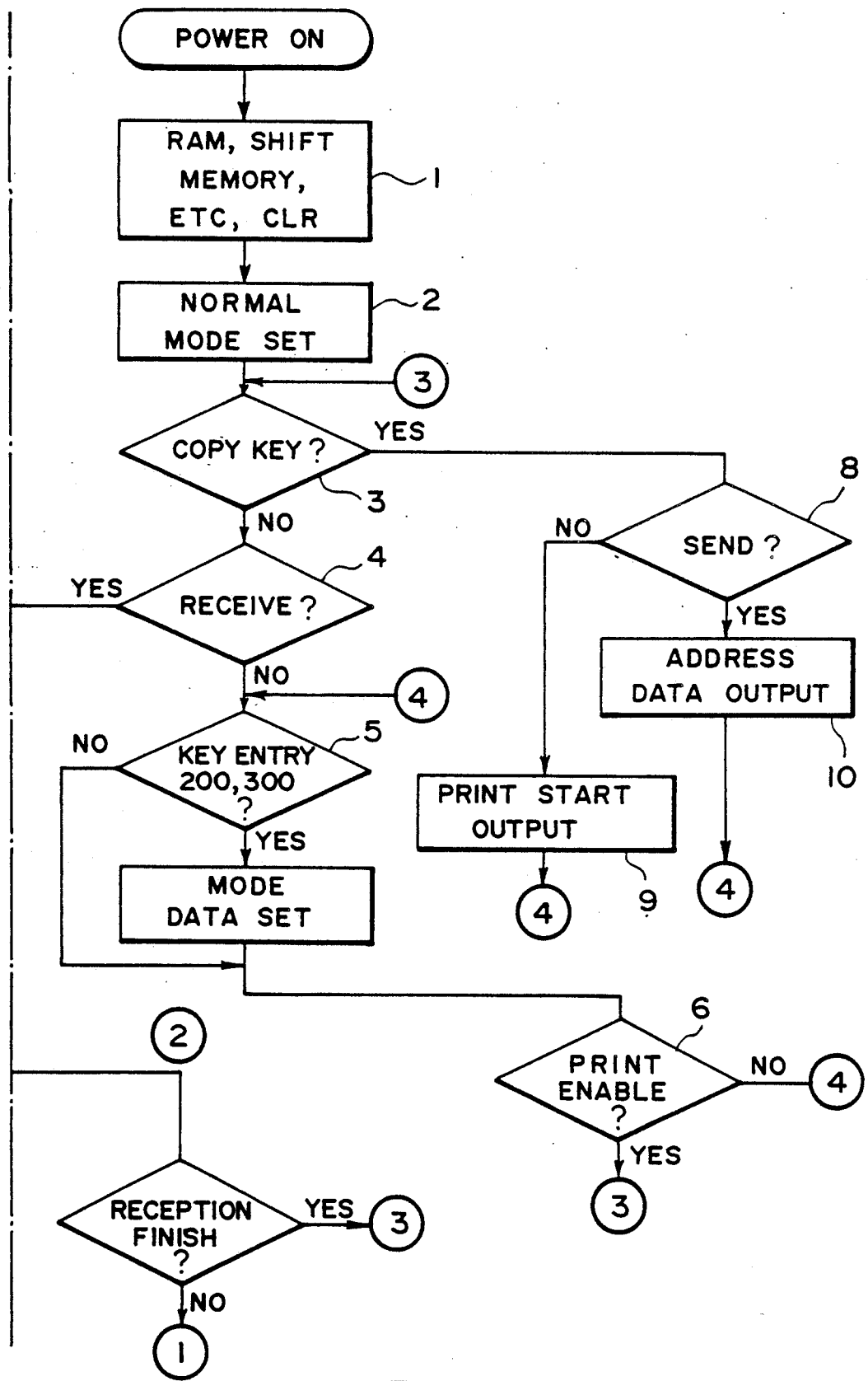

FIGS. 6B-1 and 6B-2 show a flow chart for controlling key operations in the operation unit 607 by the CPU 614. In response to the turning on of a power switch of the reader, there are conducted the resetting of shift registers, RAM etc., setting of data indicating a mode for equal size copying, without editing, without image inversion and without transmission into a memory of the liquid crystal display unit 202, and setting of data selecting the lower cassette, a character original and a single copying, corresponding to the standard mode. This procedure is executed also when the interruption key 110 or reset key 301 is actuated. Then a step 3 identifies the actuation of the copy key, and, if negative, a step 4 identifies whether the reception mode is selected. If the result is negative the program proceeds to an entry routine (5) for the operation blocks 200, 300. After the setting and registration of mode and data by said blocks 200, 300, a step 6 identifies whether the printer is ready for copying operation, and, if affirmative, the program proceeds to a copy key routine. If the copy key is actuated, a step 8 identifies whether the transmission mode is selected by a program key or a preset key, and, if negative, a step 9 is executed to supply the print start signal to the CCU. If the transmission mode is selected, a step 10 is executed to supply the CCU with data necessary for transmission, such as the address data.

In the reception mode, the transmission and the copying operation are prohibited even when the copy key is actuated. The mode data display is diverted into a certain area in the memory, and the display unit 202 instead displays the received data in a step 11. Upon actuation of the clear key, a step 12 is executed to revive said mode data display. Prior to the actuation of the copy key, key entries from the blocks 200, 300 and corrections thereof are enabled in a step 13. Upon completion of the reception in a step 14, the program proceeds to the copy key routine in the step 3 thereby enabling the copying operation. In case the cancel key 111 is actuated in the step 13, the program proceeds, after a determined time, to the step 3, thus interrupting the reception. When the clear key is actuated in the step 13, numeral data are cleared but mode data entered by program keys are not reset. The actuation of the key 301 performs the resetting to the standard mode.

Figure 7A:
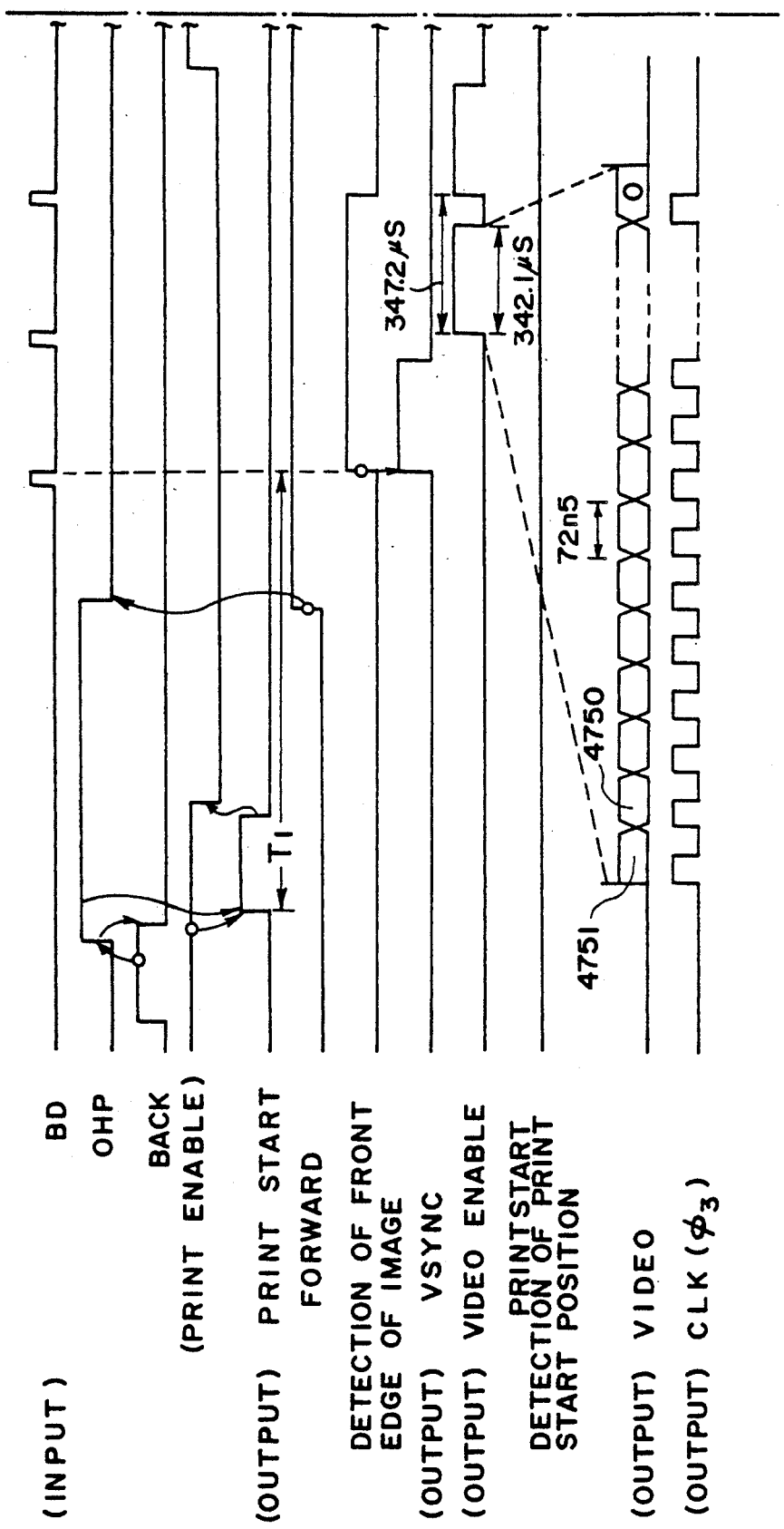
Figure 7B:
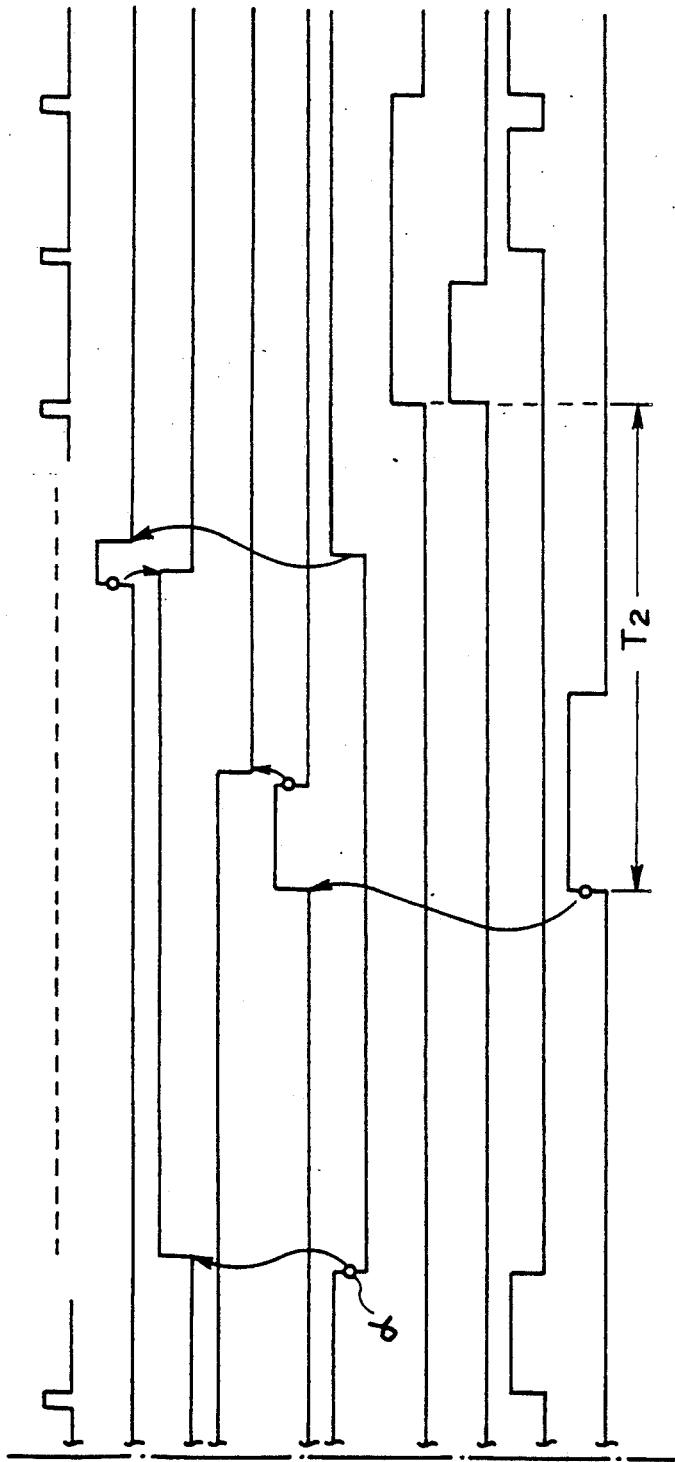
Figure 9:
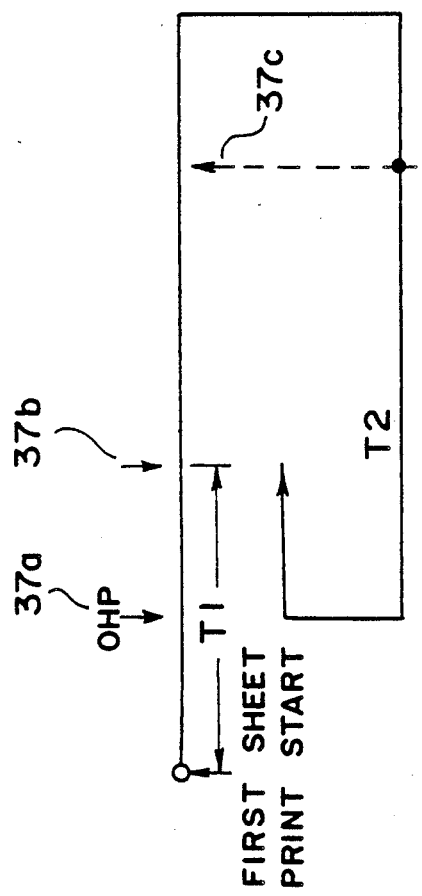

The sequence control procedure is now explained with reference to FIGS. 7A and 7B and 9. As shown in FIG. 9, three position sensors 37a-37c are arranged on the scanning optical system of the reader. As viewed from the front side of the reader, an optical system home position sensor (for producing a signal OHP) is at the leftmost position where the optical system is normally stopped. When the reader is driven, the optical system starts scanning motion from left to right. An image leading end sensor 37b is arranged at a reference position SP of the image. In response to a signal from the sensor 37b, the control circuit releases the image signals VIDEO, CLK in synchronization with the signal BD and the signal VIDEO ENABLE indicating an effective signal period in each main scanning cycle (347.2 microseconds). In the first line, however, said signal VIDEO ENABLE is not produced since the CCD signals are stored in the shift memory. In response to the signal from the sensor 37b, the control circuit starts to count the number of said VIDEO ENABLE signals, and, when the count reaches a count α corresponding to a coordinate obtained by detecting the position of the original, the control circuit terminates an optical system forward driving signal and releases a backward driving signal, thereby reversing the optical system. At this point, the control circuit identifies if the optical system has made scanning cycles of a set copy number, and, if not, releases the print start signal for instructing a next paper feed to the printer The position of the sensor 37c should be so adjusted that T2 and T1 in FIG. 9 are mutually equal.

Image magnification/reduction

The method for image magnification or reduction will now be explained, with reference to FIGS. 10D-1 to 10D-3. A change in image size in the sub-scanning direction is basically achieved through the variation of the speed of the DC servo motor 37d. The CPU calculates the speed based on an entered image magnification ratio, also calculates a PLL frequency corresponding to the speed and presets it in an I/O latch (1) 58 prior to the scanning operation. During the reverse motion, a fixed value is set so as to reverse the optical system at a high speed. It is done by presetting a value stored in the ROM of the CPU to the I/O latch (1). Thus, the speed for an image magnification ratio of 2 times is equal to a half of that for the equal size copying (180 mm/sec), and the speed for an image magnification ratio of ½ times is equal to twice of the above-mentioned speed. The main scanning is carried out by sampling, at a clock rate determined by the image magnification ratio, the CCD serial signals of a fixed frequency after the A/D conversion. For example, if the image magnification ratio is 2, the serial signals are sampled at a clock rate which is equal to twice of the CCD clock rate so that the resulting signals include one additional bit for each bit, and if the image magnification ratio is ½, the serial signals are sampled at a clock rate which is equal to a half of the CCD clock rate so that every other bit in said signals is omitted. The CPU calculates the clock rate based on the designated image magnification ratio and sets it in an I/O latch (2) 50 prior to the sub-scanning operation. As described above, each CCD has 2688 bits, of which 96 bits are dummy bits and 2592 bits are effective bits. Driving signals of a frequency of 7.75 MHz are supplied through a $\emptyset 1$ clock line 55. Clock signals $\emptyset 2$ for the image size modification are generated by synchronizing the clock signals from the same source as that of the clock signals $\emptyset 1$ with a frequency generated by a VCO (9) based on the content of the I/O latch (2), through a PLL 48 to produce a variable frequency. The 2592-bit analog signals from the CCD are amplified by an amplifier AMP 42, the output signals of which are A/D-converted by the A/D converter 44 into 6-bit parallel digital image signals. A dither ROM 54 is so designed as to provide weighted 6-bit codes at an interval of 8 bits both in the main scanning direction and in the sub-scanning direction, and 32 different weight codes are assigned in a matrix of $8 \times 8 = 64$ bits thus formed. Thus, one of the different weighted codes is obtained by addressing the dither ROM 54 by a 3-bit main scanning counter 51 and a 3-bit sub-scanning counter 52. There are provided plural sets of weighted codes in the $8 \times 8$ matrix, so that the reproducibility of a halftone image can be modified by the use of different sets. The selection of the sets is made by an I/O latch (3) 53, of which presetting is done by the CPU prior to the sub-scanning operation. The main scan counter 51 is driven by the $\emptyset 2$ clock signals of a variable frequency depending on the image magnification ratio, and the sub-scanning counter 52 is driven by the beam detection signal. The 6-bit weighted code from the dither ROM 54 and the A/D converted 6-bit code are compared by a comparator 47 to produce digital serial image signals capable of halftone reproduction. Thus, the sampling at different clock rates means that the A/D-converted code is compared with the weighted code produced at the clock rate $\emptyset 2$ which is different from the clock rate $\emptyset 1$ of the A/D conversion. If the comparison is made at the same clock rate as the clock rate $\emptyset 1$ and the image magnification or reduction is made by simply adding or eliminating the bits in accordance with a predetermined algorithm, the result will be acceptable for a usual binary digital image, but smooth reproduction is not attainable in a dither-processed halftone image, since 45° dither pattern may be changed to a 30° or 60° pattern or a stepwise combination thereof. Accordingly, in the present embodiment, the clock rate of the comparator is rendered variable in accordance with the image magnification ratio.

In a circuit 45, the output of the A/D converter 44 is latched at $\emptyset 1$ for synchronization because the conversion time by the A/D converter 44 varies from bit to bit. A write address counter 63 for shift memories 57-1, 57-2 is naturally driven by the clock signals $\emptyset 2$. Thus, the shift memories 57-1, 57-2 receive 2592 bits when the image magnification ratio is unity, or 1296 bits when said ratio is ½ or 5184 bits when said ratio is two. The shift memories thus require a two-line capacity for accommodating not only 2592 bits of the CCD but also the bits added for the image magnification. As the image signals are stored in the shift memories after the magnification process and dither process, the exact data in the memories can afterwards be supplied to the laser driver of the printer in accordance with the printer speed.

The speed of the sub-scanning DC motor 37d is controlled by supplying the present content of the I/O latch (1) 58 to a VCO 59, synchronizing the oscillation frequency of the VCO 59 with a source oscillator frequency by a PLL 60, and supplying the output of the PLL 60 to a servo circuit 61. The sub-scanning stroke in the image magnification/reduction mode may be extended to the third point (431.8 mm) for any image magnification ratio, and this is convenient for the automatic area designation mode in which the image magnification ratio is continuously variable.

CCD junction correction

A method for automatically jointing two CCD's in the main scanning direction will now be explained.

Figure 11:
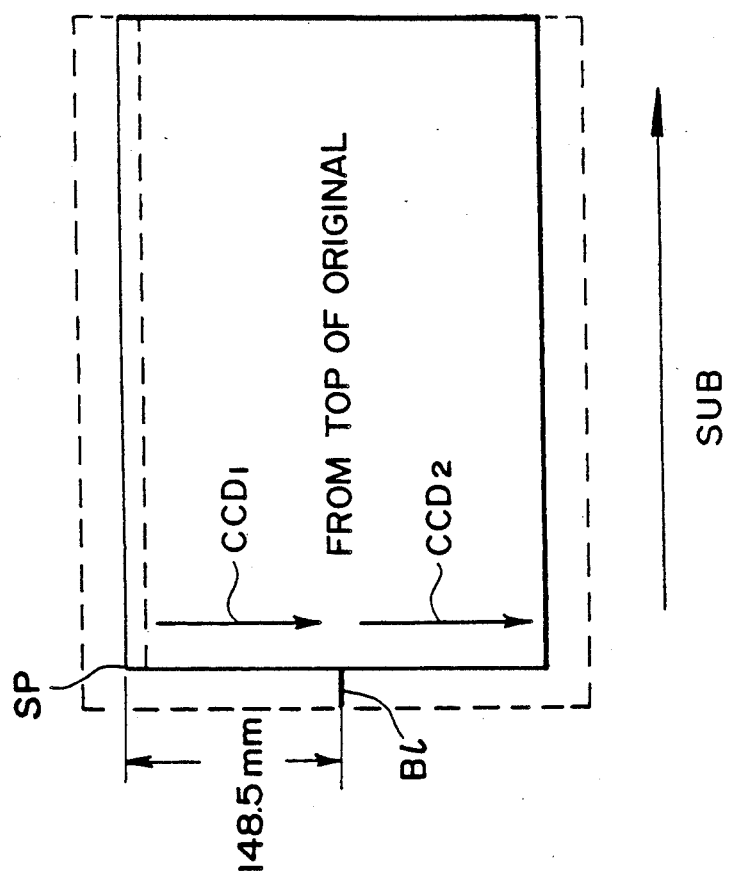
FIGS. 11 and 12 are schematic views showing the method of correction for CCD junctions.
Figure 12:
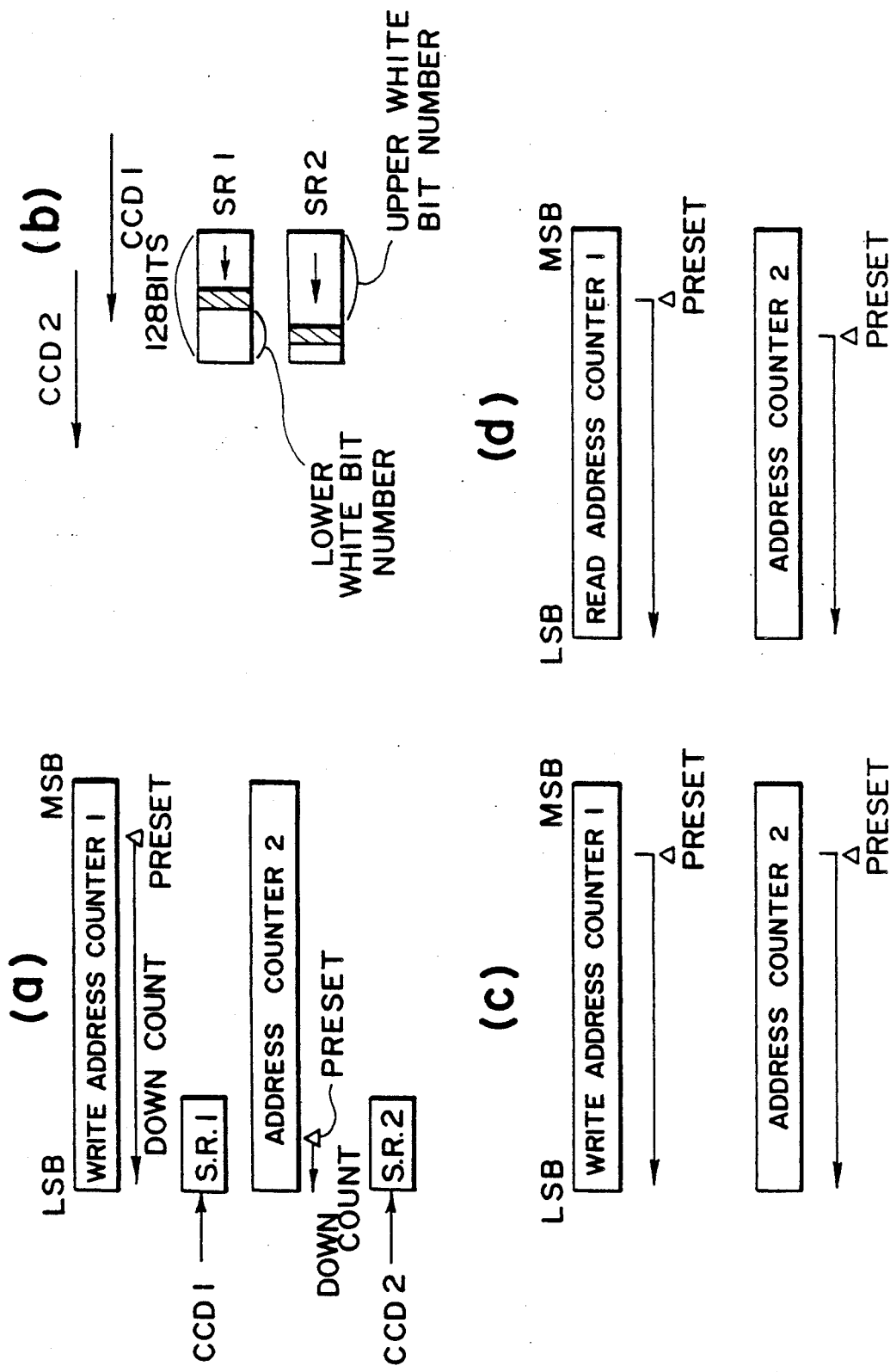

Referring to FIG. 11, a white plate is arranged to cover the main scanning width on the home position, above the switch 37a, of the optical system so that the white plate is illuminated when the optical system is at the home position and the light source is turned on. Thus, when the optical system is at the home position, the control circuit corrects the fluctuation of the light intensity and the fluctuation of the sensitivity of two CCD's (shading correction).

A black narrow line B1 of 2 mm in width extends in the sub-scanning direction at the center of the white plate, for the purpose of junction correction. The narrow line may be of any width which is a multiple of the digitizing width. When the optical system is at the home position and the light source is turned on, said black narrow line appears on the bits near the edges of two CCD's. The resulting CCD signals are supplied to the shift memories, and the lower 128 bits of the CCD1 signals are compared with the higher 128 bits of the CCD2 signals. Said 128-bit data must have white bits in the beginning and at the end, with black bits therebetween. The number of bits equal to the sum of the number of lower white bits in the CCD1 signals and the number higher white bits and of black bits in the CCD2 signals is eliminated when the signals are read out of the CCD2 shift memory. In FIG. 11, arrows "CCD" indicate the main scanning direction, and an arrow "SUB" indicates the sub-scanning direction.

FIGS. 12 and 13A to 13D illustrate a specific method. In order to write the image signals into the shift memories 57-1, 57-2 composed of static RAM's, there are provided a write address counter 63 and read address counters 64, 65. The quantity of information supplied to the memories from the CCD's changes in accordance with the image magnification ratio. In the present embodiment, therefore, the write address counter (1) for the CCD1 counts, upwards from the least significant bit, by the input clock signals $\emptyset 2$, the number of pixels in the CCD scanning, and the final count is stored in the RAM of the CPU. When the image magnification ratio is equal to unity, the final count should be 2592. In order to extract the lower 8 bits of the CCD1 signals (first bit which appears in the main scanning being most significant bit) and the higher 8 bits of the CCD2 signals, the aforementioned count is set in the write address counter 63 for the CCD1 while 08H (H indicating a hexadecimal code) is set in the address counter 65 of the CCD2, and a countdown mode is designated. 8-bit shift registers for receiving the image signals from the respective CCD's are provided. The shift registers are driven for a period starting from the rise of the VIDEO ENABLE signal, representing the main scanning period of the CCD's, to a ripple carry of the counter, which is driven by the clock signals generated during the VIDEO ENABLE period. Thus, the lower 8 bits of the CCD1 image signals remain in the CCD1 shift register and the higher 8 bits of the CCD2 image signals remain in the CCD2 shift register, after the first scanning. The contents of said shift registers are read by the CPU 36 and stored in the RAM. Then, in order to extract the lower 9th to 16th bits of the CCD1 signals and the higher 9th to 16th bits of the CCD2 signals, the aforementioned count 8 is set in the write address counter 63 for the CCD1 while 10H is set in the address counter 65 for the CCD2, and the above-mentioned operations are repeated for each of sixteen scannings to develop the higher 128 bits of the CCD1 signals and the lower 128 bits of the CCD2 signals in the memories. Then, the number of black bits, the number of lower white bits of the CCD1 signals and the number of higher white bits of the CCD2 signals are calculated. The number of junction bits, or the number of bits equal to the sum of the number of lower white bits of the CCD1, the number of higher white bits of the CCD and the number of black bits of the CCD2 is eliminated when the image signals are read from the CCD2 shift memory. In this manner the jointing in the main scanning direction is attained (cf. FIGS. 12a and 12b).

The function of the shift memories after the jointing operation will now be explained. When the image signals are to be written into the shift memories, the aforementioned count is preset in the CCD1 and CCD2 write address counters 63, and the shift memories are addressed by counting down the address counter. This procedure is shown in FIG. 12c.

Figure 21:
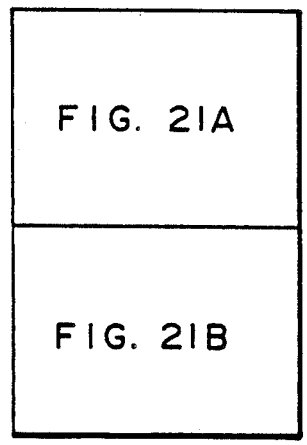
FIGS. 21A, 21B and 21 are a circuit diagram showing an example of the circuit in FIG. 6A.
Figure 22:
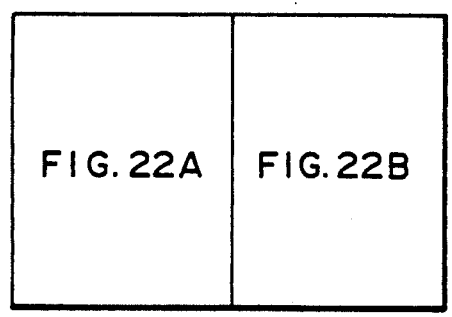
FIGS. 22A, 22B and 22 are a circuit diagram of a printer.
Figures 2, 10D:
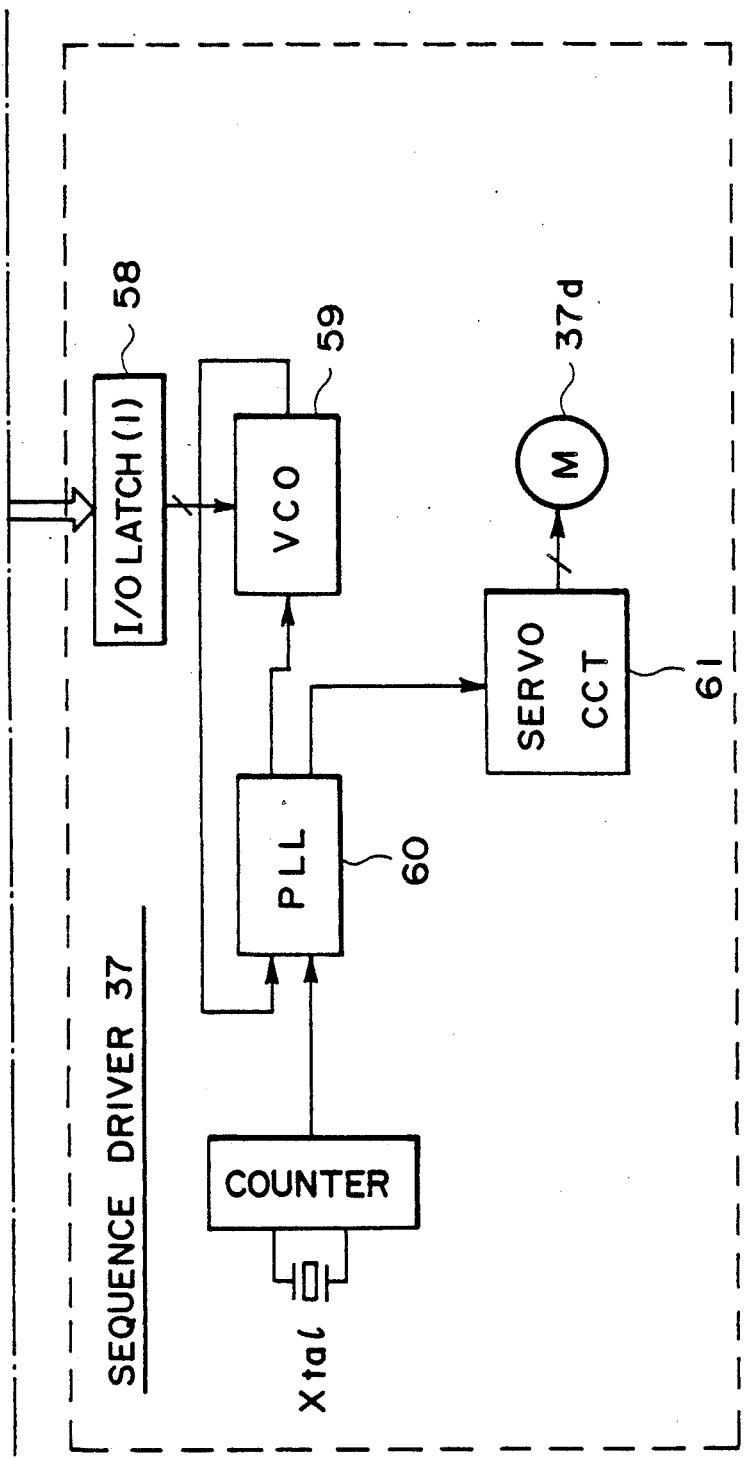

What is to be first considered at the image signal readout from the shift memories is the reference of the main scanning direction for the original. As shown in FIG. 11, a reference point SP for placing the original is positioned 148.5 mm off the center of the black narrow line (1.5 mm in width) for CCD jointing. Thus, the start address A1 for reading the CCD1 shift memory is given by [(the number of lower white bits)+(the number of black bits)/2+148.5×16]×image magnification ratio. The start address for reading the CCD2 shift memory is given by [(the final count)−(the number of junction bits)]×image magnification ratio. The CCD1 read address counter (1) is counted down by 4752 read clock signals $\emptyset 3$ of 13.89 MHz, and, when a ripple carry is produced at zero count, the CCD2 address counter (2) is counted down to read out the image signals from the shift memory. This procedure is shown in FIG. 15d. In this manner, continuous image signals (video signals) of a line are transmitted to the printer. As shown in FIG. 21, the writing to and reading from the memory can be continuously made by writing signals of a next line to the memories 57-3 and 57-4 while the signals are read from the memories 57-1 and 57-2, and further writing signals of a next line to the memories 57-1 and 57-2 while the signals are read from the memories 57-3 and 57-4.

FIGS. 13A to 13D show a circuit relating to the above-described shift memories, wherein shown are a static shift memory (1) for storing the CCD1 image signals; a static shift memory (2) for storing the CCD2 image signals; a write address counter 63 for writing signals into the shift memories (1) and (2); a read address counter (1) for reading signals from the shift memory (1); an address counter (2) for reading signals from the shift memory (2); an address selector (1) for selecting either the address signal from the write address counter 63 and the address signal from the read address counter (1) to address the shift memory (1); an address selector (2) for selecting either of the address signal from the write address counter 63 and the address signal of the address counter (2) to address the shift memory (2); a shift register 74 for taking out the CCD1 image signals, 8 bits at a time, starting from the least significant bit; a shift register 76 for taking out the CCD2 image signals, 8 bits at a time, starting from the most significant bit; a flip flop 73 to be set by the rise of the video enable signal and reset by the ripple carry of the write address counter 63, and used for controlling the input period of the shift register 74; a flip-flop 75 to be set by the rise of the video enable signal and reset by the ripple carry of the read address counter (2), and used for controlling the input period of the shift register 76; an I/O port 72 for conveying the count of the write address counter 63 after it has been counted up, to the CPU; I/O counters 66–69 for supplying preset counts from the CPU respectively to the write address counter 63 and the read address counters 64, 65; an I/O register 68 for designating either the count-up or countdown mode of the write address counter 63 and the address counter 65, for designating the selection of the counts of the address selectors 70 and 71, for selecting either the write or read clock signals for the address counter (2), and for supplying the CPU with a signal TEST for jointing, in response to which the CPU drives the CCD's, while the optical system is stopped, thus supplying image signals of a line to the shift memories through the CCD driver 33.

Now reference is made to the circuit diagram shown in FIGS. 13A to 13D, for explaining the operation of extracting the CCD1 image signals, 8 bits at a time, starting from the least significant bit and extracting the CCD2 image signals, 8 bits at a time, starting from the most significant bit, thereby extracting 128 bits for jointing the images.

[1] At first the CPU sets the write address counter 63 to the count-up mode and sets "0" in the I/O register (1). [2] A pulse is given as the signal TEST (corresponding to the machine start) to the I/O register (4) whereby the CCD driver shown in FIG. 10 generates the signal VIDEO ENABLE and the clock signals $\phi 2$ in accordance with the image magnification ratio to supply the image signals to the shift memory. [3] The CPU reads the content of the write address counter 63 through the I/O port. [4] The write address counter 63 is set to the countdown mode and the address counter (2) is set to the countdown mode. The count stored in the step [3] is preset into the I/O register (1), and 7H is preset into the I/O register (3). [5] A signal TEST pulse is generated, and when the signal VIDEO ENABLE is terminated, the 8 bits of the shift registers 74 and 76 are read in succession into the memory. [6] The count 7H stored in the step [3] is set into the I/O register (1) and 10H is set into the I/O register (2). [7] The step [5] is repeated. [8] The count 77H stored in the step [3] is set into the I/O register (1) while 7FH is set into the I/O register (2), and a signal TEST is issued to read the contents of the shift registers 74, 76. The junction correction procedure is described in detail in the Japanese patent application No. 128073/1982 filed by the present applicant.

Image trimming, shifting and magnification/reduction

Figure 15C:
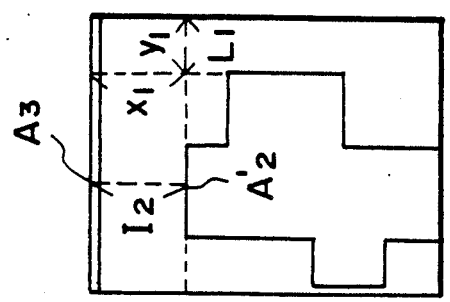
FIGS. 15A to 15F and 15H to 15M are schematic views showing the image conversion control.
Figure 15B:
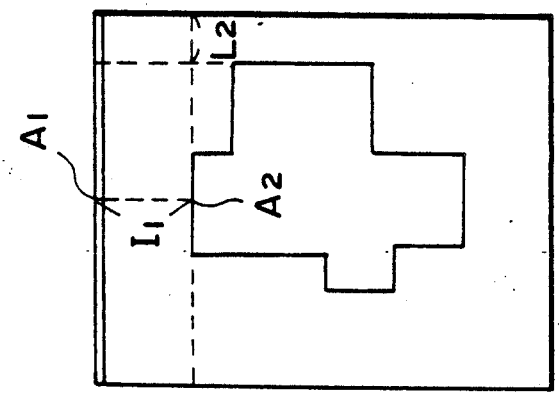
Figure 15A:
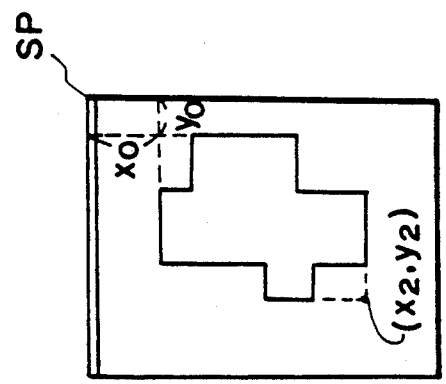
Figure 15F:
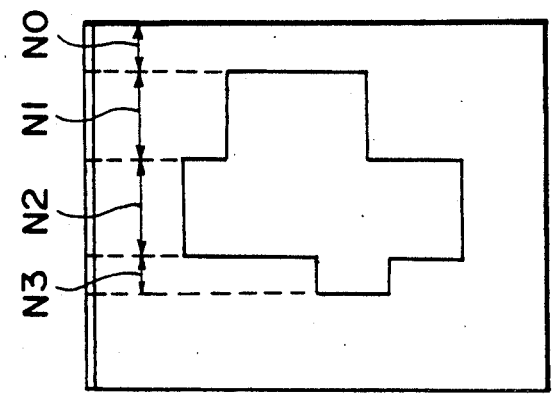
Figure 15E:
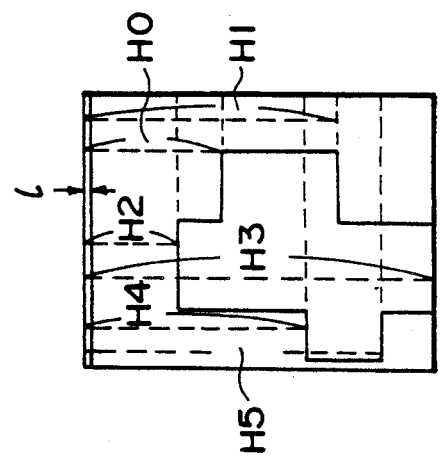
Figure 15D:
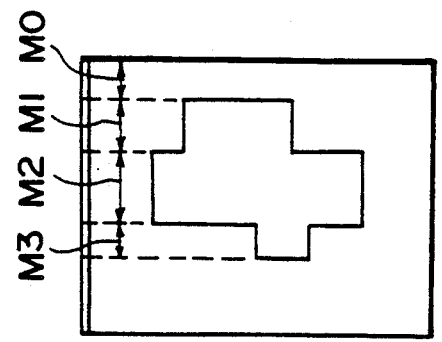

FIGS. 15A to 15M illustrate an image editing method for magnifying or reducing a trimmed image at a desired scale with reference to an arbitrary point, wherein FIG. 15A shows an original image, FIG. 15B shows an enlarged image and FIG. 15C shows a shifted image. The basic procedure for image editing is to calculate coordinates after the edition based on the coordinates of a trimming area, image moving coordinates and image magnification ratio.

The procedure will be explained below. At first the CPU determines minimum coordinates $x_0$, $y_0$ (relative to the reference point SP for placing the original) of the trimming area coordinates, where x indicates coordinates in the main scanning direction and y indicates coordinates in the sub-scanning direction. The coordinates are entered by numeral keys in the unit of millimeter. As the resolving power is 16 lines/mm, the number of lines L0 of the $y_0$ coordinate is $y_0 \times 16$, and the amount of information I0 of the $x_0$ coordinate is $x_0 \times 16$ (FIG. 15A).

The CPU determines the minimum coordinates $x_1$, $y_1$ from the image moving coordinates after the edition (FIG. 15C).

Then a preset count of the start address for reading is determined based on $x_0$, image magnification ratio and $x_1$ (calculation of address A3 shown in FIG. 15C). This procedure will be explained in more detail with reference to FIG. 15I. $4752 \times 2$ bits are used in the shift memory for the image magnification with a ratio of two. The amount of information I1 of the memory for the simple image magnification is $10 \times$ image magnification ratio $= (x_0 \times$ image magnification ratio $\times 16)$ bits. The address A2 of the shift memory corresponding to the magnification ratio of the trimming coordinate $x_0$ is (A1-I1). Said address A1 is the start address of the memory and is stored in the RAM of the CCD junction correction operation. The number of lines L2 for a magnification ratio corresponding to the coordinate $y_0$ is $L0 \times$ magnification ratio $= y_0 \times$ magnification ratio $\times 16$. Then the start address A3 for reading the shift memory is determined as A2+I2 for shifting the magnified image to $x_1$ and releasing the image signals from that point. I2 represents the amount of information for the shift coordinate $x_1$, and is equal to $x_1 \times 16$. The number of lines L1 of the coordinate $y_1$ is $y_1 \times 16$.

Then a time interval from the generation of the signal PRINT START (paper feed roller drive signal) to the start of the optical system is determined based on $y_0$, the magnification ratio m and $y_1$ (calculation of L3 which is equal to L1-L2). When said difference is equal to $+L3$ (that is, when a larger space is required), the signal START is generated earlier by L3 $\times$ main scanning cycle (347.2 microseconds), than the reference T. When the difference is equal to $-L3$, the signal START is generated later. In this manner, the positioning of the print image in the sub-scanning direction is attained. The signal PRINT START for the first copy is generated by the start key 13a in FIG. 4, and the print start signal for the second and subsequent copies is generated by the switch 37c shown in FIG. 9. In this manner, the start timing of the optical system is controlled. This is attained by the CPU 36 which determines L3 and sends the control signal to the sequence driver 37.

The positioning of the image in the sub-scanning direction may be attained by setting a time between the switch 37b which produces the image signals and VSYNC which starts the registration roller, in accordance with L3.

Figure 15G:
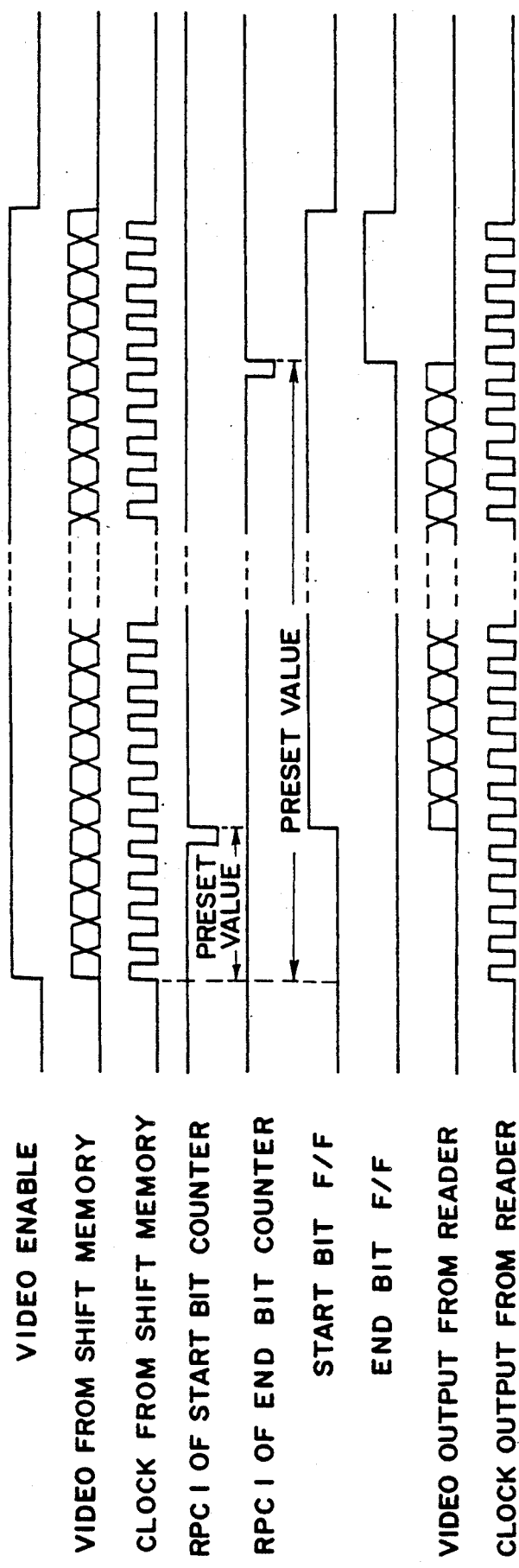
FIG. 15G is a timing chart showing the function of the circuit shown in FIG. 13.

Only a portion of the image signals in the main scanning direction is gated to release the image signals only to the trimming area shown in FIG. 15C. For this purpose, a start bit counter and an end bit counter are provided, respectively corresponding to the counters 80 and 81 in FIG. 13. These counters present the count data for gating through the I/O, for each trimming point. A flip-flop 82 is reset by the count-up of the counter 80 and reset by the counter 81, as shown in FIG. 15G.

Figures 15H, 15I:
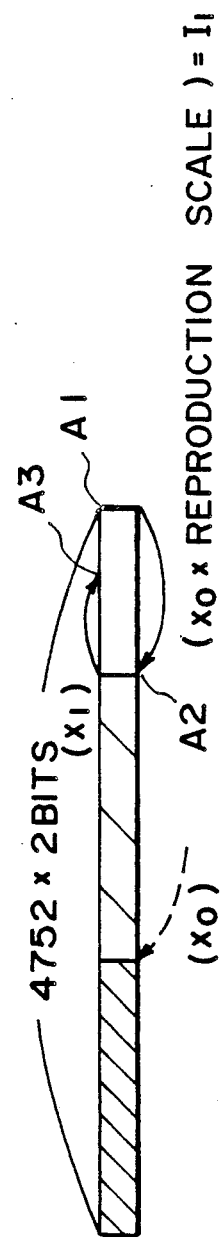

The number of bits in the main scanning direction and the number of lines between transition points in the sub-scanning direction are calculated from the coordinates of the trimming area and the image magnification ratio (FIGS. 15D to 15F), wherein M represents the number of lines between the transition points in the sub-scanning direction, H represents the number of bits in the main scanning direction in the magnification and shift mode, and N represents the number of lines between the transition points in the sub-scanning direction in the magnification mode (N=M $\times$ image magnification ratio), which are all stored in the RAM. H represents the x coordinate after edition and is given by $H = m(h - x_0) + x_1$ where h is the trimming point and m is the image magnification ratio. The CPU calculates the data to be preset in the counters 80 and 81 and stores said data in the RAM in the form of a table as shown in FIG. 15H.

After the start of the readout of the image signals from the shift memory, the CPU counts the signal VIDEO ENABLE and presets 4751 bits in the counters until the count reaches $N_0$ and gates the signals of a line. Thus, the printer does not effect printing operation during this period. After the count $N_0$, the counters are preset to gate the data only during the period between $H_0$-th bit and $H_1$-th bit, and the preset state is maintained until the count $N_1$ is reached. After the count $N_1$, and $H_2$-th and an $H_3$-th bit are preset. The above-described operations are repeated to complete the trimming.

Figure 15J:
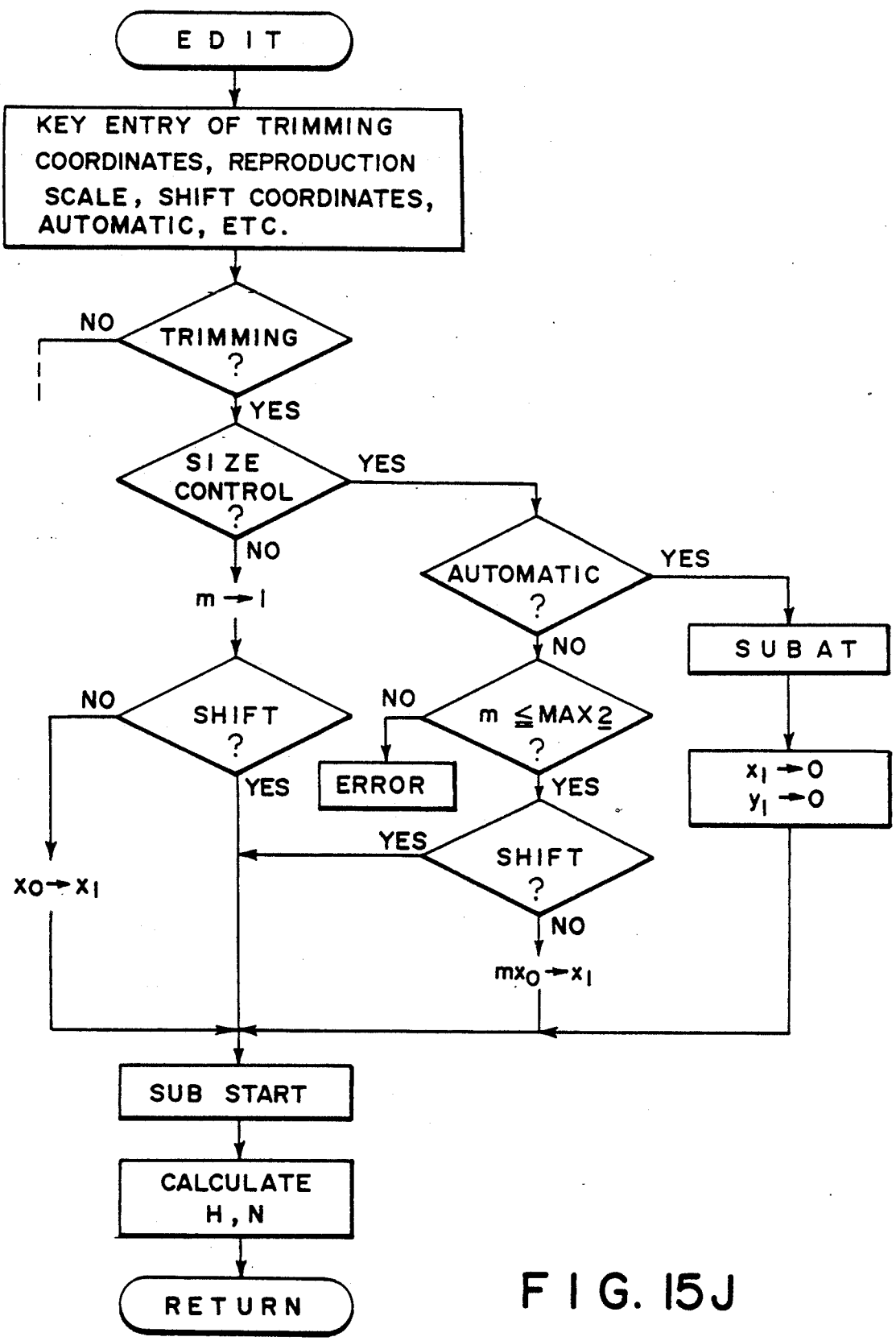
Figure 15K:
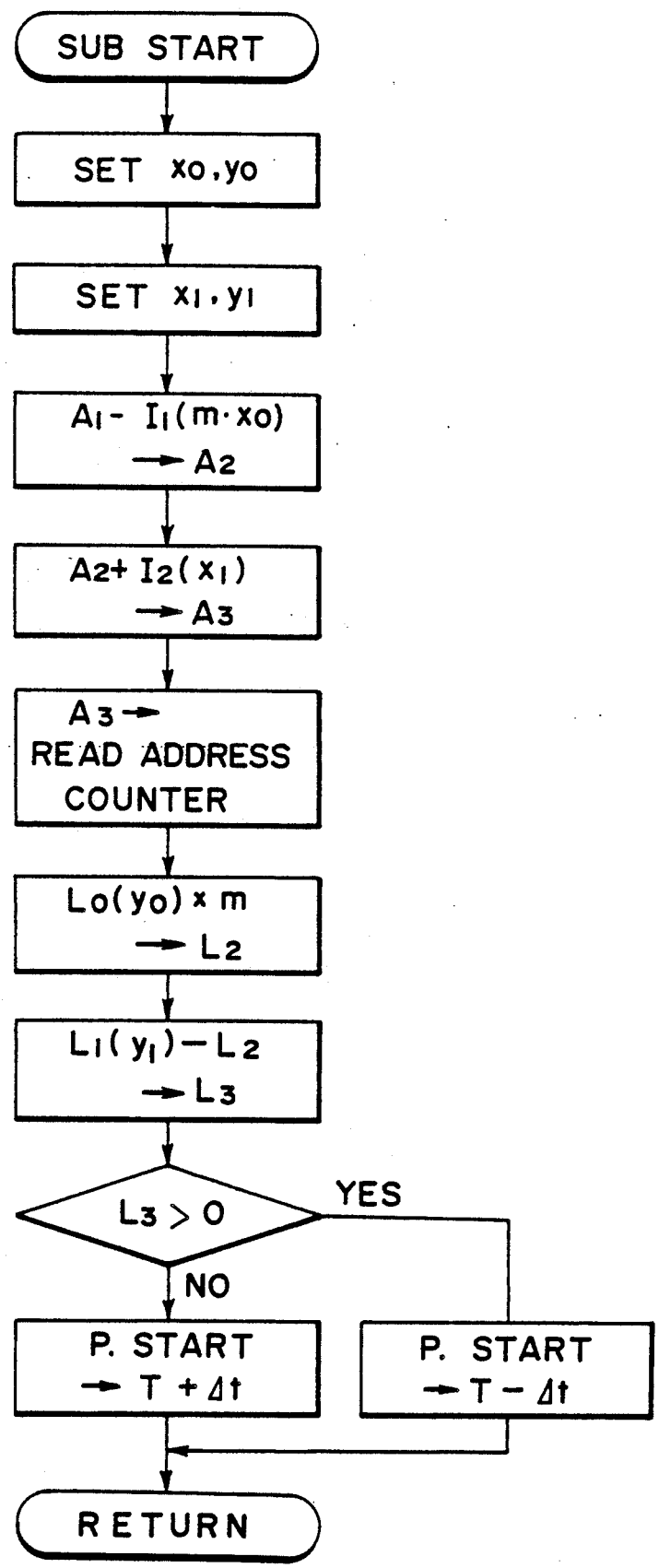

The above-described steps are shown in FIGS. 15J and 15K.

In case the image is to be released over the entire area without trimming, the start bit counter 80 and the end bit counter 81 are used to form a leading margin and a trailing margin. The initialization is same as that described above. After the count of 2 mm × 16 lines = 36 lines corresponding to the leading margin in the sub-scanning direction, the start bit counter 80 is set to 7.5 mm × 16 bits = 120 bits to suppress the printout for the length 1 corresponding to the width of the separating belt.

FIG. 16 shows examples of various image conversions. In FIG. 16a, steps (6) and (7) are carried out by actuating the AUTO key. By depressing the ETC key 9a in FIG. 4, "AUTO KEY" is displayed on the display 10a, and the steps (6) and (7) are carried out by actuating a program key below the display. To this end, the cassette size of the printer B is detected and the size data are sent to the reader A as the status data of FIGS. 20B-1 and 20B-2 so that the CPU automatically selects the image magnification ratio suitable to the cassette size and controls the image magnifying operation with respect to the reference point SP. The vertical or horizontal orientation of the cassette sheet is selected by the image magnification ratio in such a manner that the entire trimmed image can be printed out.

When the ETC key 9a in FIG. 4 is actuating "REDUCTION" is displayed on the display 10a, and a display two series (A3→A4, B4→B5, A4→A5) and (A3→B4, A4→B5, B4→A4) is given instead by actuating a key below the display. By actuating a key below a selected display, a fixed reduction ratio is set. By actuating the ETC key again, "MAGNIFICATION" is displayed, and a display of two series (A4→A3, B5→B4, A5→A4) and (B4→A3, B5→A4, A4→B4) is given. A fixed magnification ratio is set by actuating a program key below a selected display. By actuating the key 9a again, "DESIGNATE MAGNIFICATION/REDUCTION RATIO" is displayed on the display 10a, and a magnification/reduction ratio is designated by the numeral keys. The magnification/reduction ratio can be selected between 2.0 at maximum and 0.5 at minimum relative to the vertical and horizontal dimensions of the original. In case of magnification/reduction designation with trimming, an error is displayed on the display 10a if the trimmed image size after the magnification exceeds the copy sheet size.

Figure 15L:
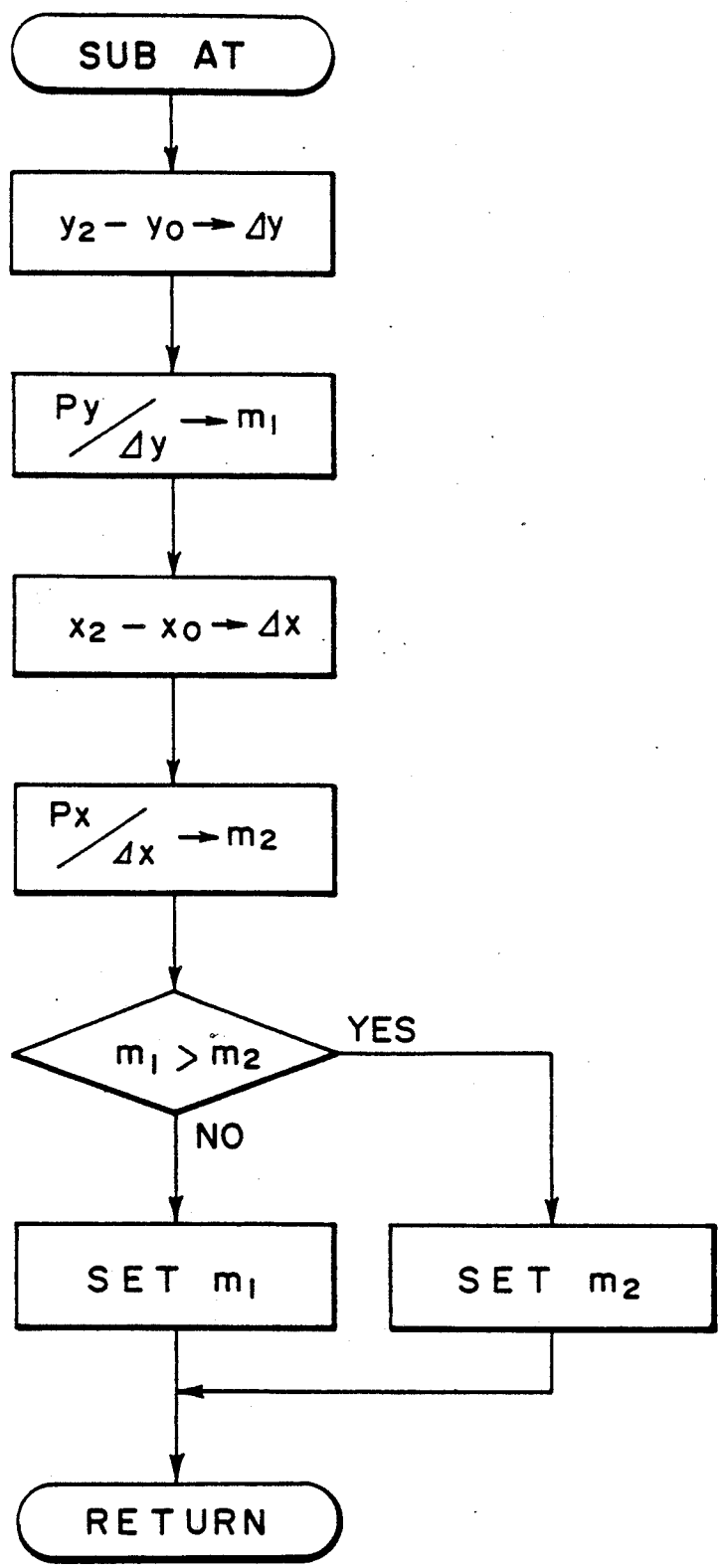

The procedure for the AUTO key is shown in FIG. 15L, in which $(x_0, y_0)$ and $(x_2, y_2)$ represent the trimming points of FIG. 15A. The trimming size is determined by $\Delta x$ and $\Delta y$, and (px, py) of the cassette size is compared with ($\Delta x$, $\Delta y$) to determine the magnification ratios. $m_1$ and $m_2$, and the smaller of $m_1$ and $m_2$ is selected so that the entire trimmed image is printed out on the copy sheet. The automatic corner shifting of the trimming area alone may be carried out by presetting $m = 1$, $x_1 \rightarrow 0$ by the AUTO key in FIG. 15K.

In case of FIG. 15J, an error alram is issured if the magnified image of the designated manual magnification ratio exceeds at least one of the cassette sizes Px and Py.

Even if the trimming is not commanded, the position of the original image on the copy sheet can be shifted to a desired position or the original image can be magnified or reduced at an arbitrary ratio.

The above-described steps are carried out with the help of the control signals from the CPU in FIGS. 6A-1 and 6A-2 and the data latches.

Printer process

Figure 22B:
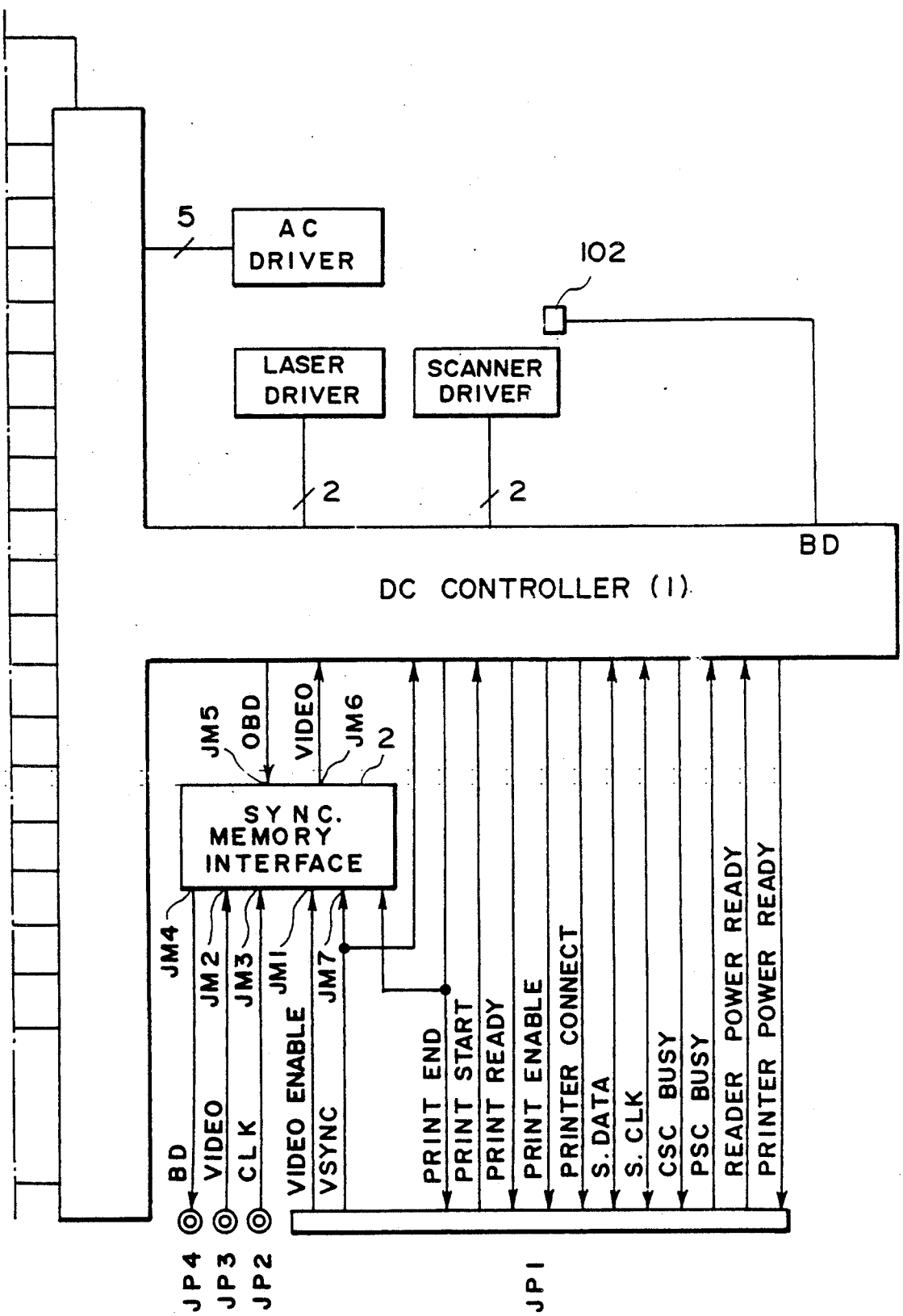
Figure 22A:
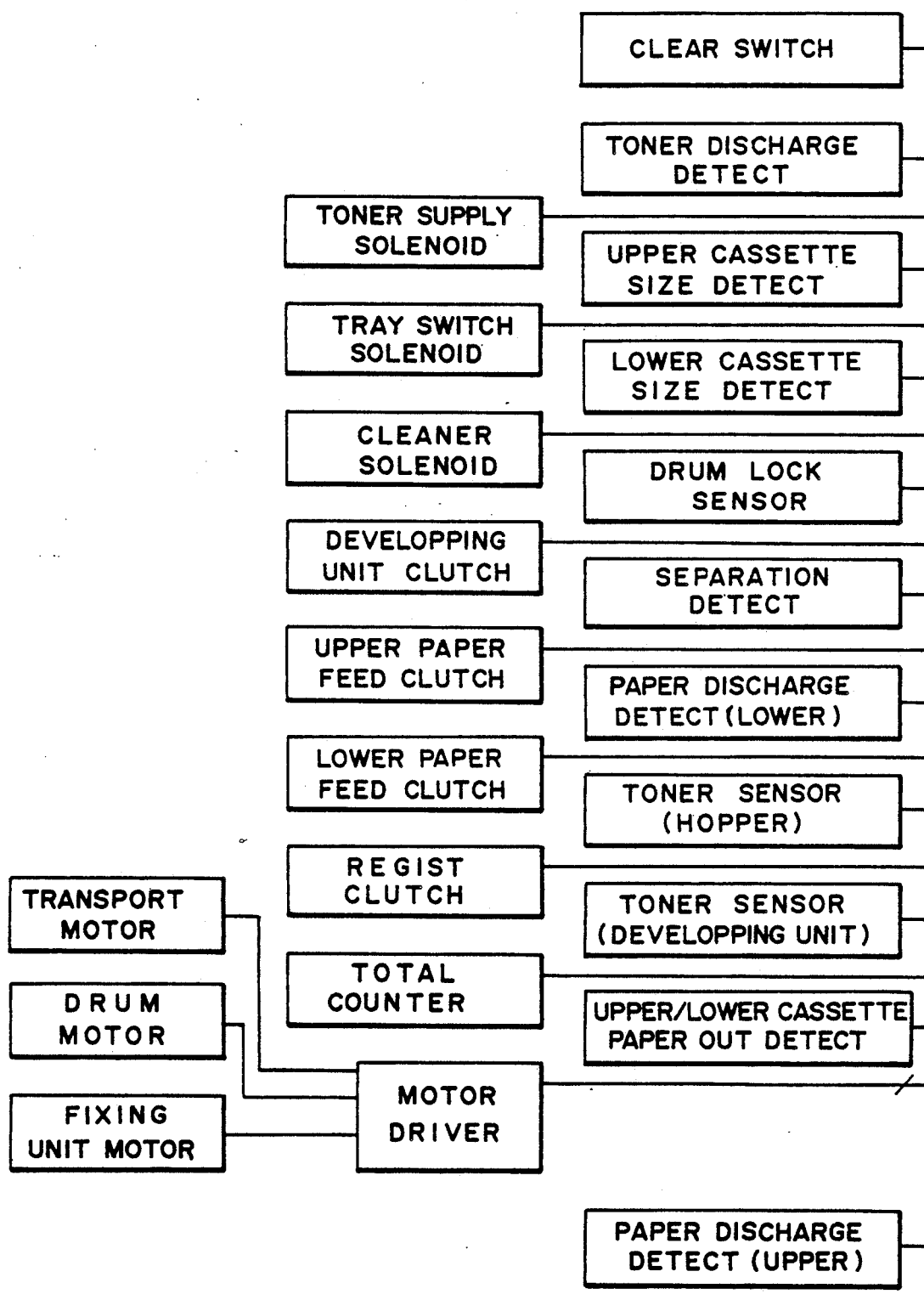
Figure 21B:
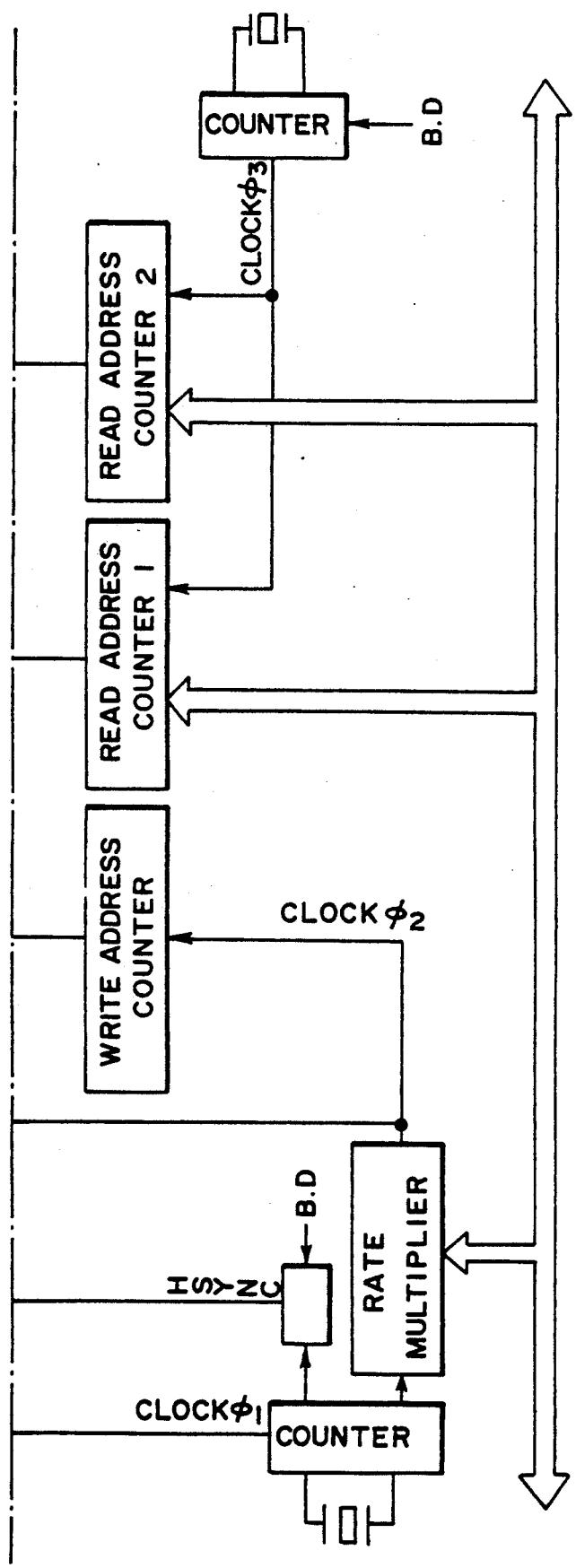

FIGS. 22A and 22B show a circuit block diagram of the printer unit B shown in FIG. 3. The heart of the control of the printer is a DC controller (1) and the CPU therein controls sequences such as feed timing of copy sheet, control communication with the interface module 40a (FIG. 6) when the reader or printer is singly used to communicate with the external unit, controls the start of the laser scanner and detects the beam detect signal BD generated when the laser is activated. The connection with the reader A is done through connectors JP1–JP4. The connectors JP2 and JP3 receive the clock signals CLK of 13.89 MBPS and 4752 bits/line generated by the reader, and the image signals VIDEO. The connector JP4 receives the beam detect signal BD which is supplied from the sensor 102 (FIG. 14B) produced when the laser is activated and the scanner is rotated by the DC controller. The sensor 102 is arranged at 11 mm in front of the copy paper feed reference position, corresponding to the transfer position of the drum. Accordingly, an image can be produced in synchronization with the copy paper by supplying the image signals from the reader to the laser at a timing delayed from the signal BD by a scan period for 11 mm (left margin).

Signals of the connector JP1 include a VIDEO ENABLE signal representing an effective period of the image and clock signals and being released during the release of 4752-bit signals; a VSYNC signal synchronized with the image leading edge sensor 37b of the reader, and being advanced or delayed relative to the center of the image leading edge sensor signal in accordance with the amount of shift when an image shift is commanded, thus indicating the release of the signals VIDEO, CLK and VIDEO ENABLE thereafter. Said signal VSYNC is also supplied to the DC controller to rotate the registration roller in synchronization with VSYNC thereby synchronizing the leading edge of the copy paper with the image signals; a PRINT START signal for starting the paper feed; a PRINT END signal for indicating the end of writing of signals of a line in the printer; a PRINT READY signal for indicating a print ready state (no jamming, peper present and toner present but not indicating a fact that the image signals are immediately receivable; a PRINT ENABLE signal indicating said fact and generated at the end of the pre-rotation (of initial rotation) of the drum for clearing or after the completion of the image transfer; a PRINTER CONNECT signal indicating that the printer is connected; a PRINTER POWER READY signal indicating that power is supplied to the printer and the CPU in the printer has been initialized; a READER POWER READY signal indicating that power is supplied to the reader and the CPU in the reader has been initialized; and protocol communication signals S.DATA, S.CLK,CSC BUSY and PSC BUSY to the reader or the communication module B after the signals PRINTER CONNECT, PRINTER POWER READY and READER POWER READY have been issued. The image signals VIDEO from the reader are supplied in synchronization with the BEAM DETECT signal from the DC controller and with the rotating speed of the scanner to the laser driver through the DC controller.

Shading correction

Figure 10A:
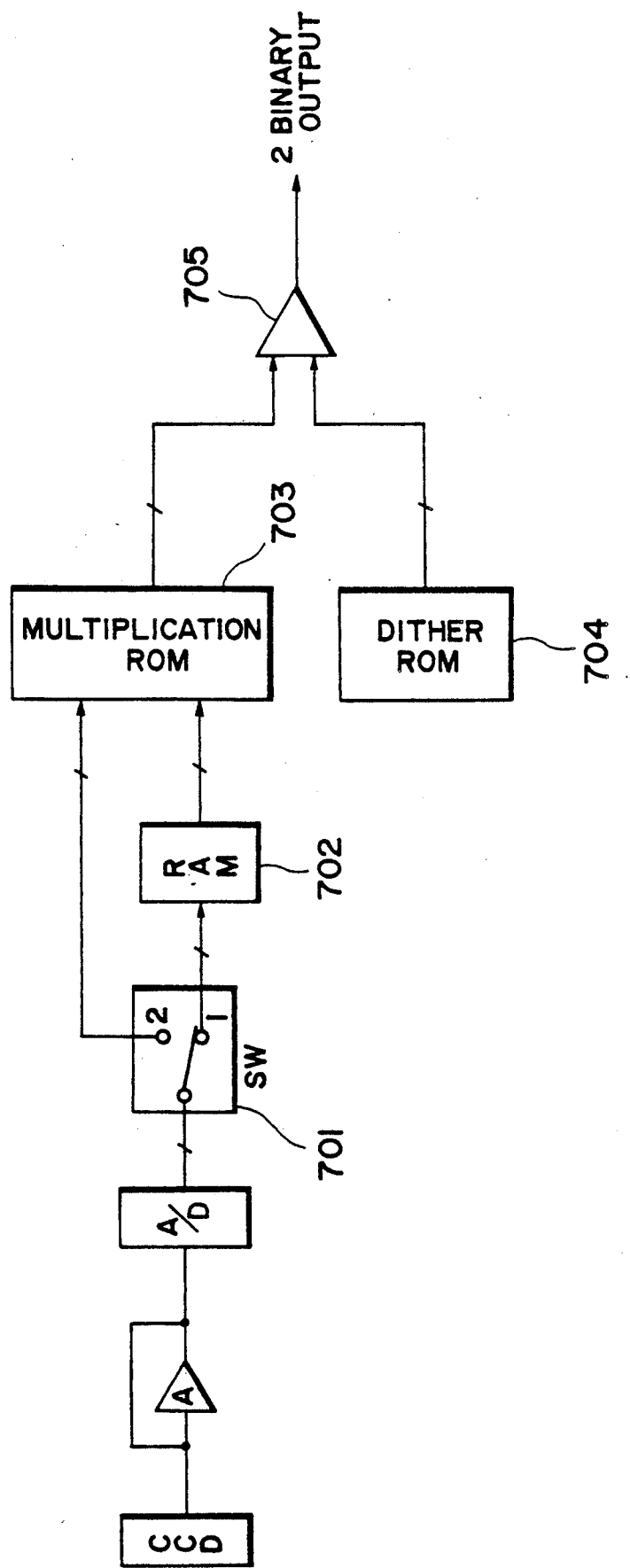

FIG. 10A shows a circuit for correcting the shading of the light source and the lens. The shading correction is carried out when the optical system is at the home position according to the following procedure. At first the fluorescent lamp is lighted to illuminate a standard white or gray plate of a width B1 provided at the home position as shown in FIG. 11, whereby the reflected light from said plate enters the CCD's. In this state the switch 701 is placed at the side 1, so that the signals from the CCD's are sampled, after amplification in the amplifier AMP and A/D conversion by the A/D converter, at every 8 bits and stored in a RAM 702. Said sampling at every 8 bits is conducted to reduce the memory capacity. Therefore the shading correction is made on consecutive 8 pixels at a time, based on the shading data of a pixel contained therein.

In response to the start of original scanning, the switch 701 is shifted to the side 2 whereby the A/D- converted image signals are supplied in succession, as address signals, to a multiplying ROM 703, and at the same time the content of the RAM 702 is read at a rate of once every 8 bits of signals from the CCD and is supplied as address signals to said multiplying ROM 703. Said multiplying ROM 703 stores such data, corresponding for example to an input signal ¾ from the RAM 702, equal to the input from CCD multiplied by 4/3, whereby the ROM 703 corrects the signals from CCD in response to the input signals from the RAM 702 and supplied thus corrected signals to the comparator. The standard plate has a narrow black line for CCD junction correction at the center. Consequently, in the shading correction in this area, a shading value in a nearby area is used instead and supplied to the RAM.

The fluctuation in the light from the fluorescent lamp can be avoided on the basis of the light reflected from the standard gray plate, by controlling the lighting frequency of the fluorescent lamp in response to the result of comparison of the A/D-converted output signal with a reference value. This operation is carried out before of after said shading correction.

Selection of binary encoding

Figure 10B:
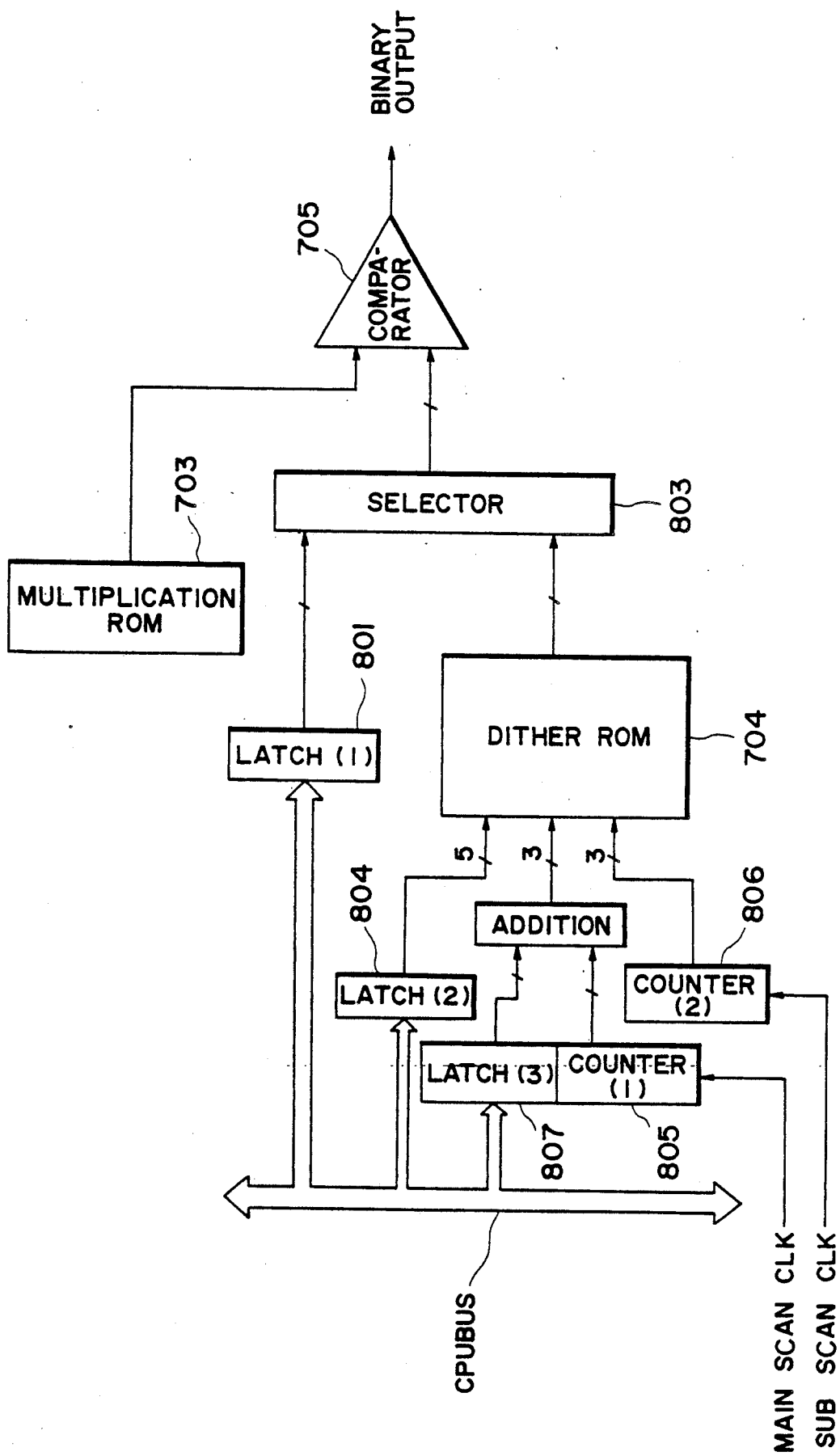

FIG. 10B shows a binary encoding circuit. In said circuit a selector 803 selects either the output signal from a latch (1) 801 or that from a dither ROM 704 in such a manner that the CPU can select the output signal from the dither ROM 704 in response to the selection of a photograph original by the operation unit or the output signal from the latch (1) 801 for a character original. When the operation unit indicates a character original, the CPU causes the selector 803 to select the latch (1) 801 and sets therein a slice level determined according to the peak hold value in the immediately preceding main scanning line or in a further preceding line (FIG. 10C) and also to the position of the density control lever 104 (FIG. 5), thereby eliminating the background density in the automatic exposure (AE) mode. Also if the operation unit indicates a photograph original, the CPU causes the selector 803 to select the dither ROM 704 and selects, in a latch (2) 804, one of dither processes O-F, which are different in the levels and arrangements of dither elements, according to the position of the lever 104 in the operation unit.

As already explained before the CPU calculates the amount of junction of the CCD's for connecting the image signals prior to the image scanning, and the dither patterns have also to be jointed similarly. For this purpose, the CPU sets a previously calculated joint amount in a latch (3) 807, and the content of the main scanning counter (2) 806 is off-set by said amount. A counter (1) 805 is composed of a 3-bit counter driven by main scanning clock signals while the counter (2) 806 is composed of a 3-bit counter driven by sub-scanning clock signals, for example the VIDEO ENBALE signals, so that the dither pattern is composed of a matrix of 8×8 at maximum. It is also possible to use a RAM instead of the dither ROM and to fix matrix elements in said RAM by the CPU according to the selection entry O-F.

AE control

Figure 10C:
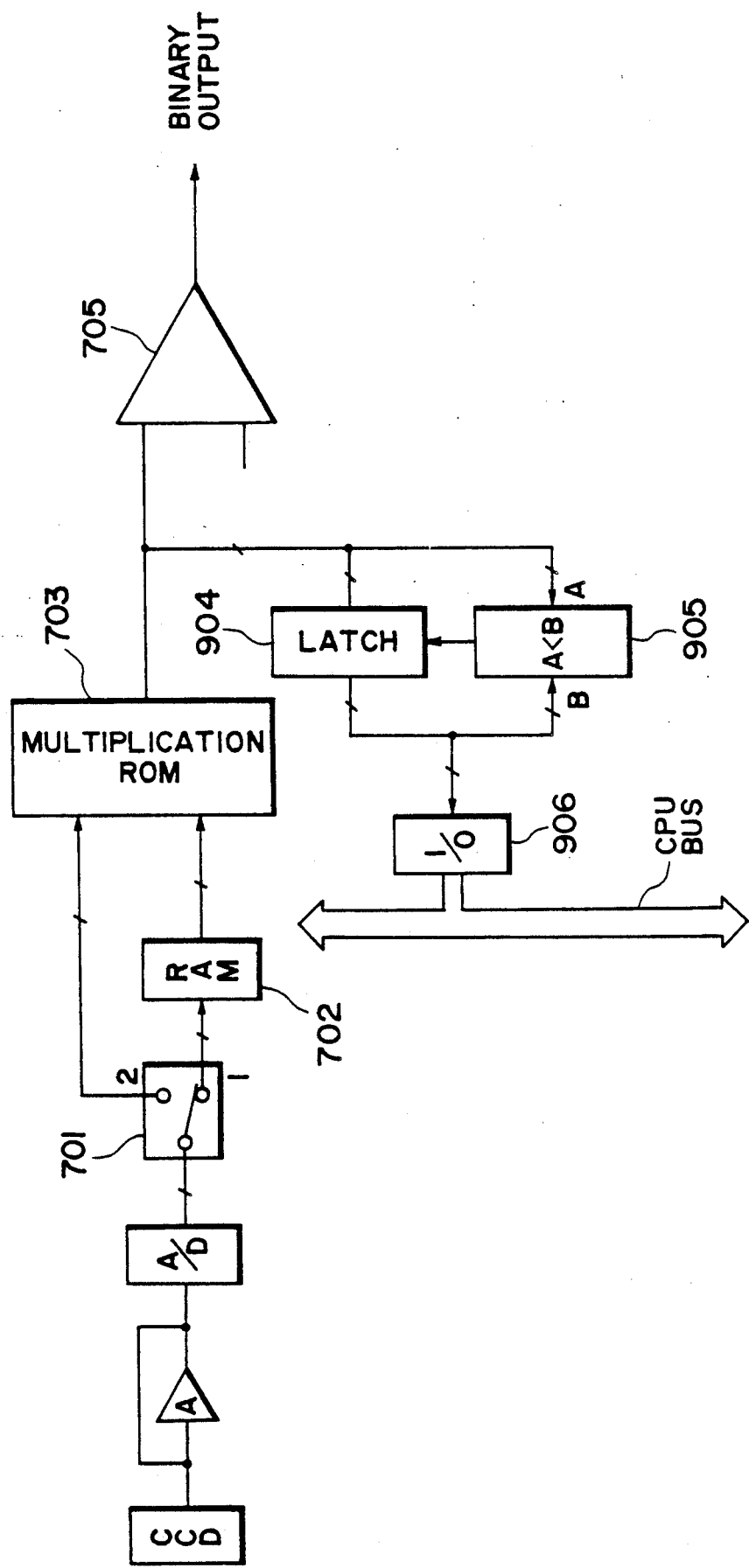
Figure 10D:
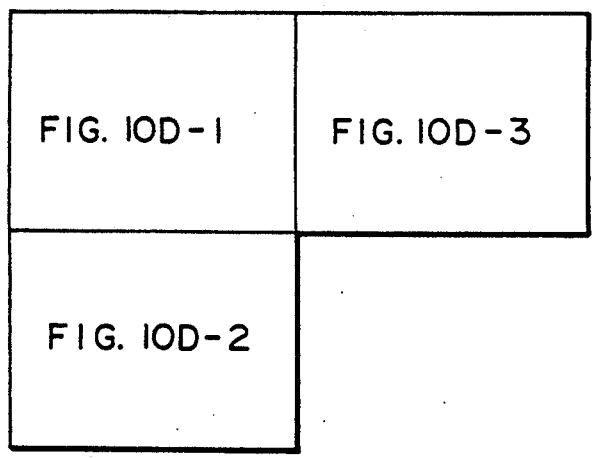

FIG. 10C shows a circuit for automatic exposure control. The removal of the background color of the original is achieved in the following manner. In each main scanning line the peak value is detected in the imag signals from the CCD. Since the background area of an original should give strongest reflected light when said original is illuminated, the background color can be eliminated by detecting the peak value of the CCD output signals in each main scanning line (pitch 1/16 mm) and by selecting the slicing level between said peak value and the minimum value. However, since the peak value detection can be completed only after the end of a main scanning line, the slicing level for a scanning line is determined from the peak value of the preceding scanning line after the scanning operation for said preceding scanning line is completed. Such method proved to have no influence on the image quality.

The image signal for a first pixel obtained after shading correction in the multiplying ROM 703 shown in FIG. 10C is latched in a latch 904. After said latching, the latched signal is compared in a comparator 905 with the image signal for a second pixel, and, if the latter is larger, a port A < B releases a signal to cause said signal for the second pixel in the latch 904. Otherwise the image signal for the first pixel remains in the latch 904. This procedure is repeated until the end of the main scanning operation, whereby the peak value remains in the latch 904 at the end of the main scanning. Said peak value signal is read through an I/O port 906 at the end of each main scanning cycle, and the CPU then determines the slicing level and sets said level in the latch (1) 801 shown in FIG. 10B.

Detection of position and size of original

Figure 17A:
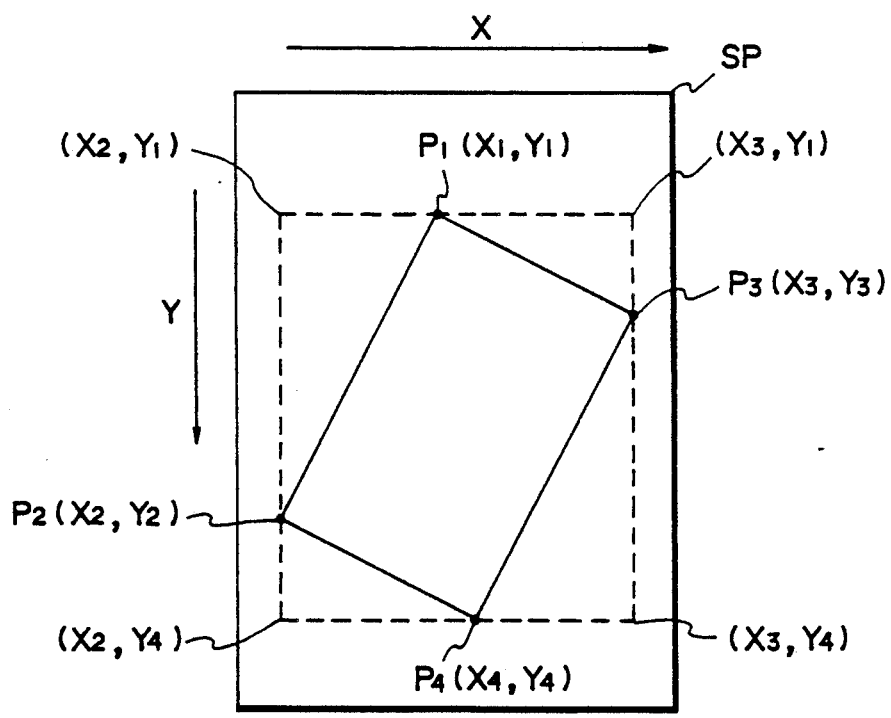
FIG. 17A is a schematic view showing the method of coordinate detection.

FIG. 17A shows an original 300 placed on the original supporting glass 3 of the reader A. Although the original placing position is given as explained before, the original may still be placed in a diagonal orientation as illustrated. In this state, therefore a preliminary scanning operation is conducted by the optical system during the pre-rotation step of the printer to detect four sets of coordinates $(X_1, Y_1)$, $(X_2, Y_2)$, $(X_3, Y_3)$ and $(X_4, Y_4)$ wherein X and Y respectively indicate the main and subsidiary scanning directions measured from the reference point SP on the glass 302, thereby identifying the size and position of the original. These data are used for determining the scanning stroke in the multiple copying operation, selecting a suitable cassette, erasing black image outside the original and effecting automatic image magnification, reduction and/or shifting so as that the resulting image can be accommodated in the copy sheet. The original cover 4 shown in FIG. 2 is rendered reflective so that the area surrounding the original provides black data only. Said preliminary scanning is so conducted as to cover the entire area of the glass, and the scanning operation for copying is conducted thereafter. The sub-scanning speed in such preliminary scanning is larger than that in the copying cycle.

Figures 1, 17B:
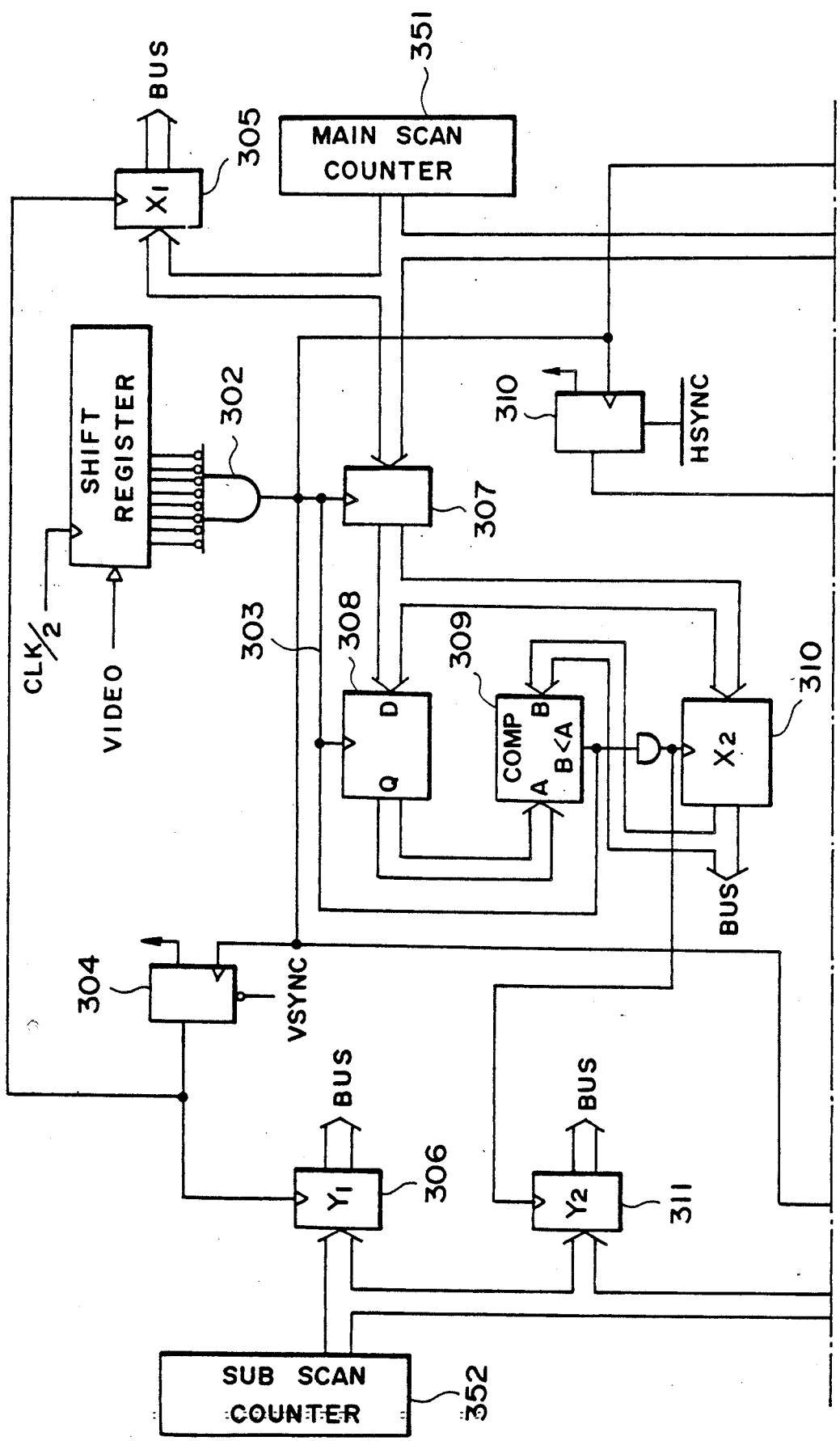

FIGS. 17B-1 and 17B-2 a logic circuit for detecting the above-mentioned coordinates. The binary encoded image signals VIDEO obtained in said preliminary scanning are entered, in a unit of 8 bits, into a shift register 301. Upon completion of said entry, a gate circuit 302 identifies whetehr said 8-bit data are all white, and, if so, releases a signal "1" to a signal line 303. After the start of original scanning, a flip-flop 304, which is reset in advance by the VSYNC signal, is set in response to a first signal indicating 8 white pixels, and remains in the set state until a next VSYNC signal is received. In response to the setting of said flip-flop 304, a latch 305 is loaded with the content of a main scanning counter 351, which may be the main scanning counter 51 shown in FIG. 10D or may be an exclusive counter, said content representing the $X_1$ coordinate value. Also a latch 306 is loaded with the content of a sub-scanning counter 350, which may be the sub-scanning counter 52 shown in FIG. 10D or may be an exclusive counter, thus indicating the coordinate value $Y_1$. In this manner $P_1(X_1, Y_1)$ is determined.

The signal from the main scanning is loaded into a latch 307 every time the signal 303 assumes the level "1", and is stored in a latch 308 immediately, namely before the next 8-bit signals are entered into the shift register 301. The signal from the main scanning when the first 8-bit white signals appear is loaded in a latch 308 and compared in a comparator 309 with the signal in a latch 310, which has been changed to "0" in response to the signal VSYNC. If the signal in the latch 308 is larger, said signal, namely the signal in the latch 307 is loaded into the latch 310. At the same time the signal in the sub-scanning counter is loaded into a latch 311, before the next 8-bit signals are entered into the shift register 301. By repeating the comparison of the signals in the latches 308 and 310 over the entire image area, the latch 310 will contain the maximum value in the direction X and the latch 311 will contain a corresponding coordinate in the direction Y. In this manner the coordinate $P_2(X_2, Y_2)$ is obtained.

A flip-flop 312 is set in response to the first 8-bit white signals in each main scanning line and maintains this state until it is reset by the horizontal synchronization signal HSYNC. The signal in the main scanning counter is set in a latch 313 at the setting of said flip-flop 312, and is loaded in a latch 314 before a next HSYNC signal. Then the signal in the latch 314 is compared in a comparator 316 with the signal in a latch 315, in which the maximum value in the direction X is preset in synchronization with the VSYNC signal. If the signal in the latch 315 is larger, a signal 317 is activated to load the signal in the latch 314, namely that in the latch 313, is loaded in the latch 315. This procedure is carried out between two consecutive HSYNC signals. By repeating the above-described comparison over the entire image area, the latch 315 will contain the minimum value $X_3$ in the direction X. Also in response to the signal 317, the value of the sub-scanning is loaded in a latch 318, representing $Y_3$.

Latches 319, 320 are loaded respectively with the values in the main scanning counter and the sub-scanning counter every time 8-bit white signals appear. Consequently, at the end of the preliminary scanning, said latches will retain the counts at the last 8-bit white signals, corresponding to $P_4(X_4, Y_4)$.

Data lines of the above-described 8 latches 306, 311, 320, 318, 305, 310, 315, 319 are connected to the bus line BUS of the CPU shown in FIG. 6A-1 and 6A-2, thus supplying the corresponding data to said CPU, whereupon the CPU identifies an original area defined by $X_2$, $X_3$, $Y_1$ and $Y_4$, and utilizes these data as trimming coordinates for the aforementioned trimming, shifting, automatic image magnification etc. at the actual original scanning operation for copying. Through this procedure it is rendered possible to avoid reproduction of black image around the original, particularly observed in case of a bound original. Also the coordinate components $X_2$, $X_3$, $Y_2$ and $Y_4$ of the original allow to recognize a broken-lined rectangle surrounding the original position P1-P4, thereby allowing to identify the minimum required size of the copying sheet.

Figure 17C:
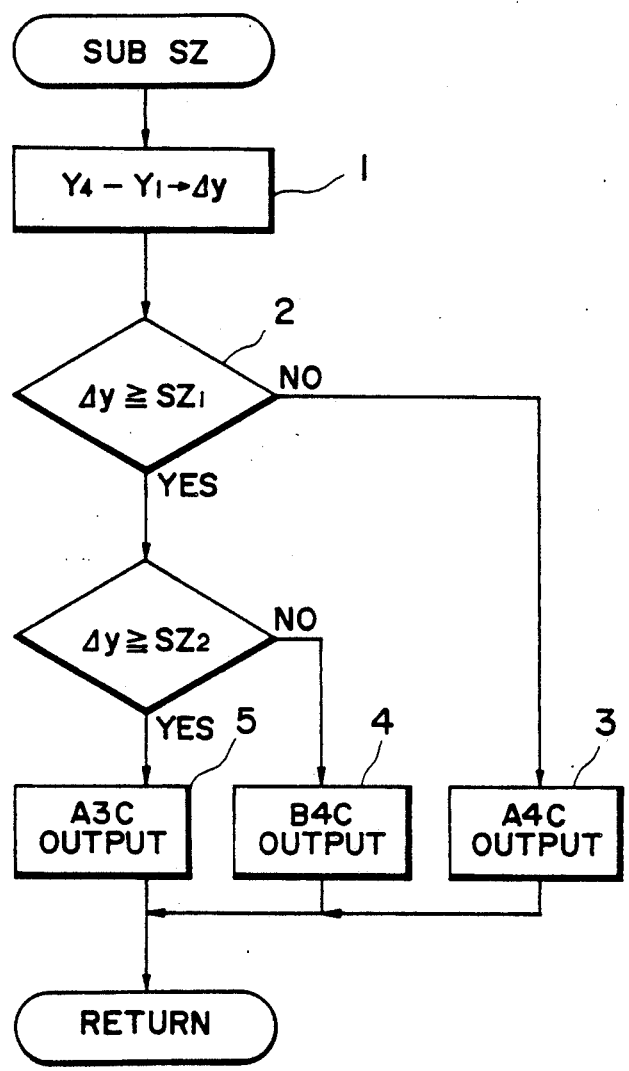
FIGS. 17C to 17F are flow charts showing the control for said detection.
Figure 17D:
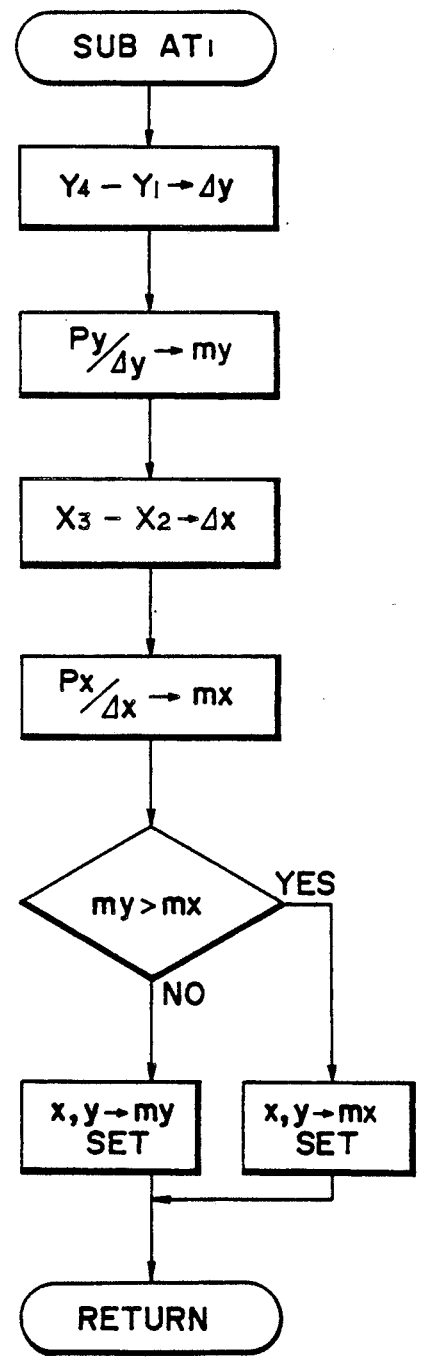

Thus, as a first example, the cassette size data from the printer are compared with the original size data for selecting a cassette closer to the original size. This procedure is carried out by a sequence control program of the CPU shown in FIG. 17C. At first a distance $\Delta y$ between the coordinates $Y_4$ and $Y_1$ is calculated (step 1), and a comparison is made to identify whether thus calculated is smaller than A4 size (step 2). If affirmative a signal A4C is supplied to the printer for selecting the A4 cassette (step 3), and, if negative, a signal is so supplied as to select the B4 size cassette for an image smaller than B4 size or the A3 size cassette for an image larger than B4 size (steps 4, 5). The CPU of the printer compares these signals supplied through a line S.DATA with size signals already obtained from two cassettes, and carries out control in such a manner as to feed a sheet from a corresponding cassette, or, if such corresponding cassette is not present, sends the data back to the reader as an alarm, which is then displayed in the reader.

In the printer the registration roller 18 is controlled in such a manner that the leading end of a sheet is in registration with the coordinate $Y_1$. In the standard mode the registration roller 18 is activated by the signal VSYNC of the reader synchronized with the aforementioned image leading end sensor 37b, but in the automatic mode a time corresponding to $Y_1$ is proivded between said signal and the signal from said sensor 37b in the same manner as in the aforementioned trimming shift mode since the image reproduction is started from the reference point SP. As each cassette is mounted at a position corresponding to the reference point SP of the reader, the image output signal is shifted by $X_1$ in the main scanning direction by suitably presetting the read address counter in the same manner as in the aforementioned trimming shift mode. The above-mentioned operation modes are selected by shift keys corresponding to the display and designated by the aforementioned ETC key, but there may be provided exclusive keys for this purpose. Furthermore the image may be reproduced at the center of a sheet by a centering process to be explained later.

As a second example, by the entry of the aforementioned AUTO1 instruction, the original area $X_2$, $X_3$, $Y_1$, $Y_4$ can be reproduced after suitable change of image size to match the sheet in the cassette. In this case the processes of trimming, shifting and image magnification change are conducted in succession in the procedures explained in relation to FIG. 16, in response to the cassette size signal supplied from the printer to the reader through the line S.DATA.

In said AUTO1 mode, same as in the AUTO1 mode for the trimming point, the ratios mx, my of the sizes $\Delta x$, $\Delta y$ of the original in the directions X, Y to the sizes Px, Py of the copy sheet in the directions X, Y are determined, and a smaller ratio is selected as a common ratio in both direction and is stored in a RAM for conducting the aforementioned image magnification/reduction process. In this manner there is obtained a copy of which size is modified with reference to a direction of the sheet. Also it is possible to obtain a copy as shown in FIG. 16a or in FIG. 9(h-2) by cornering or centering.

Figure 17E:
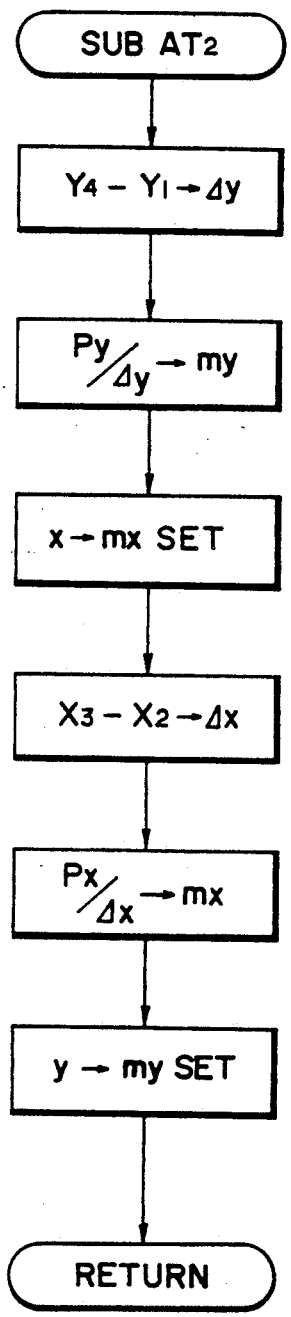
Figure 19:
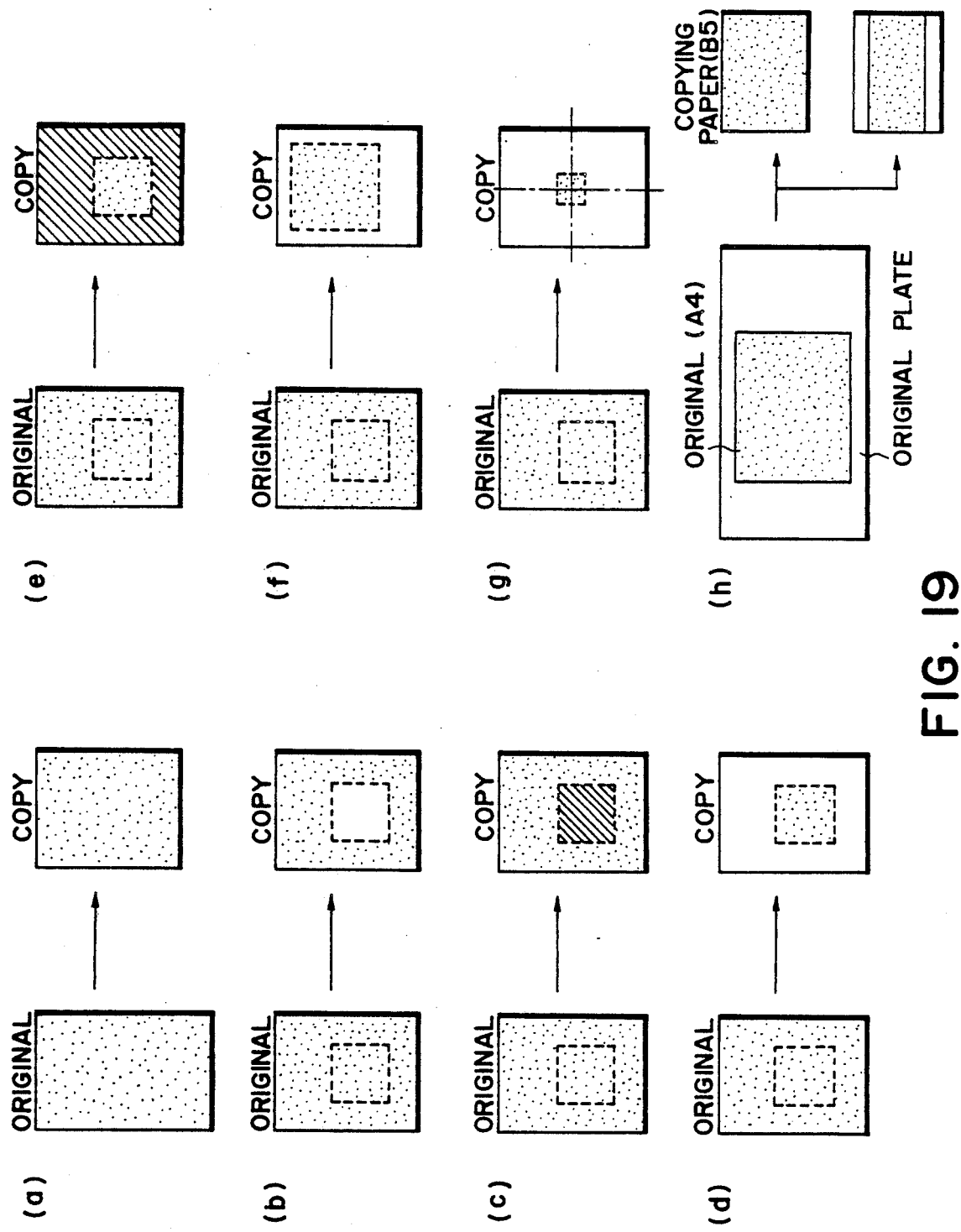

In a mode AUT02, as shown in FIG. 17E, the ratios of the original in the directions X, Y to the sheet in same directions are determined, and are independently set. Consequently it is possible to copy an image, as shown in FIG. 19(h-1), in a full size in the sheet. In these modes AUTO1 and AUT02, if the sheet still has a marginal space even at the maximum image magnification ratio of 2, the image reproduction may be automatically accompanied by centering or cornering. The output form in said AUTO1 and AUT02 modes is same as in the automatic image magnification/reduction mode in which the trimming coordinates are designated by numeral keys.

Figure 17F:
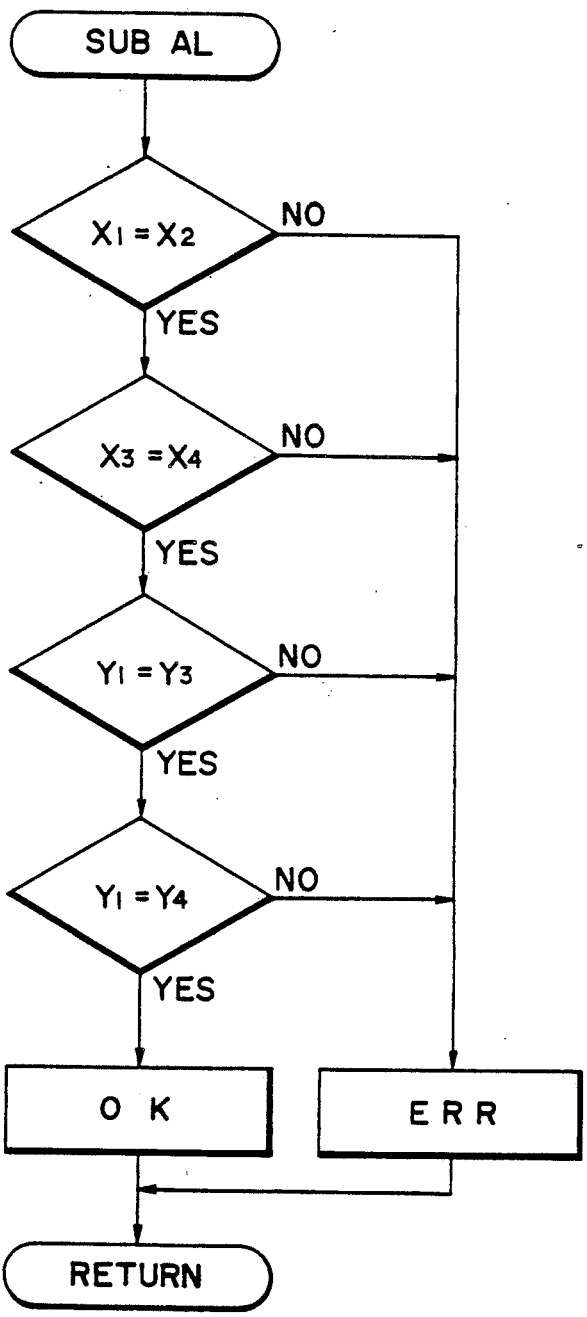

As a third example, there may be obtained an alarm for an inclined orientation of the original. In this case comparisons are made in each set of $X_1$-$X_2$, $X_3$-$X_4$, $Y_1$-$Y_2$ and $Y_3$-$Y_4$ of the point P1-P4 in FIG. 17F to identify whether the coordinates in each set are mutually substantially same (within a tolerance of several bits), and, if not, an alarm is given, though the copying operation is still enabled. The above-mentioned flow is conducted by a program executed by the CPU.

Figure 15M:
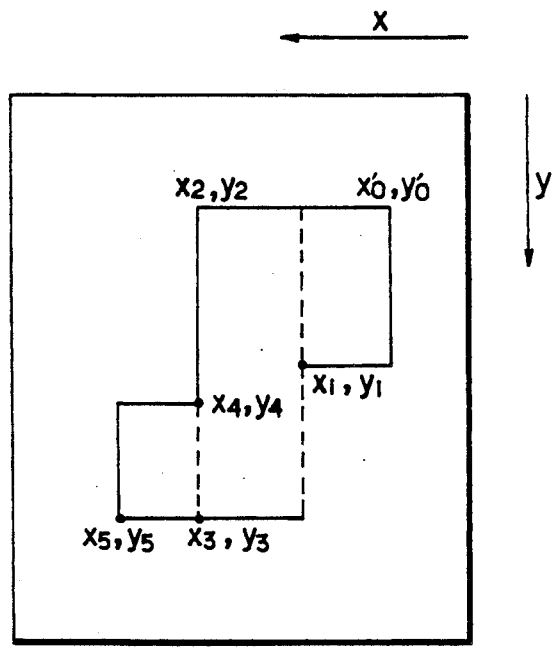

FIG. 15J shows a flow chart showing the procedures of the aforementioned trimming, image magnification/reduction and shifting. A processing on a point $(X_0,Y_0)$ is at first conducted in case the procedure involves image shifting as shown in FIG. 15K, but, in the absence of image shifting operation, the start bit counter and the end bit counter shown in FIG. 13 are controlled in an order of $x_0'$, $y_0' \rightarrow x_5$, $y_5$ as shown in FIG. 15M to obtain a totally white area around the trimming area. In this case the trimable area is a single area surrounded by linear lines, and said area is divided in the y-direction into rectangles each of which is defined by two points on the diagonal. Three rectangles are permitted at maximum by said division, and the size is entered in the unit of millimeter.

Thus there is conducted a procedure represented by:

$$(x_0y_0, x_1y_1) + (x_2y_2, x_3y_3) + (x_4y_4, x_5y_5).$$

The image output signals VIDEO are controlled by the coordinate conversion in the same manner as explaiend before, also in the modes MANUAL SHIFT and AUTO.

Also in case of various shifting (arbitrary, cornering, centering) and various image magnification/reduction (arbitrary, fixed form, automatic), the trimming image or the area around the original image may be rendered white or black according to the final coordinates.

Masking, trimming, image inversion

Figure 13A:
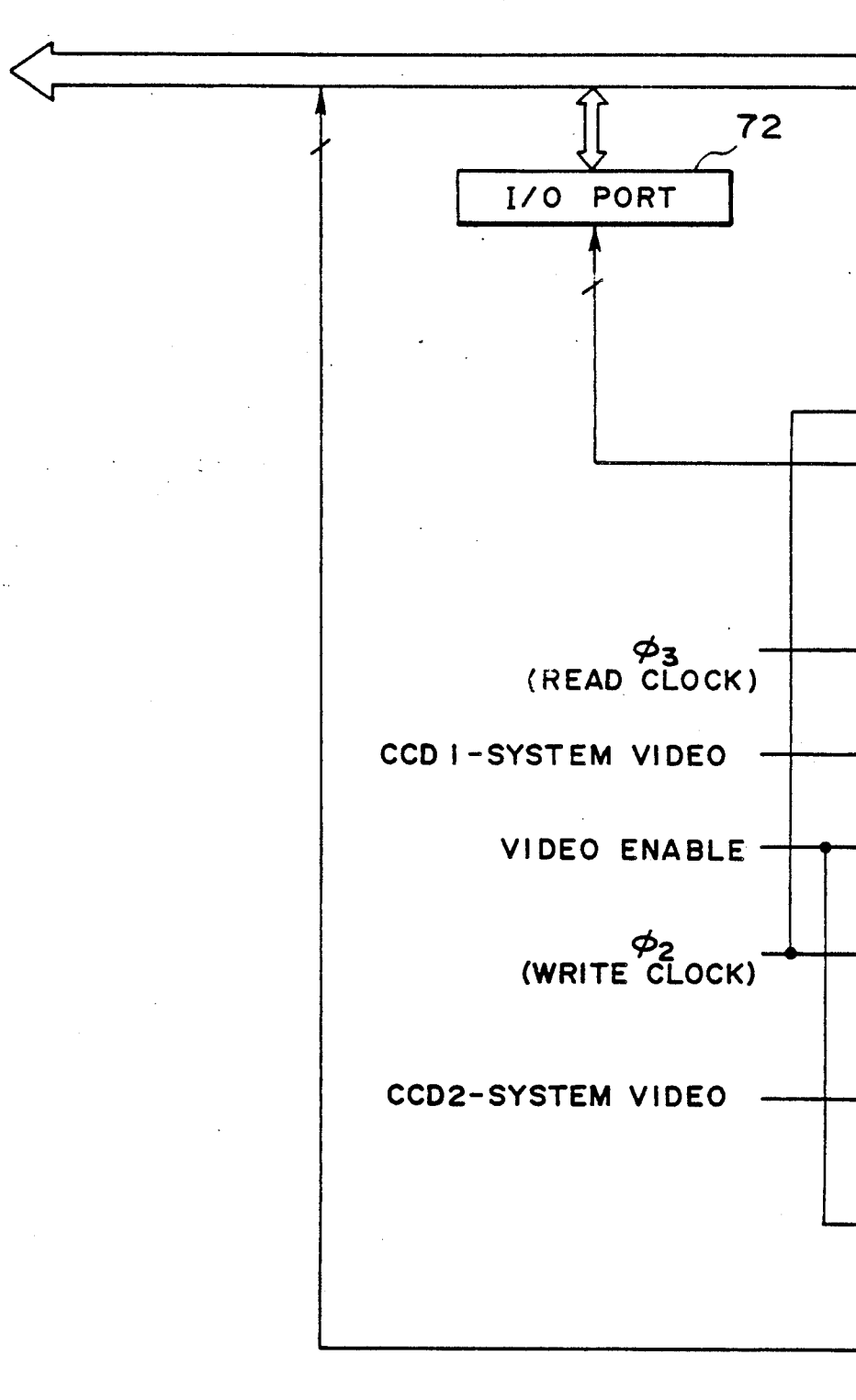
Figure 13B:
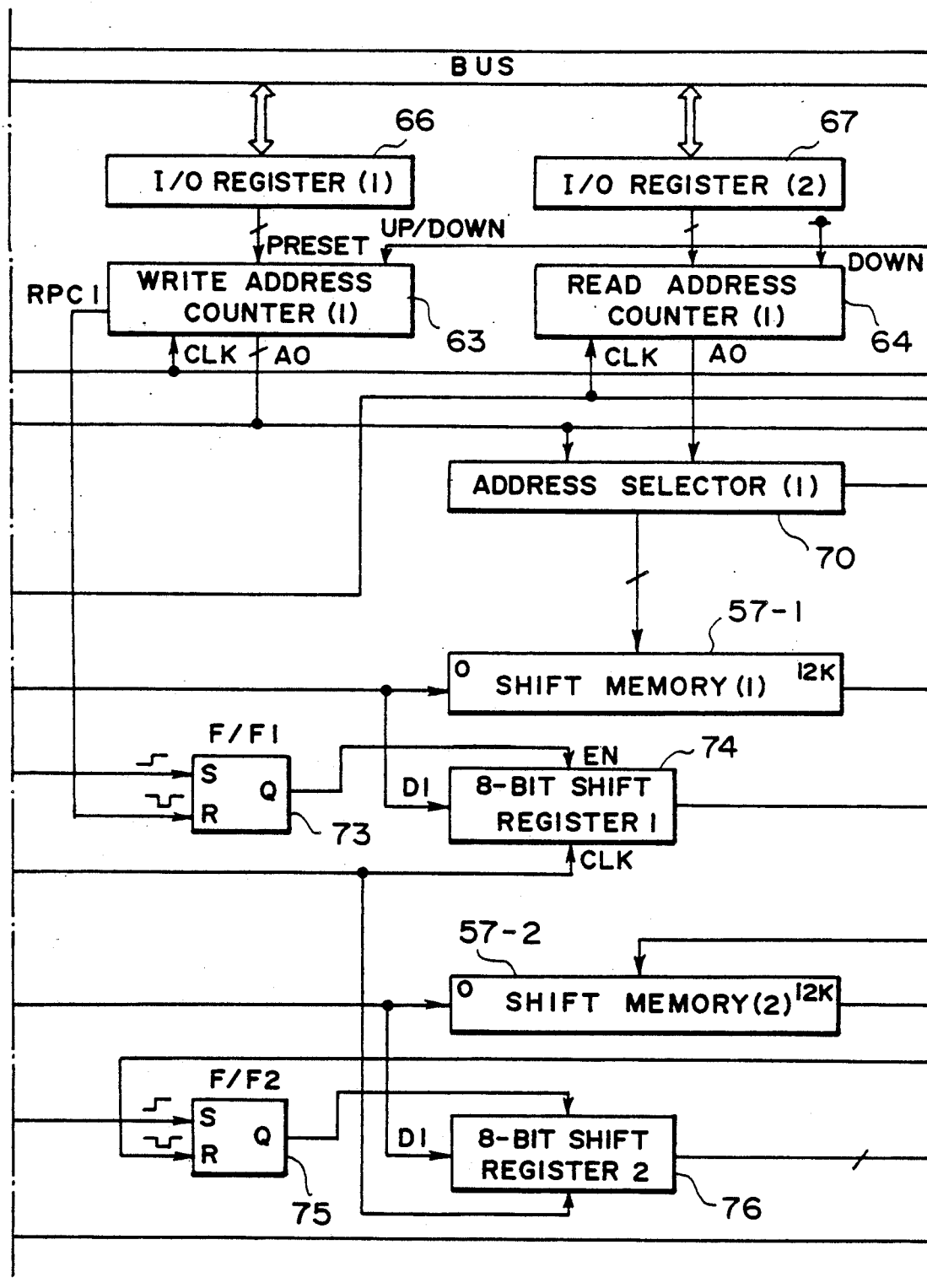
Figure 13C:
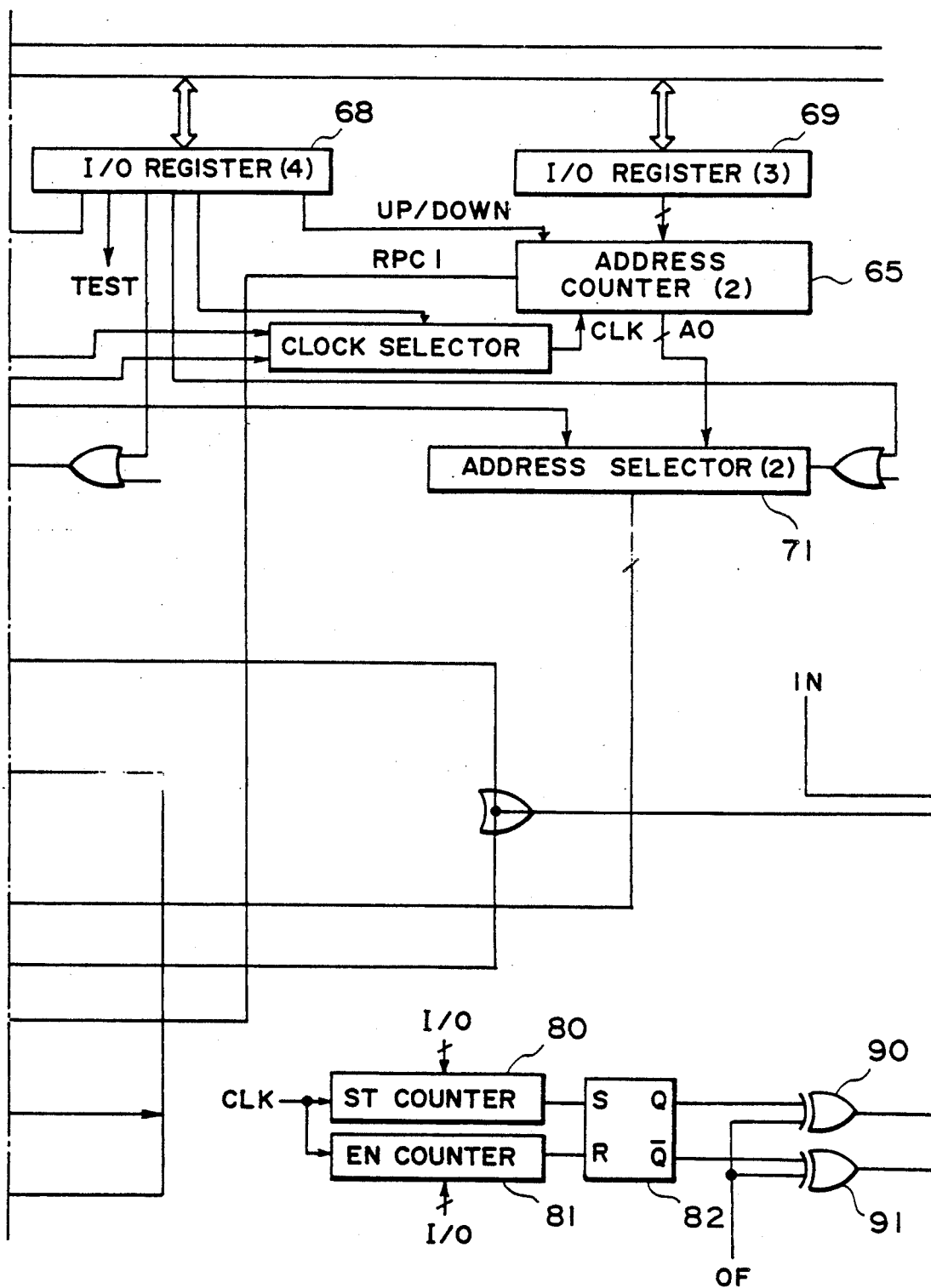
Figure 13:
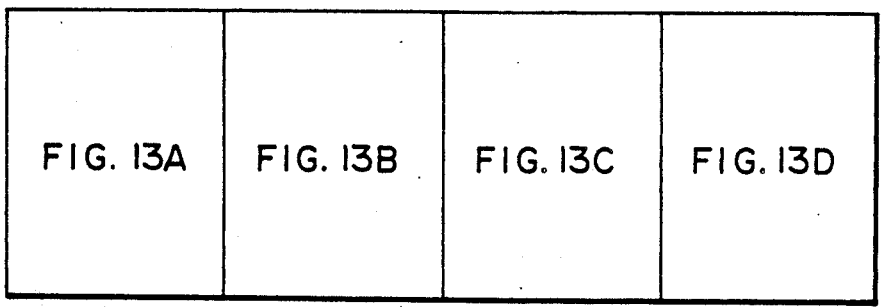
Figure 13D:
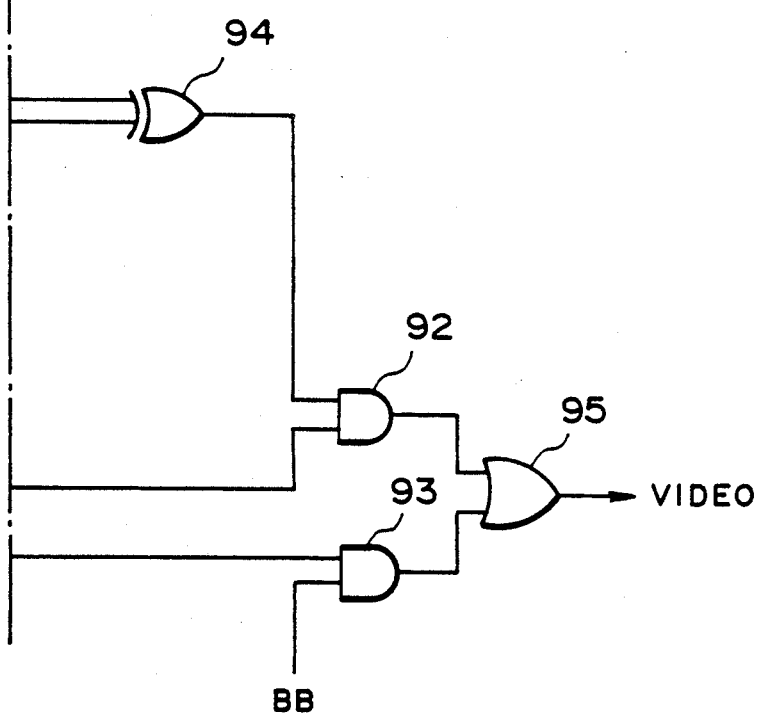

Now reference is made to FIGS. 13A to 13B in which shown are exclusive OR gates 90, 91 for defining an image area; a signal OF for controlling said gates either to mask the interior of a frame determined by counters ST and EN and to produce the image signals outside said frame in a state "1", or to mask the exterior and to produce the image signals inside said frame in a state "0"; an AND gate 92 for controlling the output of said image signals; an AND gate 93 for determining whether said mask is black or white; a signal BB for controlling said gate to obtain a black mask in a state "1" or a white mask in a state "0"; an OR gate 95 for transmitting the image signals VIDEO from said gates 92, 93; an exclusive OR gate 94 for controlling the inversion of the image signals; and a signal IN for obtaining unchanged signals in a state "1" or inverted signals in a state "0"; wherein the above-mentioned signals are generated in response to the entires of masking, white or black and image inversion by program keys.

For a mask signal "1", a flip-flop 82 releases a 1-level output signal Q in response to the counting up of the counter ST to close the gate 90, whereby the gate 92 releases no output signal until the counter EN completes the counting operation to release a 0-level signal Q, thereby achieving a masking operation. On the other hand the gate 91 releases a signal "1" whereby the gate 93 releases a signal "1" if the black/white signal BB is "1". Thus the image output gate 95 continuously releases a signal "1" to achieve masking operation. A white masking is achieved in case of OF=1 and BB=0. In case of OF=0, the gates 90, 91 respectively issue signals "1" and "0" to provide a black mask outside the trimming area for BB=1. A white masking outside the trimming area is obtained for OFF=0, BB=0.

Centering

Figure 18A:
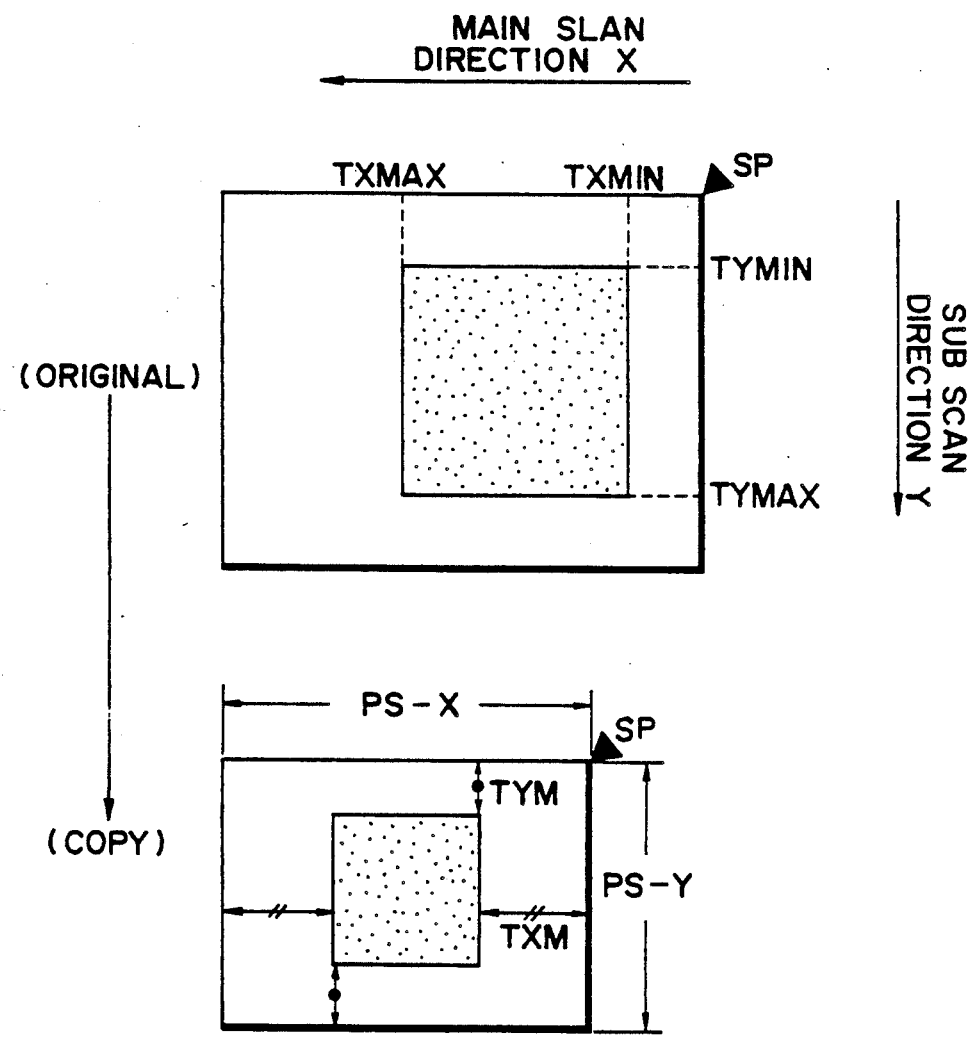
FIGS. 18A and 20A are schematic views showing other examples of image conversion.
Figure 18B:
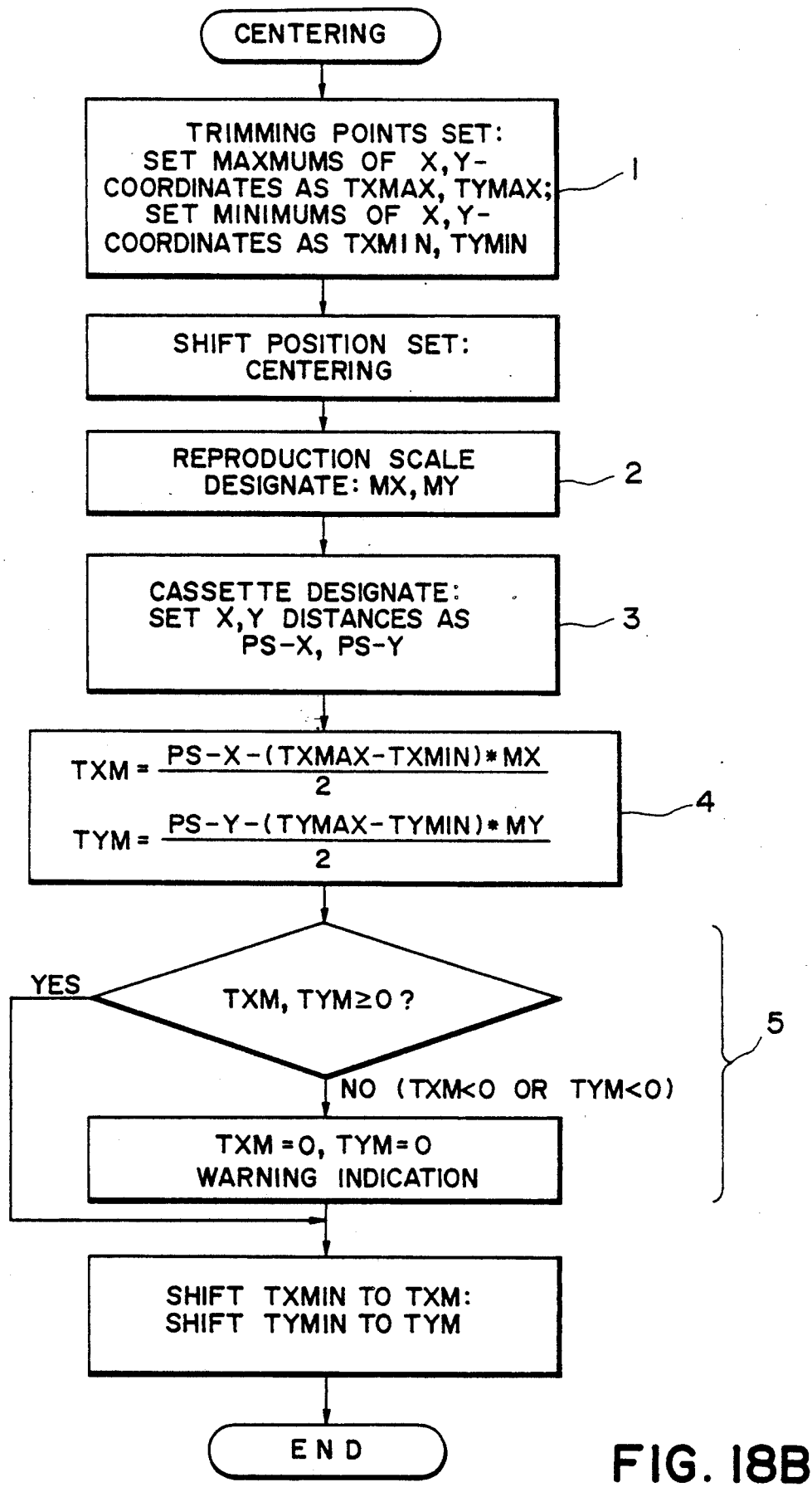

FIG. 18A is a schematic view showing the centering, to the approximate center of a sheet, of a small original image or a trimmed image, and FIG. 18B shows a control flow chart therefor. As already explained before, the trimming coordinates of a hatched area are set by the maximum value (TXMAX, TYMAX) and the minimum value (TXMIN, TYMIN) (step 1). This setting may also be achieved by the coordinate direction explained before. Then image magnification ratios MX, MY in the directions X, Y are determined according to the procedure of a subroutine AUTO AT2 (step 2). Said values MX, MY may also be determined by designating arbitrary magnification ratios in the directions X, Y by the numeral keys or by the subroutine AT1. Then the dimensions PS.X, PS.Y of the sheet in the directions X, Y are set in a RAM, according to the data from the printer (step 3). Then the image moving coordinates TXM, TYM for centering are determined from the foregoing data (step 4). The coordinate in the direciton X is determined by subtracting the trimmed and magnification-modified length of the image in the direction X from the sheet length and multiplying the result of said subtraction by ½, and coordinate TYM in the direction Y can be determined in the similar manner. These coordinates TXM, TYM are considered effective only if they are positive, and an alarm is given if these figures are negative (step 5). Thereafter the procedures shown in FIGS. 15A to 15K are followed.

FIG. 19 shows examples (a) XY image magnification/reduction, (b) white masking, (c) black masking, (d) white frame trimming, (e) black frame trimming, (f) white frame trimming+shift designation+magnification designation with numeral key, (g) white frame trimming+centering+magnification designation with numeral keys, (h-1) automatic original position detection +reference point (SP) shift+automatic image magnification/reduction (AT2), and (h-2) automatic original position detection+automatic image magnification/reduction (AT1)+centering.

Book copying

Figure 20A:
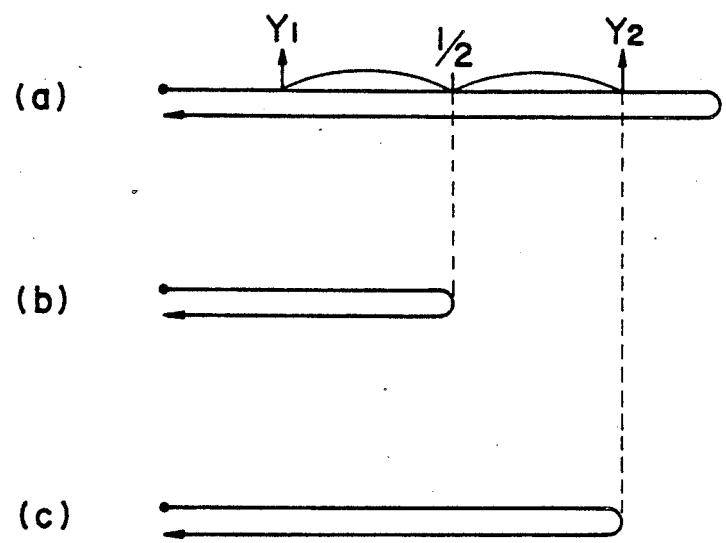
Figures 1, 20B:
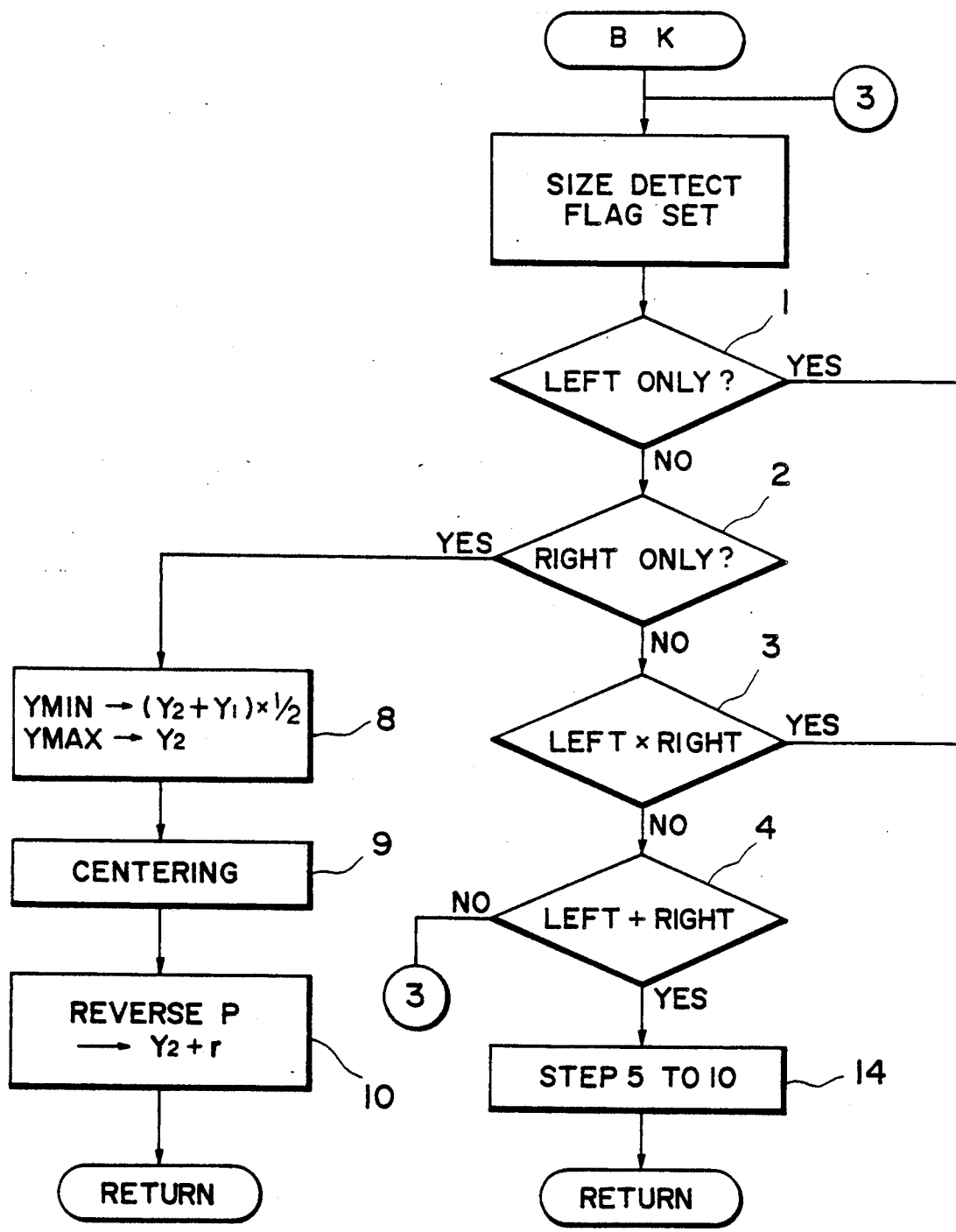
Figures 2, 20B:
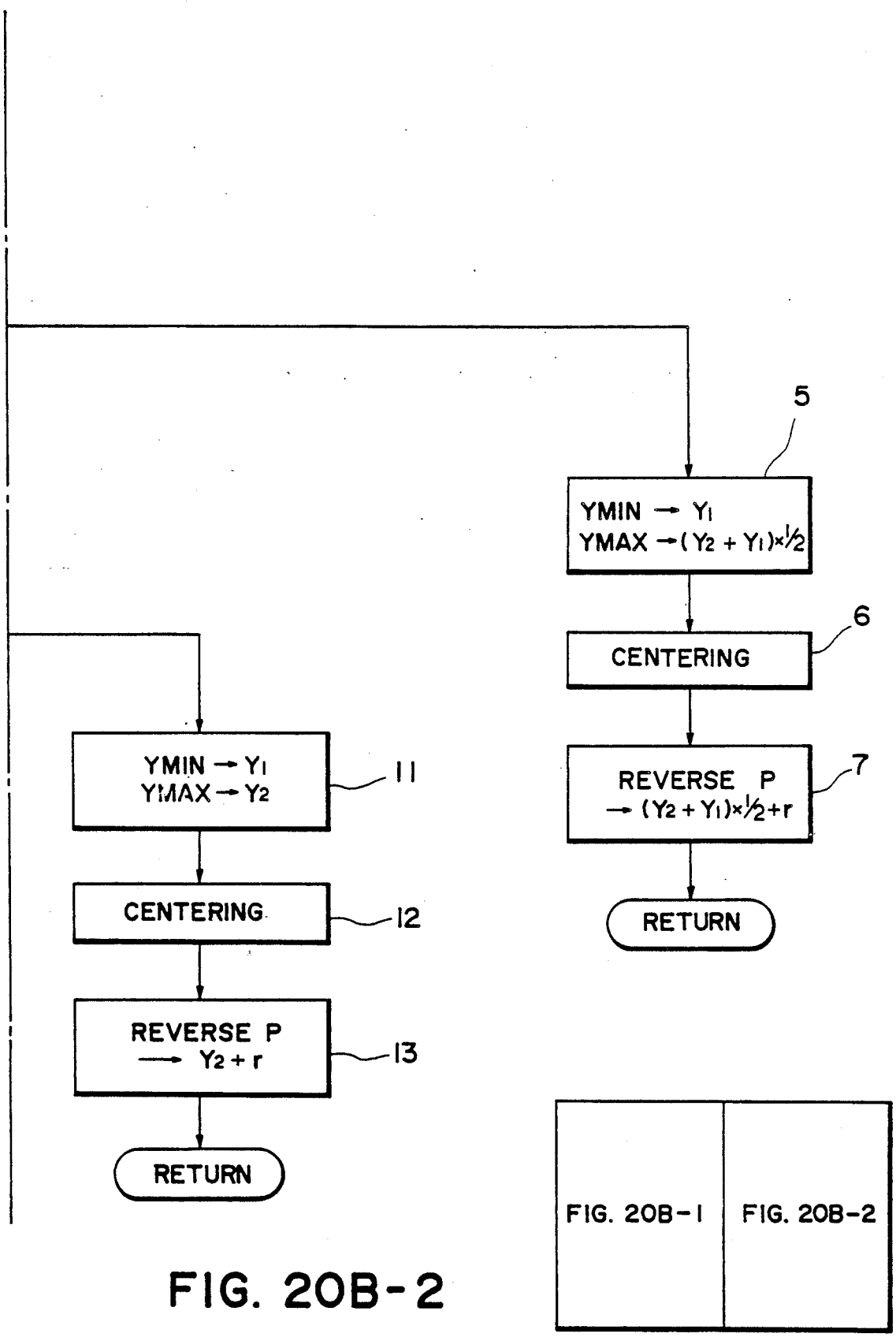
Figure 20B:
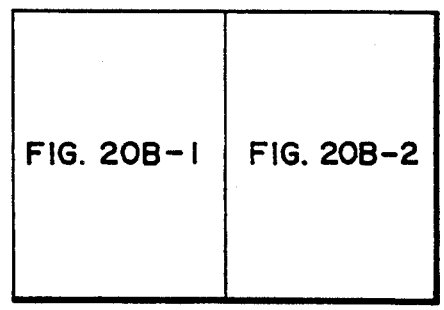

FIG. 20A shows the procedure of reading a left-side page and a right-side page of a book original, placed on a platen, independently or simultaneously and making one or two copies, and FIGS. 20B-1 and 20B-2 are a flow chart therefor. Referring to FIG. 20A, a preliminary scanning is conducted on the original to identify the original size (X1, Y1) from the detected coordinates (step a). Then a copying scan is carried out, in which the optical unit is reversed at a coordinate at the center of the distance Y1−Y2, whereby the left-hand half is read and printed (step b). Then a second copying scan is carried out in which the optical system is reversed at the point Y2, thereby copying the right-hand half (step c).

Referring to FIG. 20B-1 and 20B-2, in response to an instruction for the book mode through a program key, an original size detection flag is set for effecting a preliminary scan for detecting the original size in response to the actuation of the copy key (step 1—1). Then identified are whetehr the copying is requested only in the left-hand half (step 1), or only in the right-hand half (step 2), and whether the left- and right-hand halves are to be copied on a single sheet (step 3) or on separate sheets as shown in FIG. 20A (step 4) by the key discrimination in the CPU. In case of the copying of the left-hand half only, the trimming coordinate YMIN is taken as Y1 and the coordinate YMAX is determined by (Y1+Y2)×0.5 corresponding to the center of the book (step 5). Then the aforementioned centering procedure is executed (step 6). Then the reversing position P of the optical unit is determined by (Y1+Y2)×0.5 plus a certain margin r (step 7). These data are set in a RAM. In this manner the image on the left-hand half can be copied in the center of a sheet.

In case of the copying of the right-hand half only, the trimming coordinate YMIN is determined as (Y1+Y2)×0.5 and YMAX is determined as Y2 (step 8). Then the centering process is executed (step 9) and the reversing position P is determined (step 10).

In case the left-hand and right-hand halves are to be copied on a same sheet, the coordinates Y1, Y2 are determined as in the usual trimming mode (step 11), then the centering process is executed (step 12) and the reversing position P is determined (step 13).

In case the left-hand and right-hand halves are to be copied on separate sheets, data are set by conducting the procedures for copying the left-hand half alone and the right-hand half alone (step 14), whereby data for two cycles are stored. Upon actuation of the copy key, a discrimination is executed to identify whether the book mode BK is instructed, and, if so, a preliminary scanning is carried out to store the original signals according to the instructed mode. In case of the left+-right mode, after the preliminary scanning, the data of the left-hand half are read from the RAM for controlling the presetting of the aforementioned address counter and the sequence of the scanner for obtaining a first copy. When the optical system returns to the home position after the scanning, the CPU identifies, from the RAM data, whether said (left+right) mode is still requested, and, if so, the data of the right-hand half are read to effect the above-mentioned control, thus obtaining a second copy.

In the foregoing cases, it is also possible to apply automatic image magnification/reduction or to obtain black or white area around the original image. In these modes, image reproduction at an appropriate position is achieved by advancing or delaying the start timing of the reader or the sheet registration timing in the printer, according to the data such as for centering.

The coordinates Y1, Y2 of the original may also be entered manually by numeral keys or by size keys. It is furthermore possible to effect centering through automatic detection in the main scanning direction alone or in the sub-scanning direction alone, or with the coordinates X1, X3 or Y1, Y2 entered by the keys.

In this manner the left-hand page and the right-hand page of a book can be copied, with an appropriate image magnification ratio, with a very simple operation without the displacement of the book original.

Also the copy quality can be significantly improved as the image can be printed at the center of a sheet and as unnecessary information can be arbitrarily eliminated. Also the copying operation can be started prior to the completion of the image reading operation in the reader, so that the speed of copying is made much faster despite the presence of image editing operation. Furthermore, in case of signal transmission to another printer, the transmitted image can be monitored since the image signals are simultaneouly transmitted to the printer belonging to the reader through the control of the communication control unit. Furthermore an image reproduction of satisfactory quality can be achieved without error and the confirmation of the image quality is also possible, since the protocol lines are connected with the CPU of the reader to execute various editing and image quality control operations only when the CPU confirms the normal function of the printers.

Figure 20C:
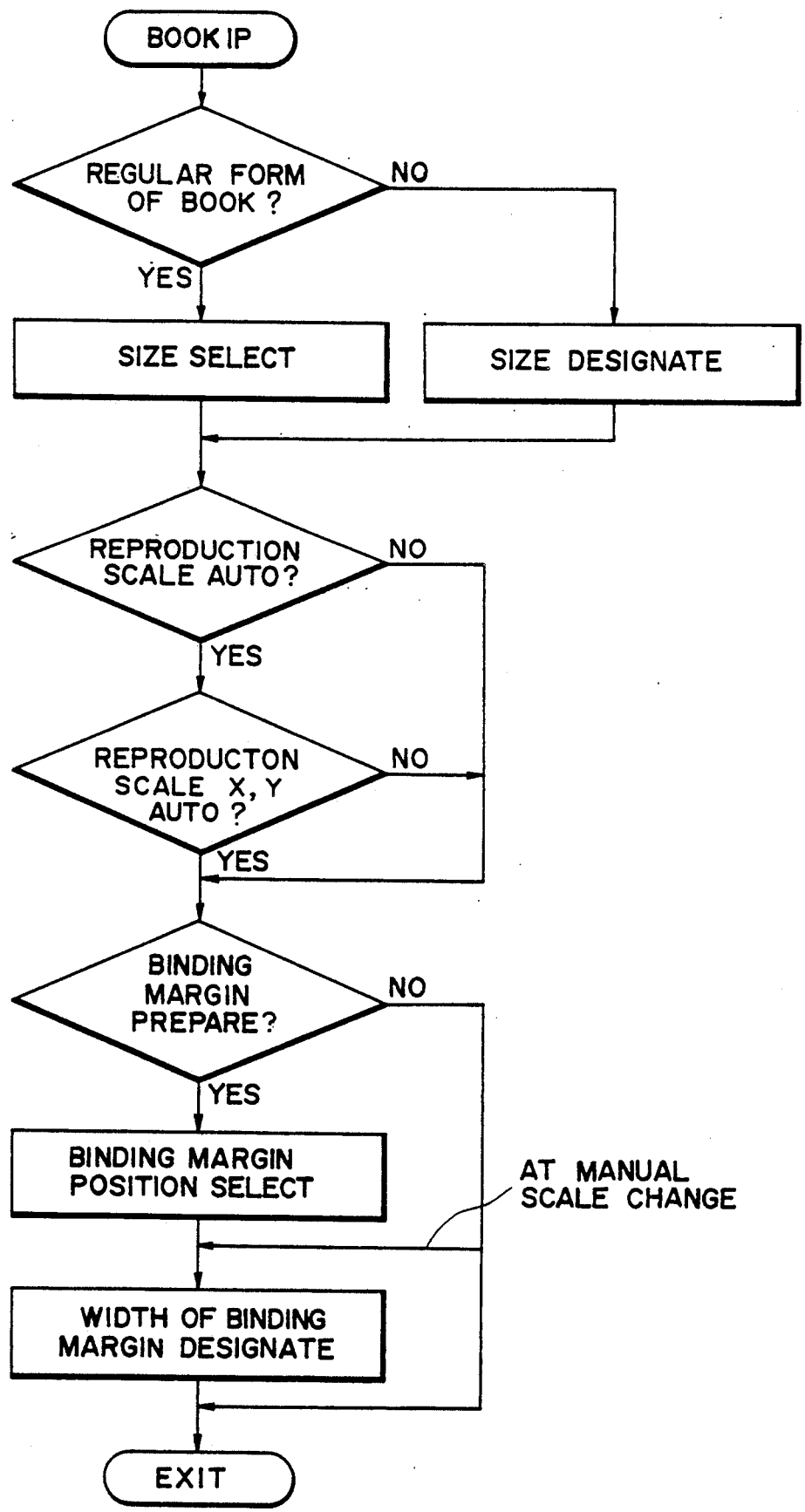
Figure 21A:
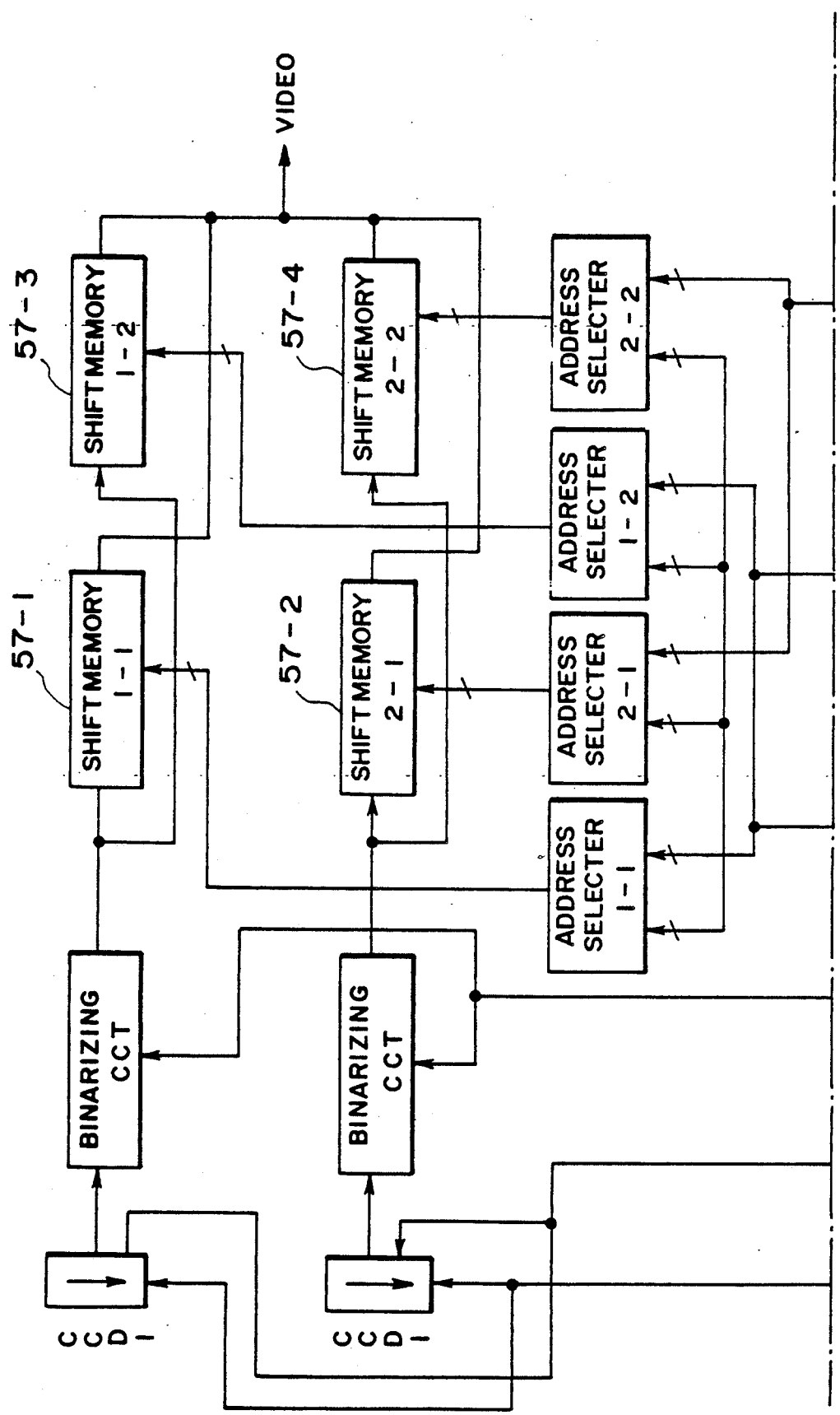

The above-mentioned modes and black frame erasure can also be selected by entering the original size in codes or in dimensions through program keys and size keys or numeral keys instead of the coordinate detection of the original explained above. FIG. 20C shows a flow chart therefor, wherein "binding margin" indicates a program key input signal for obtaining a certain margin on the sheet even in case of automatic image magnification/reduction or image centering, and a binding margin is obtained through the aforementioned procedure of arbitrary image shifting by entering the position and width of such binding margin.

What we claim is:

1. An image processing system comprising:
   means for scanning an original document and for producing an image signal;
   means for reproducing an image of said original document on a material on the basis of the image signal;

means for detecting the position of the original document, on the basis of the image signal produced by said scanning means, by pre-scanning the original document independently of the reproducing by said reproducing means and for producing a position signal representing the detected position; and means for processing the image signal in accordance with the position signal from said detecting means in such a manner that an image of the original document is reproduced at a predetermined position on the material irrespective of the position of the original document;

wherein said reproducing means reproduces the image of the original document at the center of the material on the basis of the image signal processed by said processing means.

2. An image processing system according to claim 1, wherein said scanning means comprises means for reading an original document mounted on a platen.

3. An image processing system according to claim 1, wherein said processing means extracts an image signal corresponding to the original document.

4. An image processing system according to claim 1, wherein said detecting means determines a plurality of coordinates of the original document.

5. An image processing system comprising:
a plate on which a plurality of original documents can be set at a set position;
means for producing image signals by scanning the plurality of original documents on said plate;
means for reproducing a plurality of images on a plurality of different materials on the basis of the image signals;
means for detecting at least one of the size and the set position of one of the plurality of original documents and for producing a detection signal representing the detected size or position; and
means for controlling said producing means and said reproducing means in accordance with the detection signal from said detecting means in such a manner that images of the plurality of original documents can be reproduced by said reproducing means on the different materials in succession with an interval therebetween.

6. An image processing system according to claim 5, wherein said detecting means determines at least one of the size and the position of the original document on the basis of the image signal produced by said producing means.

7. An image processing system according to claim 5, wherein said detecting means determines a plurality of coordinates of the original document.

8. An image processing system according to claim 5, wherein said control means determines the size of a material on which the image is reproduced by said reproducing means.

9. An image processing system comprising:
a plate on which an original document is set at a set position;
means for producing an image signal by scanning the original document on said plate;
means for reproducing an image on a material on the basis of the image signal;
means for detecting the set position of the original document on said plate and for producing a position signal representing the detected position; and
means for controlling said producing means and said reproducing means in accordance with the position signal from said detecting means in such a manner that an image of the original document can be reproduced at the center of the material irrespective of the set position of the original document.

10. An image processing system according to claim 9, wherein said detecting means detects the position on the basis of the image signal produced by said producing means.

11. An image processing system according to claim 9, wherein said producing means comprises means for reading an original document mounted on a platen.

12. An image processing system according to claim 9, wherein said detecting means determines a plurality of coordinates of the original document.

13. An image processing system comprising:
means for producing an image signal by scanning an original document;
means for binary encoding the image signal and producing binary encoded data therefrom;
means for discriminating that binary encoded data having a certain level is continuously produced for a predetermined period by said binary encoding means; and
means for detecting at least one of the size and position of the original image on the basis of the discriminating result from said discriminating means.

14. An image processing system according to claim 13, wherein said producing means comprises means for reading an original document mounted on a platen.

15. An image processing system according to claim 13, wherein the certain level is a level representing a white image.

16. An image processing system according to claim 13, further comprising means for reproducing an image on a material on the basis of the image signal produced by said producing means.

17. An image processing system according to claim 13, further comprising means for processing the image signal in accordance with the detection result of said detecting means.

18. An image processing system comprising:
means for producing an image signal by scanning an original document;
means for discriminating that a certain image signal is continuously produced for a predetermined period by said producing means;
means for detecting at least one of the size and the position of the original document in accordance with the discrimination result of said discriminating means; and
means for storing data representing the size or position detected by said detecting means.

19. An image processing system according to claim 18, wherein said producing means comprises means for reading an original document mounted on a platen.

20. An image processing system according to claim 18, further comprising means for reproducing an image on a material on the basis of the image signal produced by said producing means.

21. An image processing system according to claim 18, further comprising means for processing the image signal in accordance with the detection result of said detecting means.

22. An image processing system according to claim 18, wherein the certain image signal represents a white image.

23. An image processing system according to claim 18, wherein said detecting means determines a plurality of coordinates of the original document.

24. An image processing system comprising:
a plate on which an original document is set;
means for scanning an original document; and
means for detecting at least one of the size and the position of the original document and for producing data representing the detected size or position,
wherein said detecting means produces data representing the size or the position of an area covering the original document when the original document is set obliquely on said plate.

25. An image processing system according to claim 24, wherein said detecting means detects at least one of the size and the position of the original document on the basis of an image signal produced by said scanning means.

26. An image processing system according to claim 24, further comprising means for reproducing an image of the original document on a material.

27. An image processing system according to claim 24, further comprising means for processing an image of the original document in accordance with the data produced by said detecting means.

28. An image processing system according to claim 24, wherein said detecting means determines a plurality of coordinates of the original document.

29. An image processing system comprising:
means for scanning an original document;
means for reproducing an image of the original document scanned by said scanning means on a material;
means for detecting the size of the original document, said detecting means being adapted to detect the length or the width of the original document; and
means for determining a first magnification in the direction of the detected length in response to the detected length and a second magnification in the direction of the detected width in response to the detected width,
wherein said reproducing means reproduces the image of the original document by magnifying the size of the original in the length direction at the first magnification and magnifying the size of the original in the width direction at the second magnification.

30. An image processing system according to claim 29, wherein said detecting means detects the size of the original on the basis of an image signal produced by said scanning means.

31. An image processing system according to claim 29, wherein said detecting means determines a plurality of coordinates of the original document.

32. An image processing system according to claim 29, wherein said determining means determines the magnification in accordance with the size of the material.

33. An image processing system comprising:
means for scanning an original document;
means for reproducing an image of the original document scanned by said scanning means on a material;
means for detecting the size of the original document; and
means for controlling said reproducing means to change the size of the reproduced image of the original document,
wherein said detecting means detects the length or the width of the original document and wherein said control means controls said reproducing means to change the size of the image of the original document in response to the detected length and/or the detected width.

34. An image processing system according to claim 33, wherein said detecting means detects the size of the original on the basis of an image signal produced by said scanning means.

35. An image processing system according to claim 33, wherein said detecting means detects a plurality of coordinates of the original document.

36. An image processing system according to claim 33, wherein said scanning means produces an image signal representing an image of the scanned original document.

37. An image processing system comprising:
a plate on which a plurality of original documents can be set;
scanning means for scanning the plurality of original documents on said plate in succession by performing a reciprocating movement plural times;
means for reproducing a plurality of images corresponding to the plurality of original documents scanned by said scanning means in succession with an interval therebetween on different materials;
means for detecting at least one of the size and the position of the original document and for producing a detecting signal representing the detected size or position; and
means for controlling the reciprocating movement of said scanning means in accordance with the detection signal from said detecting means, in such a manner that the reciprocating movement for scanning of each of the plurality of the original documents by said scanning means is initiated at a common position with respect to said plate and is terminated at different positions in accordance with the size or position of the original document.

38. An image processing system according to claim 37, wherein said scanning means produces an image signal, wherein said system further comprises means for processing the image signal in accordance with the detection result of said detecting means.

39. An image processing system according to claim 37, wherein said detecting means determines a plurality of coordinates of the original document.

40. An image processing system according to claim 37, wherein said scanning produces an image signal, wherein said system further comprises means for processing the image signal in accordance with the detection result of said detecting means.

* * * * *

UNITED STATES PATENT AND TRADEMARK OFFICE
CERTIFICATE OF CORRECTION

PATENT NO. : 5,001,574
DATED : March 19, 1991
INVENTOR(S) : KATSUICHI SHIMIZU ET AL.      Page 1 of 4

It is certified that error appears in the above-identified patent and that said Letters Patent is hereby corrected as shown below:   On the title page:

AT [56] REFERENCES CITED

U.S. Patent Documents, "4,495,521  1/1982  Nagoh
                                      4,506,302  3/1982  Kurata"
              should read--4,495,521  1/1985  Nagoh
                              4,506,302  3/1985  Kurata--.

SHEET 43 OF 53

FIG. 18A, "SLAN" should read --SCAN--.

SHEET 44 OF 53

FIG. 18B, "MAXMUMS" should read --MAXIMUMS--.

SHEET 52 OF 53

FIG. 22A, "DEVELOPPING" (both occurrences) should read --DEVELOPING--.

COLUMN 3

Line 16, "image in the book" should read --the image in the book--.
    Line 41, "is a" should be deleted.

COLUMN 4

Line 54, "collimeter lens," should read --colimater lens,--.
    Line 59, "collimeter lens" should read --colimater lens--.

UNITED STATES PATENT AND TRADEMARK OFFICE
CERTIFICATE OF CORRECTION

PATENT NO. : 5,001,574
DATED : March 19, 1991
INVENTOR(S) : KATSUICHI SHIMIZU ET AL.

It is certified that error appears in the above-identified patent and that said Letters Patent is hereby corrected as shown below:

COLUMN 5

Line 25, "area" should read --areas--.

COLUMN 6

Line 21, "latter" should read --later--.

COLUMN 11

Line 19, "of" should be deleted.
Line 39, "a" should be deleted.

COLUMN 13

Line 22, "printer" should read --printer.--.
Line 42, "of" should be deleted.
Line 48, "of" should be deleted.

COLUMN 15

Line 20, "number" should read --number of--.

COLUMN 20

Line 3, "ratios. $m_1$ and $m_2$," should read --ratios $m_1$ and $m_2$,--.
Line 8, "alram is issured" should read --alarm is issued--.
Line 62, "peper" should read --paper--.

UNITED STATES PATENT AND TRADEMARK OFFICE
CERTIFICATE OF CORRECTION

PATENT NO. : 5,001,574
DATED : March 19, 1991
INVENTOR(S) : KATSUICHI SHIMIZU ET AL.          Page 3 of 4

It is certified that error appears in the above-identified patent and that said Letters Patent is hereby corrected as shown below:

COLUMN 21

Line 57, "of" should read --or--.

COLUMN 22

Line 13, "before" should read --before,--.
    Line 23, "ENBALE" should read --ENABLE--.
    Line 33, "imag " should read --image--.

COLUMN 23

Line 11, "as" should be deleted.
    Line 21, "17B-2 a" should read --17B-2 show a--.
    Line 26, "whetehr" should read --whether--.

COLUMN 24

Line 41, "culated is" should read --culated distance is--.
    Line 59, "proivded" should read --provided--.

COLUMN 25

Line 68, "explaiend" should read --explained--.

COLUMM 26

Line 10, "13B" should read --13D--.
    Line 28, "entires" should read --entries---.
    Line 65, "direciton" should read --direction--.

UNITED STATES PATENT AND TRADEMARK OFFICE
CERTIFICATE OF CORRECTION

PATENT NO. : 5,001,574
DATED : March 19, 1991
INVENTOR(S) : KATSUICHI SHIMIZU ET AL.

It is certified that error appears in the above-identified patent and that said Letters Patent is hereby corrected as shown below:

COLUMN 27

Line 33, "FIG. 20B-1" should read --FIGS. 20B-1--.
Line 38, "whetehr" should read --whether--.

Signed and Sealed this

Nineteenth Day of January, 1993

Attest:

DOUGLAS B. COMER

*Attesting Officer*       *Acting Commissioner of Patents and Trademarks*